US012698870B2

(12) United States Patent
Jiang et al.

(10) Patent No.: US 12,698,870 B2
(45) Date of Patent: Aug. 4, 2026

(54) LED LIGHT BULB

(71) Applicant: JIAXING SUPER LIGHTING ELECTRIC APPLIANCE CO., LTD, Jiaxing (CN)

(72) Inventors: Tao Jiang, Jiaxing (CN); Ronghuan Yang, Jiaxing (CN); Zhikun Wang, Jiaxing (CN); Jlianjun Ding, Nanjing (CN); Chihshan Yu, Jiaxing (CN); Heng Zhao, Kunshan (CN); Nanyi Jiang, Jiaxing (CN)

(73) Assignee: JIAXING SUPER LIGHTING ELECTRIC APPLICATION CO., LTD, Jiaxing City (CN)

( * ) Notice: Subject to any disclaimer, the term of this patent is extended or adjusted under 35 U.S.C. 154(b) by 0 days.

(21) Appl. No.: 19/273,047

(22) Filed: Jul. 17, 2025

(65) Prior Publication Data

US 2025/0347391 A1 Nov. 13, 2025

Related U.S. Application Data

(63) Continuation-in-part of application No. 19/019,468, filed on Jan. 14, 2025, and a continuation-in-part of (Continued)

(30) Foreign Application Priority Data

Sep. 28, 2014 (CN) ......................... 201410510593.6
Feb. 2, 2015 (CN) ........................ 201510053077.X
(Continued)

(51) Int. Cl.
*F21K 9/238* (2016.01)
*F21K 9/232* (2016.01)
(Continued)

(52) U.S. Cl.
CPC .............. *F21K 9/232* (2016.08); *F21K 9/235* (2016.08); *F21K 9/238* (2016.08); *F21V 3/10* (2018.02);
(Continued)

(58) Field of Classification Search
CPC . F21K 9/238; F21K 9/237; F21K 9/64; F21K 9/232; F21Y 2107/00;
(Continued)

(56) References Cited

U.S. PATENT DOCUMENTS 2,688,711 A 9/1954 Marcel
5,859,181 A 1/1999 Zhao et al.
(Continued)

FOREIGN PATENT DOCUMENTS

CN 1636259 A 7/2005
CN 101085868 A 12/2007
(Continued)

*Primary Examiner* — William J Carter
(74) *Attorney, Agent, or Firm* — Simon Kuang Lu

(57) ABSTRACT

A lighting device, including: a lamp housing and a lamp cap connected to each other and formed a closed space; at least one light-emitting diode filament disposed in the closed space; and a stem connected to the lamp cap and electrical conducted with the light-emitting diode filament, wherein the light-emitting diode filament includes: a chip strip structure; a light conversion unit wrapping the chip strip structure; and electrodes located at two ends of the chip strip structure respectively and electrically connected thereto, wherein at least part of the electrodes are wrapped in the light conversion unit; the chip strip structure includes a substrate with a first end and a second end, and a deposition segment located between the first end and the second end; and the deposition segment includes a plurality of deposition units with a connecting layer disposed therebetween, and a conductor layer electrically connects the deposition units.

19 Claims, 12 Drawing Sheets

Related U.S. Application Data application No. PCT/CN2024/130713, filed on Nov. 8, 2024, said application No. 19/019,468 is a continuation-in-part of application No. 18/813,874, filed on Aug. 23, 2024, now Pat. No. 12,359,779, which is a continuation-in-part of application No. 18/642,164, filed on Apr. 22, 2024, now Pat. No. 12,313,227, said application No. 19/019,468 is a continuation-in-part of application No. PCT/CN2023/122455, filed on Sep. 28, 2023, said application No. 18/642,164 is a continuation of application No. 18/126,000, filed on Mar. 24, 2023, now Pat. No. 12,007,077, which is a continuation-in-part of application No. 17/900,897, filed on Sep. 1, 2022, now Pat. No. 11,629,825, and a continuation-in-part of application No. 17/408,519, filed on Aug. 23, 2021, now Pat. No. 11,686,436, said application No. 17/900,897 is a continuation of application No. 17/356,576, filed on Jun. 24, 2021, now Pat. No. 11,525,547, which is a continuation of application No. 16/914,461, filed on Jun. 28, 2020, now Pat. No. 11,085,591, said application No. 17/408,519 is a continuation-in-part of application No. 16/894,913, filed on Jun. 8, 2020, now Pat. No. 11,421,827, said application No. 16/914,461 is a continuation of application No. 16/840,469, filed on Apr. 6, 2020, now Pat. No. 10,711,951, said application No. 16/894,913 is a continuation-in-part of application No. 16/748,070, filed on Jan. 21, 2020, now Pat. No. 10,784,428, said application No. 16/840,469 is a continuation of application No. 16/505,732, filed on Aug. 28, 2019, now Pat. No. 10,677,396, said application No. 16/748,070 is a continuation-in-part of application No. 16/234,124, filed on Dec. 27, 2018, now Pat. No. 10,845,008, said application No. 16/505,732 is a continuation of application No. 15/858,036, filed on Dec. 29, 2017, now Pat. No. 10,544,905, said application No. 16/234,124 is a continuation-in-part of application No. 15/858,036, filed on Dec. 29, 2017, now Pat. No. 10,544,905, which is a continuation-in-part of application No. 29/627,379, filed on Nov. 27, 2017, now Pat. No. Des. 879,330, and a continuation-in-part of application No. 15/723,297, filed on Oct. 3, 2017, now Pat. No. 10,655,792, and a continuation-in-part of application No. 29/619,287, filed on Sep. 28, 2017, now Pat. No. Des. 862,740, said application No. 15/723,297 is a continuation-in-part of application No. 15/499,143, filed on Apr. 27, 2017, now Pat. No. 10,240,724, which is a continuation-in-part of application No. 15/384,311, filed on Dec. 19, 2016, now Pat. No. 10,487,987, which is a continuation-in-part of application No. 15/366,535, filed on Dec. 1, 2016, now Pat. No. 10,473,271, said application No. 15/723,297 is a continuation-in-part of application No. 15/308,995, filed as application No. PCT/CN2015/090815 on Sep. 25, 2015, now Pat. No. 10,781,979, said application No. 15/366,535 is a continuation-in-part of application No. 15/237,983, filed on Aug. 16, 2016, now Pat. No. 10,228,093, said application No. 15/723,297 is a continuation-in-part of application No. 15/168,541, filed on May 31, 2016, now Pat. No. 9,995,475.

(30) Foreign Application Priority Data

| | | |
|---|---|---|
| Jun. 10, 2015 | (CN) | 201510316656.9 |
| Jun. 19, 2015 | (CN) | 201510347410.8 |
| Aug. 7, 2015 | (CN) | 201510489363.0 |
| Aug. 17, 2015 | (CN) | 201510502630.3 |
| Sep. 2, 2015 | (CN) | 201510555889.4 |
| Dec. 19, 2015 | (CN) | 201510966906.3 |
| Apr. 27, 2016 | (CN) | 201610041667.5 |
| Apr. 27, 2016 | (CN) | 201610272153.0 |
| Apr. 29, 2016 | (CN) | 201610281600.9 |
| Jun. 3, 2016 | (CN) | 201610394610.3 |
| Jul. 7, 2016 | (CN) | 201610544049.2 |
| Jul. 22, 2016 | (CN) | 201610586388.7 |
| Nov. 1, 2016 | (CN) | 201610936171.4 |
| Dec. 6, 2016 | (CN) | 201611108722.4 |
| Jan. 13, 2017 | (CN) | 201710024877.8 |
| Feb. 14, 2017 | (CN) | 201710079423.0 |
| Mar. 9, 2017 | (CN) | 201710138009.2 |
| Mar. 23, 2017 | (CN) | 201710180574.5 |
| Apr. 11, 2017 | (CN) | 201710234618.8 |
| May 8, 2017 | (CN) | 201710316641.1 |
| Sep. 18, 2017 | (CN) | 201710839083.7 |
| Sep. 21, 2017 | (CN) | 201730450712.8 |
| Sep. 22, 2017 | (CN) | 201730453237.X |
| Sep. 22, 2017 | (CN) | 201730453239.9 |
| Sep. 26, 2017 | (CN) | 201710883625.0 |
| Oct. 16, 2017 | (CN) | 201730489929.X |
| Oct. 27, 2017 | (CN) | 201730517887.6 |
| Oct. 27, 2017 | (CN) | 201730518659.0 |
| Oct. 30, 2017 | (CN) | 201730520672.X |
| Nov. 3, 2017 | (CN) | 201730537542.7 |
| Nov. 3, 2017 | (CN) | 201730537544.6 |
| Dec. 26, 2017 | (CN) | 201711434993.3 |
| Dec. 29, 2017 | (CN) | 201711477767.3 |
| Jan. 12, 2018 | (CN) | 201810031786.1 |
| Jan. 23, 2018 | (CN) | 201810065369.9 |
| Apr. 17, 2018 | (CN) | 201810343825.1 |
| Apr. 17, 2018 | (CN) | 201810344630.9 |
| May 23, 2018 | (CN) | 201810498980.0 |
| May 23, 2018 | (CN) | 201810501350.4 |
| Jun. 6, 2018 | (CN) | 201810573314.9 |
| Jul. 26, 2018 | (CN) | 201810836433.9 |
| Aug. 17, 2018 | (CN) | 201810943054.X |
| Aug. 30, 2018 | (CN) | 201811005145.5 |
| Aug. 30, 2018 | (CN) | 201811005536.7 |
| Sep. 17, 2018 | (CN) | 201811079889.1 |
| Oct. 30, 2018 | (CN) | 201811277980.4 |
| Oct. 31, 2018 | (CN) | 201811285657.1 |
| Nov. 19, 2018 | (CN) | 201811378173.1 |
| Nov. 19, 2018 | (CN) | 201811378189.2 |
| Dec. 18, 2018 | (CN) | 201811549205.X |
| Jan. 22, 2019 | (CN) | 201910060475.2 |
| Jun. 10, 2019 | (CN) | 201910497661.2 |
| Nov. 1, 2019 | (CN) | 201911057715.X |
| Dec. 5, 2019 | (CN) | 201911234236.0 |
| Aug. 24, 2020 | (CN) | 202010856691.0 |
| Sep. 1, 2020 | (CN) | 202010904065.4 |
| Sep. 3, 2020 | (CN) | 202010912636.9 |
| Nov. 20, 2020 | (CN) | 202011313059.8 |
| Jan. 27, 2021 | (CN) | 202110108853.7 |
| Jul. 9, 2021 | (CN) | 202110779145.6 |
| Sep. 30, 2022 | (CN) | 202211212294.5 |
| Dec. 14, 2022 | (CN) | 202211605516.X |
| Apr. 25, 2023 | (CN) | 202310467409.3 |
| May 30, 2023 | (CN) | 202310623145.6 |
| Sep. 8, 2023 | (CN) | 202311181286.3 |
| Sep. 12, 2023 | (CN) | 202311182111.4 |
| Sep. 20, 2023 | (CN) | 202311222851.6 |

| | | |
|---|---|---|
| Oct. 23, 2023 | (CN) | 202311381406.4 |
| Nov. 10, 2023 | (CN) | 202311498707.5 |
| Dec. 8, 2023 | (CN) | 202311686067.0 |
| Jan. 29, 2024 | (CN) | 202410121595.X |
| Feb. 2, 2024 | (CN) | 202410148286.1 |
| Apr. 25, 2024 | (CN) | 202410505415.8 |
| Jul. 26, 2024 | (CN) | 202411009262.4 |
| Nov. 5, 2024 | (CN) | 202411573960.7 |

(51) Int. Cl.

| | |
|---|---|
| ***F21K 9/235*** | (2016.01) |
| ***F21V 3/10*** | (2018.01) |
| ***F21Y 107/00*** | (2016.01) |
| ***H05B 45/00*** | (2022.01) |
| *F21Y 107/20* | (2016.01) |
| *F21Y 107/70* | (2016.01) |
| *F21Y 115/10* | (2016.01) |

(52) U.S. Cl.
CPC .......... *H05B 45/00* (2020.01); *F21Y 2107/00* (2016.08); *F21Y 2107/20* (2016.08); *F21Y 2107/70* (2016.08); *F21Y 2115/10* (2016.08)

(58) Field of Classification Search
CPC .............. F21Y 2107/70; F21Y 2115/10; F21Y 103/10; F21Y 107/00; H01L 2924/181; F21V 23/06
See application file for complete search history.

(56) References Cited

U.S. PATENT DOCUMENTS

| | | | | |
|---|---|---|---|---|
| 6,523,978 | B1 | 2/2003 | Huang | |
| 6,586,882 | B1 | 7/2003 | Harbers | |
| D548,369 | S | 8/2007 | Bembridge | |
| 7,484,860 | B2 | 2/2009 | Demarest et al. | |
| 7,618,175 | B1 | 11/2009 | Hulse | |
| 7,810,974 | B2 | 10/2010 | Van Rijswick et al. | |
| 8,400,051 | B2 | 3/2013 | Hakata et al. | |
| 8,455,895 | B2 | 6/2013 | Chai et al. | |
| 8,750,671 | B1 | 6/2014 | Kelly et al. | |
| 8,933,619 | B1 | 1/2015 | Ou | |
| 9,016,900 | B2 | 4/2015 | Takeuchi et al. | |
| 9,231,171 | B2 | 1/2016 | Liu et al. | |
| 9,761,765 | B2 | 9/2017 | Basin et al. | |
| D799,100 | S | 10/2017 | Morris | |
| D801,556 | S | 10/2017 | Yao | |
| D804,063 | S | 11/2017 | Yeung | |
| 9,909,724 | B2 | 3/2018 | Marinus et al. | |
| D827,164 | S | 8/2018 | Jiang et al. | |
| D828,933 | S | 9/2018 | Castiglioni | |
| D829,940 | S | 10/2018 | Wang et al. | |
| D829,941 | S | 10/2018 | Wang et al. | |
| D829,942 | S | 10/2018 | Gao | |
| D830,586 | S | 10/2018 | Jiang et al. | |
| D830,587 | S | 10/2018 | Wu et al. | |
| D832,470 | S | 10/2018 | Wu et al. | |
| D838,008 | S | 1/2019 | Wang et al. | |
| D838,009 | S | 1/2019 | Wang et al. | |
| 10,415,763 | B2 | 9/2019 | Eckert | |
| D862,740 | S | 10/2019 | Chen | |
| D876,674 | S | 2/2020 | Zhou | |
| D879,330 | S | 3/2020 | Chen | |
| D880,017 | S | 3/2020 | Chen | |
| 10,663,117 | B2 | 5/2020 | Chen | |
| 10,767,816 | B1 | 9/2020 | Wu et al. | |
| 10,784,428 | B2 | 9/2020 | Jiang et al. | |
| D907,279 | S | 1/2021 | Bie | |
| D908,251 | S | 1/2021 | Chen | |
| 11,015,764 | B2 | 5/2021 | Jiang et al. | |
| 11,047,532 | B1 | 6/2021 | Chen et al. | |
| 11,187,387 | B1 | 11/2021 | Yan et al. | |
| 11,231,147 | B2 | 1/2022 | Cao et al. | |
| 11,421,827 | B2 | 8/2022 | Jiang et al. | |
| D963,232 | S | 9/2022 | Qin | |
| D975,911 | S | 1/2023 | Shen | |
| 11,543,083 | B2 | 1/2023 | Jiang et al. | |
| D978,413 | S | 2/2023 | Qin | |
| D1,021,156 | S | 4/2024 | Gong | |
| D1,024,369 | S | 4/2024 | Jiang et al. | |
| 2003/0123150 | A1 | 7/2003 | Brickey et al. | |
| 2009/0059593 | A1 | 3/2009 | Tsai | |
| 2009/0212698 | A1 | 8/2009 | Bailey | |
| 2009/0251882 | A1 | 10/2009 | Ratcliffe | |
| 2011/0278605 | A1 | 11/2011 | Agatani et al. | |
| 2012/0119647 | A1 | 5/2012 | Hsu | |
| 2013/0058080 | A1 | 3/2013 | Ge et al. | |
| 2013/0077285 | A1 | 3/2013 | Isogai et al. | |
| 2013/0100640 | A1* | 4/2013 | Zhang | F21K 9/232 362/294 |
| 2013/0141892 | A1* | 6/2013 | Okazaki | F21V 3/00 362/363 |
| 2013/0147348 | A1 | 6/2013 | Motoya et al. | |
| 2013/0235592 | A1 | 9/2013 | Takeuchi et al. | |
| 2013/0249381 | A1* | 9/2013 | Takeuchi | H05B 33/02 313/292 |
| 2013/0265796 | A1* | 10/2013 | Kwisthout | G02B 6/001 362/558 |
| 2013/0293098 | A1 | 11/2013 | Li et al. | |
| 2014/0063829 | A1 | 3/2014 | Kushalappa et al. | |
| 2014/0103794 | A1* | 4/2014 | Ueda | F21V 23/002 313/318.01 |
| 2014/0152177 | A1* | 6/2014 | Matsuda | F21K 9/23 315/32 |
| 2014/0268779 | A1* | 9/2014 | Sorensen | F21K 9/232 362/249.06 |
| 2014/0369036 | A1 | 12/2014 | Feng | |
| 2014/0375201 | A1 | 12/2014 | Su et al. | |
| 2015/0003038 | A1 | 1/2015 | Liu | |
| 2015/0069442 | A1 | 3/2015 | Liu et al. | |
| 2015/0070871 | A1 | 3/2015 | Chen et al. | |
| 2015/0070887 | A1 | 3/2015 | Yamauchi | |
| 2015/0097199 | A1 | 4/2015 | Chen et al. | |
| 2016/0369949 | A1 | 12/2016 | Wu et al. | |
| 2016/0369952 | A1 | 12/2016 | Weekamp | |
| 2017/0012177 | A1 | 1/2017 | Trottier | |
| 2017/0051877 | A1 | 2/2017 | Weijers et al. | |
| 2017/0138543 | A1 | 5/2017 | Steele et al. | |
| 2018/0080611 | A1 | 3/2018 | Haberkorn et al. | |
| 2018/0080612 | A1 | 3/2018 | Haberkorn et al. | |
| 2018/0172218 | A1 | 6/2018 | Feit | |
| 2019/0368667 | A1 | 12/2019 | On et al. | |
| 2019/0386185 | A1 | 12/2019 | Jiang et al. | |
| 2020/0161522 | A1 | 5/2020 | Jiang et al. | |
| 2020/0219857 | A1 | 7/2020 | Park et al. | |
| 2021/0381657 | A1 | 12/2021 | Xiong et al. | |
| 2023/0265977 | A1 | 8/2023 | Jiang et al. | |

FOREIGN PATENT DOCUMENTS

| | | | |
|---|---|---|---|
| CN | 101208195 | A | 6/2008 |
| CN | 101702421 | A | 5/2010 |
| CN | 201448620 | U | 5/2010 |
| CN | 202189788 | U | 4/2012 |
| CN | 202252991 | U | 5/2012 |
| CN | 102751274 | A | 10/2012 |
| CN | 202712178 | U | 1/2013 |
| CN | 102980054 | A | 3/2013 |
| CN | 103560128 | A | 2/2014 |
| CN | 103594608 | A | 2/2014 |
| CN | 203477967 | U | 3/2014 |
| CN | 103700652 | A | 4/2014 |
| CN | 103890481 | A | 6/2014 |
| CN | 203628391 | U | 6/2014 |
| CN | 103939758 | A | 7/2014 |
| CN | 103956421 | A | 7/2014 |
| CN | 103972364 | A | 8/2014 |
| CN | 103994349 | A | 8/2014 |
| CN | 203771136 | U | 8/2014 |
| CN | 203907532 | U | 10/2014 |
| CN | 203910792 | U | 10/2014 |
| CN | 104319345 | A | 1/2015 |

(56) References Cited

FOREIGN PATENT DOCUMENTS

| | | | |
|---|---|---|---|
| CN | 204083941 | U | 1/2015 |
| CN | 104456165 | A | 3/2015 |
| CN | 204289439 | U | 4/2015 |
| CN | 104600174 | A | 5/2015 |
| CN | 104716247 | A | 6/2015 |
| CN | 204387765 | U | 6/2015 |
| CN | 105161608 | A | 12/2015 |
| CN | 105226176 | A | 1/2016 |
| CN | 105371243 | A | 3/2016 |
| CN | 105591010 | A | 5/2016 |
| CN | 105810797 | A | 7/2016 |
| CN | 106122819 | A | 11/2016 |
| CN | 205979315 | U | 2/2017 |
| CN | 106898681 | A | 6/2017 |
| CN | 107314258 | A | 11/2017 |
| CN | 107740940 | A | 2/2018 |
| CN | 207364690 | U | 5/2018 |
| CN | 207852724 | U | 9/2018 |
| CN | 207967031 | U | 10/2018 |
| CN | 108730790 | A | 11/2018 |
| CN | 109973833 | A | 7/2019 |
| CN | 110081323 | A | 8/2019 |
| CN | 209282188 | U | 8/2019 |
| CN | 111682016 | A | 9/2020 |
| CN | 212319432 | U | 1/2021 |
| EP | 2760057 | A1 | 7/2014 |
| EP | 2567145 | B1 | 4/2016 |
| GB | 2547085 | A | 8/2017 |
| JP | 1999228825 | A | 8/1999 |
| JP | 1999335555 | A | 12/1999 |
| JP | 3075689 | U | 2/2001 |
| JP | 2003113264 | A | 4/2003 |
| JP | 2012064568 | A | 3/2012 |
| JP | 2012099726 | A | 5/2012 |
| JP | 2013030727 | A | 2/2013 |
| JP | 2013225587 | A | 10/2013 |
| JP | 2014032981 | A | 2/2014 |
| JP | 2014143156 | A | 8/2014 |
| WO | 2012053134 | A1 | 4/2012 |
| WO | 2018094887 | A1 | 5/2018 |

* cited by examiner

LED LIGHT BULB

PRIOR ART

The present application relates to the technical field of LED lighting devices, in particular to a lighting device, and a light-emitting diode filament and a fabrication method thereof.

BACKGROUND OF THE INVENTION

LED lighting lamps have many advantages of long service life, small size, energy and power saving, etc., and are therefore widely used in the market to gradually replace existing incandescent and fluorescent lamps.

As one of the earliest electric lighting devices, tungsten filament lamps in the incandescent lamps have become one of the most widely accepted forms among consumers under long-term and large-scale usage conditions. However, due to their processes and materials, the tungsten filament lamps have low luminous efficiency, severe heat generation, and high energy consumption, with an average service life of generally 1,000-3,000 hours. At present, LED lighting lamps that use LED filaments as light-emitting elements and are similar to tungsten filament lamps in shape, also known as LED filament lamps, have emerged in the market, and are quickly accepted by consumers and rapidly replace the market and status of the tungsten filament lamps in the original lighting field due to their characteristics of excellent light-emitting performance, low energy consumption, long life, similar shape to the tungsten filament lamps, etc.

The LED filament is a packaged light-emitting element with a plurality of conducting LED chips disposed along a specific direction. The common LED filament is a strip-shaped. To ensure that the shape of the LED filament can be close to that of a tungsten filament, the LED filament needs to be in a thin filament shape with a very small cross section. Such shape will inevitably be challenged in terms of structural strength, especially when the LED filament is flexible and needs to be bent, the LED filament itself or the internal conducting structure is prone to breakage, making it impossible to be conducting and turned on.

With the increasing popularity of light-emitting diodes (LEDs for short), light-emitting diode bulbs have gradually become the main choice of lighting appliances for consumers in daily life compared with conventional bulbs. In addition to the lighting function, how to effectively improve the applicability of light-emitting diode bulbs without significantly increasing production costs is undoubtedly a topic that manufacturers attach great importance to.

However, due to the directivity of light emitted from an LED light source, unlike the conventional lighting lamp that can provide lighting in a large wide-angle range, how to apply the LED to the conventional lighting lamp (e.g., the tungsten filament bulb lamp), reduce the damage during transportation, and improve the light-emitting effect, the assembly efficiency, and the visual effect are all technical problems that need to be solved urgently at present.

In summary, considering the shortcomings and defects of LED filament lamps in related technologies, how to design LED filament lamps to avoid breakage is a technical problem that urgently needs to be solved by those skilled in the art.

SUMMARY OF THE INVENTION

In view of the above disadvantages in related technologies, an objective of the present application is to provide a lighting device, and a light-emitting diode filament and a fabrication method thereof, to solve the above technical problems.

To achieve the above objective and other related objectives, the present disclosure provides a lighting device, including: a lamp housing and a lamp cap that are connected to each other and form a closed space; at least one light-emitting diode filament disposed in the closed space; and a stem that is connected to the lamp cap and is in electrical conduction with the light-emitting diode filament, where the light-emitting diode filament includes: a chip strip structure; a light conversion unit wrapping the chip strip structure; and electrodes located at two ends of the chip strip structure in a length direction respectively and electrically connected thereto, where at least part of the electrodes are wrapped in the light conversion unit; the chip strip structure includes a substrate with a first end, a second end away from the first end, and a deposition segment located between the first end and the second end; and the deposition segment includes a plurality of deposition units with a connecting layer disposed therebetween, and a conductor layer configured to electrically connect the deposition units.

In an embodiment of the present disclosure, the plurality of deposition units are arranged along a length direction of the substrate, where the adjacent deposition units are electrically connected by the conductor layer formed by means of a deposition process, so that the plurality of deposition units form a continuous strip-shaped structure on the substrate.

In an embodiment of the present disclosure, the electrode is a filament electrode disposed at the first end and/or the second end of the substrate and is configured to be electrically connected to the deposition unit adjacent to the first end and/or the second end of the substrate.

In an embodiment of the present disclosure, the substrate is made of a transparent material or an opaque material.

In an embodiment of the present disclosure, the substrate is a sapphire substrate, a silicon substrate, a silicon carbide substrate, a glass substrate, a metal substrate, a fiberglass substrate, a PCB, or a soft substrate.

In an embodiment of the present disclosure, the thickness of the substrate is 70-700 μm.

In an embodiment of the present disclosure, the connecting layer formed between the adjacent deposition units on the substrate enables the plurality of deposition units to form the continuous strip-shaped structure on the substrate.

In an embodiment of the present disclosure, the ratio of the height of the connecting layer to the height of the deposition unit is 0.80-1.20.

In an embodiment of the present disclosure, the ratio of a first length of the connecting layer along the length direction of the substrate to a second length of each deposition unit along the length direction of the substrate is 0.05-0.30.

In an embodiment of the present disclosure, a first width of the connecting layer along a width direction of the substrate is equal to a second width of each deposition unit along the width direction of the substrate.

In an embodiment of the present disclosure, the first length of the connecting layer along the length direction of the substrate is 0.03-0.30 mm.

In an embodiment of the present disclosure, the adjacent deposition units are electrically connected to the deposition units on two sides of the connecting layer in a manner that the connecting layer is covered with the formed conductor layer.

In an embodiment of the present disclosure, the deposition unit includes: a first semiconductor layer formed on the substrate; a light-emitting layer formed on the first semiconductor layer; a second semiconductor layer formed on the light-emitting layer; a first electrode formed on the first semiconductor layer and spaced apart from the light-emitting layer; and a second electrode formed on the second semiconductor layer.

In an embodiment of the present disclosure, the deposition unit adjacent to the first end and/or the second end of the substrate is electrically connected to the filament electrode of the substrate by a lead formed by means of a wire bonding process.

In an embodiment of the present disclosure, the deposition unit adjacent to the first end and/or the second end of the substrate is electrically connected to the filament electrode in a manner that the conductor layer formed by means of the deposition process forms an electrode extension end separately.

In an embodiment of the present disclosure, a deposition area of the electrode extension end on the substrate accounts for more than 70% of a deposition area of the deposition unit on the substrate that is adjacent to the first end and/or the second end of the substrate.

In an embodiment of the present disclosure, the light conversion unit includes a first light conversion layer and a second light conversion layer that covers the chip strip structure and is located between the first light conversion layer and the conductor layer; and the first light conversion layer wraps an outer side of the second light conversion layer and covers at least a part of the second light conversion layer.

In an embodiment of the present disclosure, the second light conversion layer includes red fluorescent powder $K_2SiF_6:Mn^{4+}$ (KSF).

In an embodiment of the present disclosure, a coating layer is further included, where the coating layer completely coats the first light conversion layer and has a different color from the first light conversion layer in a state where the light-emitting diode filament does not work.

In an embodiment of the present disclosure, the conductor layer and the first electrode and the second electrode of each deposition unit are formed by means of a one-time deposition process, and the first electrode and the second electrodes are made of a same material.

In summary, according to the lighting device, and the light-emitting diode filament and the fabrication method thereof provided in the present application, the conductor layer that electrically connects the plurality of deposition units is formed by means of the deposition process during fabrication of the deposition units, so that the plurality of deposition units form the continuous strip-shaped structure on the substrate. Compared with a situation where a lead formed by means of a conventional wire bonding process is thicker and is prone to metal wire falling or breakage, the light-emitting diode filament in the present application is more stable in electrical connection. Moreover, compared with a conventional filament, the light-emitting diode filament in the present application has the advantage that the conductor layer formed by means of the deposition process may shorten the distance between the deposition units, so that compared with the conventional filament, more deposition units may be disposed in the same unit length to increase the lumen of the filament in unit length.

BRIEF DESCRIPTION OF DRAWINGS

Specific features involved in the present application are as shown in the appended claims. The characteristics and advantages of the disclosure involved in the present application can be better understood with reference to exemplary embodiments and drawings described in detail below. A brief description of the drawings is as follows:

Figure 1A:
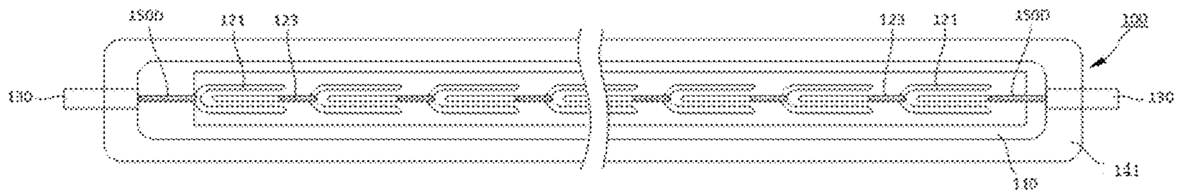
FIG. 1*a* shows a schematic diagram of arrangement of a light-emitting diode filament in an embodiment of the present application.

Reference numerals: 100. light-emitting diode filament; 101. chip strip structure; 110. substrate; 110*a*. first end; 110*b*. second end; 110*c*. deposition segment; 120. first row group; 121. deposition unit; S1. first semiconductor layer; S2. second semiconductor layer; E1. first electrode; E2. second electrode; LE. light-emitting layer; P1. first length; P2. second length; 122. connecting layer; 123. conductor layer; 130. filament electrode; 140. light conversion unit; 141. first light conversion layer; 1411. top layer; 1412. base layer; 142. second light conversion layer; 150D. electrode connection layer; 150W. lead (wire); 160. coating layer; 1601. filling particle; 1062. maximum-sized particle; 1063. medium-sized particle; 1064. minimum-sized particle; 200. lighting device; 210. lamp housing; 300. lighting device; 310. lamp housing; 320. stem; 330. lamp cap; 340. conductive bracket; and 220. second row group.

DETAILED DESCRIPTION OF THE INVENTION

The implementation of the present application is illustrated by specific embodiments below, and those skilled in the art can readily understand other advantages and effects of the present application/the present disclosure from the disclosure of this specification. The following description of the various embodiments presented in the present application is for illustrative and exemplary purposes only and is not intended to be exclusive or limited to the exact form disclosed. These exemplary embodiments are merely examples, and many implementations and variations that do not require the details provided herein are possible. It should also be emphasized that the present disclosure provides details of alternative examples, but these alternative shows are not exclusive. Moreover, the consistency in any details between various examples should be understood as requiring such details, as it is not practical to show every possible variation for each feature described herein.

In the drawings, the sizes and relative sizes of members may be enlarged for clarity. In the entire drawings, the same reference signs refer to the same components.

The technical terms used herein are only intended to describe specific embodiments and are not intended to limit the present application. In the terms used herein, the singular form "a" or "an" is intended to also include the plural form, unless the context clearly indicates otherwise. In the terms used herein, the term "and/or" includes any and all combinations of one or more associated listed terms, and may be abbreviated as "/".

It should be understood that the terms "first", "second", "third", etc. may be used herein to describe various components, members, regions, layers, or steps, but these components, members, regions, layers, and/or steps should not be limited by these terms. Unless the context indicates otherwise, these terms are only used to distinguish one component, member, region, layer, or step from another component, member, region, layer, or step, for example, as a naming convention. Therefore, without departing from the teachings of the present application, the first component, member, region, layer, or step discussed in one section of the specification below may be named as the second component, member, region, layer, or step in another section of the specification or in the claims. In addition, in some cases, even if descriptive terms such as "first" and "second" are not used in the specification, they may still be referred to as "first" or "second" in the claims to distinguish different described components from each other.

It should also be understood that when the term "include" or "comprise" is used in the specification, it lists the existence of the described features, regions, integers, steps, operations, components, and/or members, but does not exclude the existence or addition of one or more other features, regions, integers, steps, operations, components, and/or members.

It should be understood that when a component is referred to as being "connected" or "coupled" to another component or being "on" another component, the component may be directly connected or coupled to another component or on another component, or an intermediate component may exist. Rather, when a component is referred to as being "directly connected" or "directly coupled" to another component, no intermediate element exists. Other terms for describing a relationship between components should be interpreted in a similar way (e.g., "between" and "directly between", "adjacent" and "directly adjacent", or the like). However, the term "contact" used herein refers to direct contact (i.e., touch), unless the context indicates otherwise. The "electrical connection" in the present application refers to an electrical connection capable of implementing the conduction and transmission of an electrical signal.

The embodiments described herein will be described with ideal schematic diagrams with reference to plane views and/or sectional views. Therefore, exemplary views may be modified depending on manufacturing technologies and/or tolerances. Therefore, the disclosed embodiments are not limited to those shown in the views, but include variations of configurations formed on the basis of a manufacturing process. Therefore, the regions illustrated in the figures may be schematic, and the shapes of the regions shown in the figures may exemplarily list the shapes of regions of components, but various aspects of the present application are not limited to this.

The relative spatial terms such as "under", "below", "lower", "above", and "upper" may be used herein to describe a relationship between one component or feature and another component or feature shown in the drawings. However, it should be understood that in addition to the orientations depicted in the accompanying drawings, the relative spatial terms are intended to encompass different orientations of a device during use or operation. For example, if the device in the drawings is overturned over, then the component or feature described as being "below" or "under" another component or feature will be oriented "above" another component or feature. Therefore, the term "below" may encompass both upper and lower orientations. The device may be oriented in other ways (rotated 90° or in other orientations), and the relative spatial descriptions used herein should all be explained accordingly.

The term used herein with reference to orientation, layout, position, shape, size, quantity, or other measurements, such as "same", "equal", "planar", or "coplanar", does not necessarily mean exactly the same orientation, layout, position, shape, size, quantity, or other measurements, but is intended to encompass almost the same orientation, layout, position, shape, size, quantity, or other measurements within an acceptable range of variation that may occur due to the manufacturing process. The term "basic" may be used herein to reflect the meaning.

The term such as "about" or "approximately" may reflect a size, an orientation, or a layout that varies only in a relatively small manner and/or in a form that does not significantly change the operations, functions, or structures of certain components. For example, a range from "about 0.1 to about 1" may encompass a deviation of 0-5% near 0.1 and a deviation of 0-5% near 1, especially if such deviation maintains the same effect as the listed range.

Unless otherwise defined, all the terms (including technical and scientific terms) used herein have the same meanings as those commonly understood by those of ordinary skill in the art to which the present disclosure belongs. It should also be understood that the terms, such as those defined in commonly used dictionaries, should be interpreted as having meanings consistent with their meanings in the relevant field and/or the context of the present application, and should not be interpreted in an idealized or overly formal sense, unless explicitly defined herein.

To apply an LED filament to a lighting device such as a bulb lamp to achieve 360° full-angle illumination, a flexible LED filament needs to be used. The structure of the current flexible LED filament is subjected to front chip packaging or flip chip packaging. For the front chip packaging, the filament is prone to metal wire falling or breakage during production and transportation of the lighting device. For the flip chip packaging, the cost is high, the overall thickness of the filament is large, and the packaging process is complex. In addition, current chips are usually connected by leads formed by means of a wire bonding process, which requires a large interval between LED chips. The wire bonding process requires the placement of a pad at a corresponding position of the chip, so that the structure of the pad not only hinders the chip from emitting light, but also limits the lumen that can be provided by the filament in unit length. Furthermore, the wire bonding process inevitably causes the lead to be in an arc shape, thereby resulting in large overall thickness of the filament. In view of this, the present application provides a lighting device, and a light-emitting diode filament and a fabrication method thereof, to solve the problems that the filament in the front chip packaging is prone to metal wire falling or breakage during production and transportation of the lighting device, the lumen that can be provided by the filament in unit length is limited, and the overall thickness of the filament is large.

A first aspect of the present application provides a light-emitting diode filament, including: a chip strip structure; a light conversion unit wrapping the chip strip structure; and electrodes located at two ends of the chip strip structure in a length direction and electrically connected thereto, where at least part of the electrodes are wrapped in the light conversion unit.

In an embodiment, the chip strip structure includes: a substrate with a plurality of deposition units formed on a deposition segment; a connecting layer located on the substrate and disposed between the plurality of deposition units; and a conductor layer configured to electrically connect the deposition units. The adjacent deposition units on the substrate are electrically connected by the conductor layer, so that the distance between light-emitting diodes fabricated with the deposition units is shortened, and more deposition units may be disposed in unit length of the light-emitting diode filament to increase the lumen of the light-emitting diode filament in unit length. In some embodiments, the light-emitting diode filament may be configured in LED lighting devices with different shapes, specifications, or power, such as bulb lamps, straight tube lamps, panel lamps, flat panel lamps, hanging lamps, recessed lamps, concave lamps, embedded lamps, and ceiling lamps. In embodiments described below, the application of the light-emitting diode filament to the straight tube lamp is temporarily used as an example for description, and it should be understood that the application is not limited to this. In subsequent embodiments, the light-emitting diode filament may also be referred to as an LED filament.

In some embodiments, a light-emitting diode filament is provided. The adjacent deposition units are electrically connected by the conductor layer, so that the distance between light-emitting diodes is shortened, and more deposition units may be disposed in unit length of the light-emitting diode filament to increase the lumen of the light-emitting diode filament in unit length. The present disclosure provides another light-emitting diode filament. The light-emitting diode of the light-emitting diode filament continuously extends from one end to the other end of the substrate, that is, a majority of regions on the surface of the substrate are covered by the light-emitting diode, so that the light-emitting diode filament may have a large light-emitting area.

In some embodiments, the plurality of deposition units formed on the substrate by means of deposition are configured in a row/column manner or in an arrangement manner. For example, in an embodiment, the plurality of deposition units on the substrate are arranged in a row and are electrically connected in series by the conductor layer. Reference is made to FIG. 1*a*, which shows a schematic diagram of arrangement of a light-emitting diode filament in an embodiment of the present application. As shown in the figure, in the light-emitting diode filament 100, the plurality of deposition units 121 on the substrate 110 packaged by a first light conversion layer 141 are arranged in a row, the adjacent deposition units 121 are electrically connected by the conductor layer 123, and the conductor layer 123 is disposed between or on the adjacent deposition units 121; and a first end and a second end of the substrate 110 are each provided with a filament electrode 130 (certainly, it may be said that the filament electrode 130 is formed at a tail end of the substrate 110), the deposition units 121 adjacent to two sides are electrically connected by an electrode connection layer 150D, the first light conversion layer 141 coats at least a part of the substrate 110, the deposition unit 121 and the conductor layer 123, and the conductor layer 123 covers at least a part of the deposition unit 121 or a part of an uppermost layer.

In the present application, the conductor layer may also be referred to as a conductive layer, which refers to a conductor that can implement electrical signal conduction/transmission between two deposition units and electrical signal conduction/transmission between the deposition unit and the filament electrode.

Figure 1B:
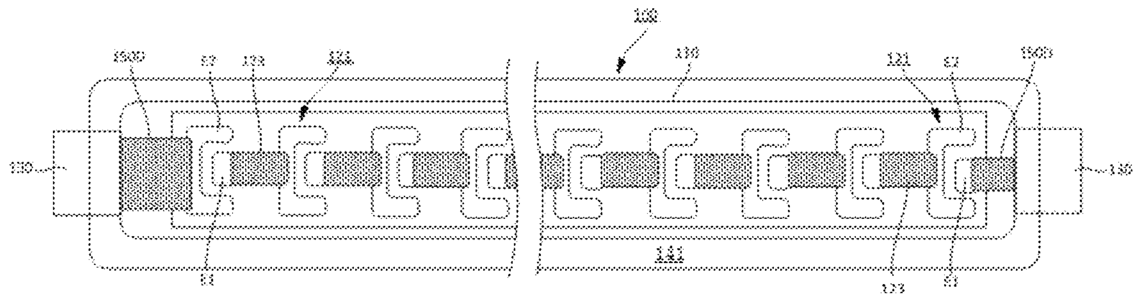
FIG. 1*b* shows a schematic diagram of arrangement of a light-emitting diode filament in another embodiment of the present application.

To improve the current density between the deposition units in the light-emitting diode filament, in an embodiment, the shapes of the deposition units and the conductive layer may be set to reduce the current density and improve the luminous flux and overall heat dissipation performance of the filament within an expected range. Reference is made to FIG. 1*b*, which shows a schematic diagram of arrangement of a light-emitting diode filament in another embodiment of the present application. As shown in the figure, in the light-emitting diode filament 100, the plurality of deposition units 121 on the substrate 110 encapsulated by the first light conversion layer 141 are arranged in a row along a length direction of the substrate 110, the adjacent deposition units 121 are electrically connected by the conductor layer 123, the first end and the second end of the substrate 110 are each provided with the filament electrode 130, and the deposition units 121 adjacent to two sides are electrically connected by the electrode connection layer 150D. In this embodiment, a projection of each deposition unit 121 on the substrate 110 is approximately in a rectangular shape, with short edges (or width edges) on two opposite sides being parallel to the length direction of the substrate 110, and long edges (or length edges) on another two opposite sides being perpendicular to the length direction of the substrate 110. Electrodes (an N electrode and a P electrode) of the deposition unit 121 are formed on the long edges of the deposition unit 121. Correspondingly, the conductor layer 123 is formed between the adjacent deposition units 121 and is electrically connected to the electrodes (the N electrodes or the P electrodes) on the long edges of the deposition units 121 on two sides separately, so that the conductor layer has a wider conductive path. As shown in FIG. 1*b*, the conductor layer 123 between the deposition units 121 has a larger sectional area or a wider conductive path/channel along a radial direction of the filament (or along a width direction of the substrate), so that the current density of a current flowing through the conductor layer 123 is reduced, thereby reducing the heat generation amount of the light-emitting diode filament, and meeting the heat dissipation requirements of the light-emitting diode filament to some extent.

In another embodiment, the plurality of deposition units are arranged in multiple rows to increase the lumen of the filament in unit length. For example, when the light-emitting diode filament includes two light-emitting diode arrays, the lumen that can be provided by the filament in unit length is twice that of a single light-emitting diode array. For example, in the embodiment where the deposition units are arranged in two rows, the plurality of deposition units include a first row group and a second row group parallel to the first row group. In some cases, the first row group may also be referred to as a first light-emitting diode array, and the second row group may also be referred to as a second light-emitting diode array.

Figure 2:
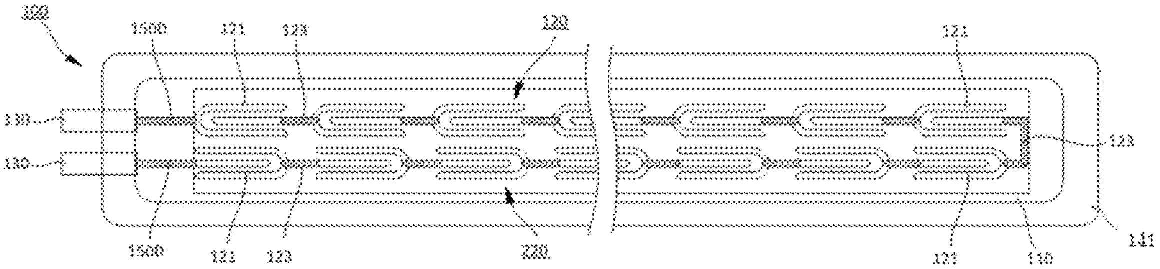
FIG. 2 shows a schematic diagram of arrangement of a light-emitting diode filament in another embodiment of the present application.

In an example of this embodiment, the first row group and the second row group in the plurality of deposition units are connected in series by the conductor layer. For example, the first row group and the second row group are connected in series at one end of the substrate through electrical connection of the conductor layer, so that the two row groups are distributed in a U shape on the substrate. Reference is made to FIG. 2, which shows a schematic diagram of arrangement of a light-emitting diode filament in another embodiment of the present application. As shown in the figure, in the light-emitting diode filament 100, the plurality of deposition units 121 on the substrate 110 encapsulated by the first light conversion layer 141 are arranged in two rows, and the adjacent deposition units 121 are electrically connected by the conductor layer 123, where the first row group located on an upper side of the figure and the second row group located on a lower side of the figure are connected in series through electrical connection of the conductor layer 123, the first row group 120 and the second row group 220 are distributed in a transverse U shape (or distributed in an inverted C shape) on the substrate 110, and the two filament electrodes 130 are disposed on a same side of the substrate 110, so that the deposition units 121 in the first row group 120 and the second row group 220 are electrically connected by the electrode connection layer 150D separately.

Figure 3:
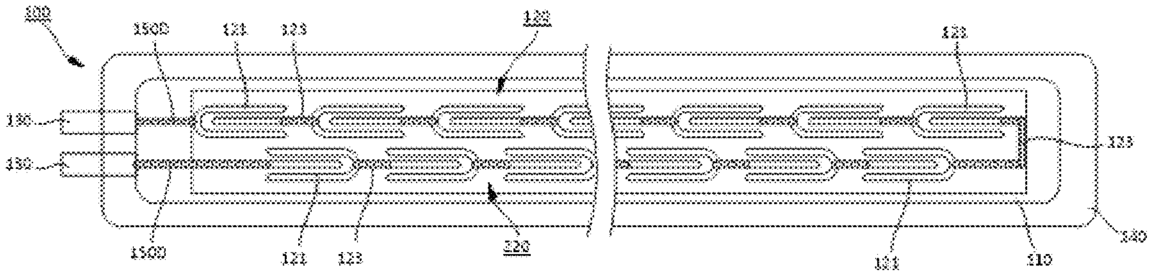
FIG. 3 shows a schematic diagram of arrangement of a light-emitting diode filament in yet another embodiment of the present application.

Reference is made to FIG. 3, which shows a schematic diagram of arrangement of a light-emitting diode filament in yet another embodiment of the present application. As shown in the figure, in the light-emitting diode filament, in the embodiment of FIG. 3, for uniform distribution of heat generated by the light-emitting diode filament 100 during operation, the deposition units 121 in the first row group 120 and the deposition units 121 in the second row group 220 on the substrate 110 encapsulated by the first light conversion layer 141 are arranged alternately along the length direction of the substrate 110, so as to uniformly dissipate heat from the filament and provide more shape space for the width design of the filament. In this embodiment, the first row group 120 and the second row group 220 are distributed in the transverse U shape on the substrate 110, the adjacent deposition units 121 are electrically connected by the conductor layer 123, and the two filament electrodes 130 are disposed on the same side of the substrate 110, so that the deposition units 121 in the first row group 120 and the second row group 220 are electrically connected by the electrode connection layer 150D separately.

Figure 4:
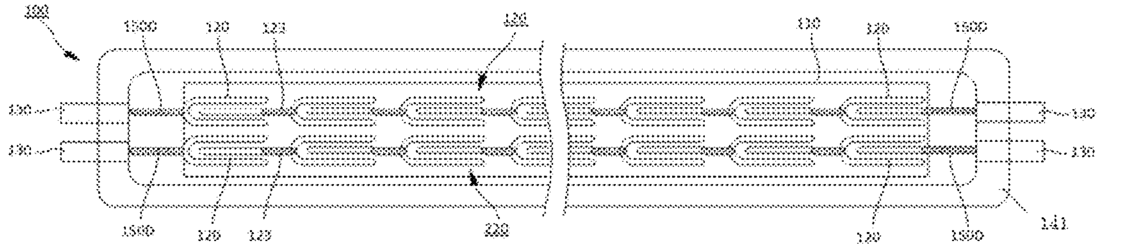
FIG. 4 shows a schematic diagram of arrangement of a light-emitting diode filament in yet another embodiment of the present application.

In another example of this embodiment, the first row group and the second row group in the plurality of deposition units are connected in parallel by the conductor layer. For example, the first row group and the second row group are connected in parallel at two ends of the substrate through separate electrical connection of the conductor layer, and may share the filament electrodes at two ends. Reference is made to FIG. 4, which shows a schematic diagram of arrangement of a light-emitting diode filament in yet another embodiment of the present application. As shown in the figure, in the light-emitting diode filament 100, the plurality of deposition units 121 on the substrate 110 encapsulated by the first light conversion layer 141 are arranged in two rows, and the adjacent deposition units 121 are electrically connected by the conductor layer 123, where the first row group 120 located on an upper side of the figure and the second row group 220 located on a lower side of the figure are connected in parallel through electrical connection of the electrode connection layer 150D, and the first row group 120 and the second row group 220 are electrically connected to the independent filament electrodes 130 by the electrode connection layer 150D at the first end and the second end of the substrate 110 respectively.

Figure 5:
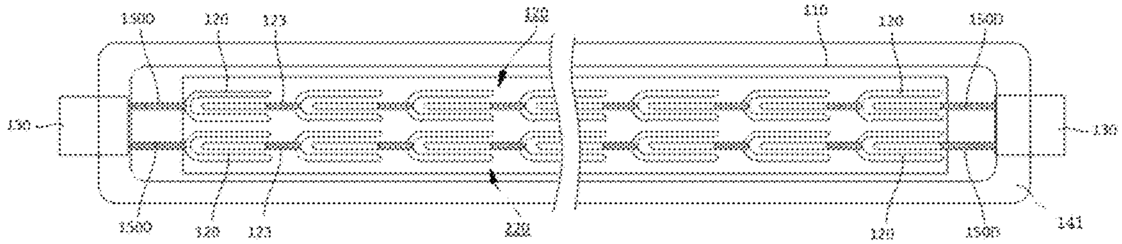
FIG. 5 shows a schematic diagram of arrangement of a light-emitting diode filament in yet another embodiment of the present application.

In yet another example of this embodiment, reference is made to FIG. 5, which shows a schematic diagram of arrangement of a light-emitting diode filament in yet another embodiment of the present application. As shown in the figure, in the light-emitting diode filament 100, the plurality of deposition units 121 on the substrate 110 encapsulated by the first light conversion layer 141 are arranged in two rows, and the adjacent deposition units 121 are electrically connected by the conductor layer 123, where the first row group 120 located on an upper side of the figure and the second row group 220 located on a lower side of the figure are connected in series by the conductor layer 123 separately, the first row group 120 and the second row group 220 are connected to the electrode connection layer 150D separately, and the electrode connection layer 150D is connected to the filament electrode 130 to implement electrical conduction, that is, the first row group 120 and the second row group 220 share the same filament electrode 130 at the same end of the substrate 110 by the respective electrode connection layer 150D.

For ease of illustrating the inventive idea of the present application, in the following embodiments, the arrangement of the plurality of deposition units in a row or column on the substrate is temporarily used as an example for description.

In some embodiments, the lumen of a filament with a single-column light-emitting diode array in unit length may reach 2-10 Lm/mm, more preferably 4.5-8.5 Lm/mm at standard operating voltage and current.

In some embodiments, the filament with the single-column light-emitting diode array in unit length may be provided with 0.5-2.5 chips, namely 0.5-2.5 chips/mm at the standard operating voltage and current.

In some embodiments, the filament with the single-column light-emitting diode array in unit area is provided with 0.5-2.5 chips, namely 0.5-2.5 chips/$mm^2$ at the standard operating voltage and current.

In some embodiments, the lumen of the filament with the single-column light-emitting diode array in unit area is 2-10 Lm/$mm^2$, more preferably 2.5-8 Lm/$mm^2$ at the standard operating voltage and current.

It should be understood that under the inspiration of the ideas revealed in the above embodiments of FIG. 2 to FIG. 5, those skilled in the art may configure more row groups on the same substrate based on actual requirements to fabricate the required filament. For example, in an embodiment of a filament with light-emitting diode arrays arranged in multiple columns, the above number is multiplied by a corresponding multiple.

In the following embodiments, the arrangement of the plurality of deposition units in a row or column on the substrate is still used as an example for description, which is hereby stated.

Figure 6:
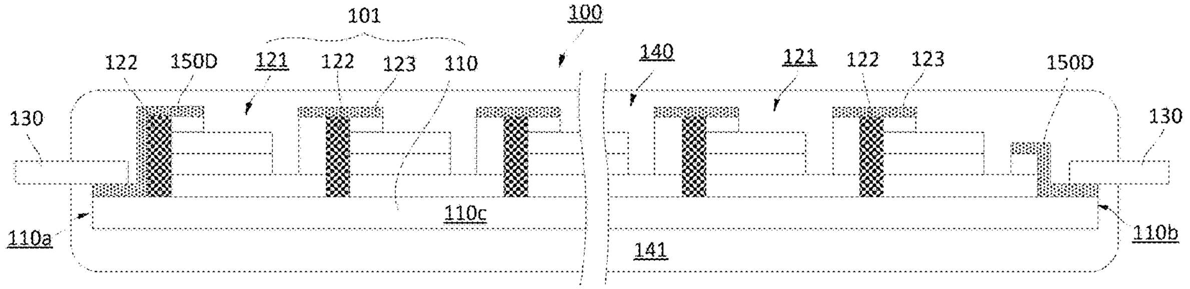
FIG. 6 shows a schematic side view of a structure of a light-emitting diode filament in an embodiment of the present application.

Reference is made to FIG. 6, which shows a schematic side view of a structure of a light-emitting diode filament in an embodiment of the present application. As shown in the figure, the light-emitting diode filament 100 includes a chip strip structure 101, a light conversion unit 140 wrapping the chip strip structure 101, and electrodes 130 located at two ends of the chip strip structure 101 in a length direction and electrically connected thereto, where at least part of the electrodes 130 are wrapped in the light conversion unit 140. In an embodiment, the light conversion unit 140 includes a first light conversion layer 141.

The chip strip structure 101 includes a substrate 110, a plurality of deposition units 121 formed on the substrate 110, and a connecting layer 122 located on the substrate 110 and disposed between the plurality of deposition units 121. The connecting layer 122 is disposed between the adjacent deposition units 121 to electrically isolate the adjacent deposition units 121. The connecting layer 122 avoids short circuit caused by contact between the deposition units 121, and fills an empty region between the adjacent deposition units 121, thereby avoiding unnecessary optical loss while improving the heat dissipation performance. The conductor layer 123 is configured to electrically connect the deposition units 121. The deposition units 121 are disposed along the length direction of the substrate 110. The light-emitting diode filament provided in the present application is different from an existing light-emitting diode filament in structure. Individual independent light-emitting diode filament chip units are used, and then individual independent light-emitting diode filament chips are electrically connected by means of a wire bonding or flip chip technology. In the present application, the plurality of deposition units 121 are formed on the single substrate 110, thereby further reducing steps of a manufacturing process for a rear end of the filament.

The substrate 110 has a first end 110*a*, a second end 110*b*, and a deposition segment 110*c* located between the first end 110*a* and the second end 110*b*. In an embodiment, the first end 110*a* and the second end 110*b* of the substrate 110 refer to two ends of the substrate 110 in the length direction, and the deposition segment 110*c* is a body of the substrate 110. In this embodiment, the deposition segment 110*c* is generally configured to represent a region of an upper surface of the substrate 110 where a semiconductor material is to be deposited.

In some embodiments, the substrate 110 is made of a material with high light transmittance. For example, the light transmittance is above 50%, preferably 60-95%. The light transmittance of the substrate 110 is, for example, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, or 95%.

In some embodiments, the substrate 110 includes a sapphire ($Al_2O_3$) substrate, a silicon (Si) substrate, a silicon carbide (SiC) substrate, a GaN or composite substrate, a glass substrate, a metal substrate, a fiberglass substrate, or a PCB, but is not limited to this. In this embodiment, the substrate 110 being the sapphire substrate is used as an example for description. The sapphire substrate is transparent or almost transparent. For example, the sapphire substrate with the light transmittance of about 85% allows photons generated from a light-emitting layer to penetrate through.

In some embodiments, the thickness of the substrate 110 is controlled to be 0.25-0.45 mm, preferably 0.07-0.7 mm, and more preferably 0.01-1.0 mm. In an embodiment, the thickness of the sapphire substrate is controlled to be 0.07-0.7 mm, namely 70-700 μm.

In some embodiments, the length of the substrate 110 is 80-200 mm, such as approximately 80 mm, 90 mm, 100 mm, 110 mm, 120 mm, 130 mm, 140 mm, 150 mm, 160 mm, 170 mm, 180 mm, 190 mm, or 200 mm.

In some embodiments, the sapphire substrate configured to deposit the plurality of deposition units 121 may be processed by means of thinning and/or texturing, roughening, or patterning.

In another embodiment, the substrate 110 may also be a soft substrate. The soft substrate is also referred to as a flexible substrate. For example, in an example, the flexible substrate is an FPC substrate, so that the filament may have a certain degree of bending. The soft filament with the FPC substrate may be bent to achieve more filament curves or shapes. For example, in another example, the flexible substrate is a flexible PCB. The flexible PCB may be made of a transparent or semi-transparent material. The flexible PCB is formed by printing a circuit on a polyimide or polyester film substrate.

In another embodiment of the present application, the light-emitting diode filament 100 includes a substrate 110, a chip strip structure 101, and a filament electrode 130. The chip strip structure 101 is disposed on the substrate 110. In this embodiment of the present application, the chip strip structure 101 is disposed on one (or the same) substrate 110. The chip strip structure 101 includes a plurality of deposition units 121, a connecting layer 122, and a conductor layer 123. The plurality of deposition units 121 are disposed along the length direction of the substrate 110. In some embodiments, the deposition unit 121 is implemented as a conductive deposition unit, such as a metal deposition unit, and the deposition unit 121 has a photoelectric conversion capability, that is, the deposition unit can be implemented as having a light-emitting function. In some embodiments, the connecting layer 122 is implemented as an electrical isolation layer to implement an electrical isolation function. The connecting layer may also be referred to as a electrical isolation layer or a dielectric layer. The connecting layer 122 is disposed between the adjacent deposition units 121 to electrically isolate the adjacent deposition units 121. The connecting layer 122 avoids short circuit caused by contact between the deposition units 121, and fills an empty region between the adjacent deposition units 121, thereby avoiding unnecessary optical loss while improving the heat dissipation performance.

In the present application, the plurality of deposition units 121 are directly deposited on, for example, a sapphire substrate. When the sapphire substrate 110 is used as a main substrate, a main substrate made of, for example, silicon, ceramic, metal, or any other suitable material does not need to be additionally provided.

In the present application, the term "deposition" refers to a deposition process used in a semiconductor fabrication process, such as in an LED fabrication process, including but not limited to a growth process for an LED epitaxial wafer, which specifically involves, on a substrate (e.g., a sapphire, SiC, or Si substrate) heated to a proper temperature, delivering a target gaseous substance in a controlled manner to the surface of the substrate to grow a specific single crystal thin film, such as a metal-organic chemical vapor deposition (MOCVD) process, or an electron beam evaporation process, a sputter coating process, a physical vapor deposition process, or some sputter deposition processes, or a mask and etching process or a photoetching process.

In the present application, the term "deposition unit" may also be referred to as a deposition layer, a deposition layer unit, or a deposition layer module in some embodiments or implementation states, or as a conductive deposition layer, such as a metal deposition layer. The deposition unit 121 has the photoelectric conversion capability, that is, the deposition unit can be implemented as having the light-emitting function. Therefore, in some embodiments, the plurality of deposition units 121 combined with the substrate 110 may be collectively referred to as LED units, LED chips, or LED chip units. The LED chip unit may be referred to as an LED segment, and may include a single LED chip or two LED chips. Certainly, the chip unit may include a plurality of LED chips, namely three or more LED chips.

The plurality of deposition units 121 are formed on the deposition segment 110*c* of the substrate 110 and arranged along a length direction of the substrate 110. In the deposition segment 110*c* of the substrate 110, every two adjacent deposition units 121 are electrically connected by the conductor layer 123 formed by means of the deposition process, so that the plurality of deposition units 121 form the continuous strip-shaped structure on the substrate 110. In the present application, the deposition unit 121 has the photoelectric conversion capability, that is, the deposition unit can be implemented as having the light-emitting function. In an embodiment, the deposition unit 121 is fabricated as a relatively independent LED light-emitting body or light-emitting unit.

In some embodiments, the number of the plurality of deposition units 121 formed on the deposition segment 110*c* of the substrate 110 is 50, and a voltage at two ends is 130-135 V.

In some other embodiments, the number of the plurality of deposition units 121 formed on the deposition segment 110*c* of the substrate 110 is 100, and a voltage at two ends is 260-265 V.

In some embodiments, the specification of the deposition units 121 formed on the deposition segment 110*c* of the substrate 110 includes 9 mil×18 mil, 11 mil×30 mil, 13 mil×30 mil, or a combination thereof.

The deposition unit 121 that forms the light-emitting diode continuously extends from one end to the other end of the substrate 110, that is, light emission of the entire filament is implemented by a complete light-emitting diode array. A majority of regions on the surface of the substrate 110 are covered by the deposition unit 121, so the deposition unit 121 may have a large light-emitting area.

In some embodiments, the light-emitting area of the deposition unit 121 may be understood as a top area of the deposition unit 121 minus a part of the deposition unit 121 covered by the conductor layer 123, the first electrode, and the second electrode, and the lengths and widths of the conductor layer 123, the first electrode, and the second electrode may be adjusted as needed. For example, a proportion of the light-emitting area of the deposition unit 121 in the top area of the deposition unit 121 is greater than 94% and less than 100%, such as approximately 95%, 96%, 97%, 98%, or 99%. The deposition units 121 are connected by the conductor layer 123 instead of the lead formed by means of the wire bonding process, so there is no need to provide a pad structure for wire bonding on the deposition unit 121, and the deposition unit 121 may have a large light-emitting area.

In some embodiments, the ratio of a total area occupied by the plurality of deposition units 121 formed on the deposition segment 110*c* of the substrate 110 to an upper surface area of the deposition segment 110*c* of the substrate 110 is 0.94-0.99, such as 94%, 95%, 96%, 97%, 98%, or 99%.

In some embodiments, the conductor layer 123, the first electrode, and the second electrode may all be made of a light-transmitting material, that is, light emitted from the deposition unit 121 is unobstructed. In some embodiments, a proportion of a light-emitting area of a top surface of the deposition unit 121 in the top area of the deposition unit 121 is greater than 94% and less than 100%.

In some embodiments, deposition units may be disposed on the light-emitting diode filament by parameter relationships shown in Table 1 below. In Table 1, the light-emitting diode filament is represented by "filament", and the deposition units are represented by "chips". Table 1 is as follows:

| Number of chips | Filament length (mm) | Filament width (mm) | Chip length (mil) | Chip width (mil) | Voltage (V) | Current (mA) | Luminous flux (lm) |
|---|---|---|---|---|---|---|---|
| 24 | 26 | 1.5 | 16 | 6 | 128-135 | 10 | 185 |
| 24 | 38 | 1.5 | 14 | 6 | 64-68 | 15 | 145 |
| 24 | 39 | 3.0 | 18 | 9 | 64-68 | 20 | 233 |
| 24 | 53 | 1.5 | 15 | 7 | 64-68 | 20 | 218 |
| 24 | 53 | 3.0 | 25 | 10 | 64-68 | 25 | 290 |
| 24 | 68 | 1.5 | 15 | 7 | 64-68 | 20 | 220 |
| 38 | 68 | 3.0 | 28 | 12 | 100-108 | 25 | 410 |
| 38 | 68 | 8.0 | 30 | 10 | 100-108 | 25 | 450 |
| 76 × 2 | 88 | 8.0 | 30 | 10 | 205-210 | 25 | 700 |
| 76 × 3 | 115 | 8.0 | 30 | 10 | 205-210 | 25 | 900 |

Figure 7A:
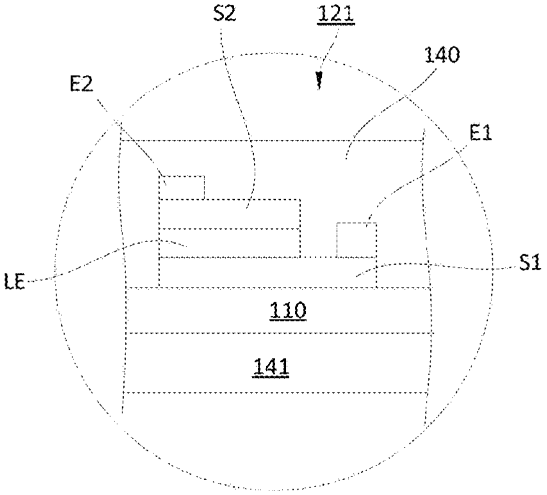
FIG. 7*a* shows a schematic structural diagram of a deposition unit in an embodiment of the present application.

Reference is made to FIG. 7*a*, which shows a schematic structural diagram of a deposition unit in an embodiment of the present application. As shown in the figure, each deposition unit 121 in the plurality of deposition units 121 includes a first semiconductor layer S1, a first electrode E1, a second semiconductor layer S2, a second electrode E2, and a light-emitting layer LE formed between the first semiconductor layer S1 and the second semiconductor layer S2.

As shown in FIG. 7*a*, the first semiconductor layer S1 of the deposition unit 121 is formed on the substrate 110; the light-emitting layer LE is formed on the first semiconductor layer S1, and the second semiconductor layer S2 is formed on the light-emitting layer LE; the first electrode E1 is formed on the first semiconductor layer S1 and is spaced apart from the light-emitting layer LE; and the second electrode E2 is formed on the second semiconductor layer S2. In a state where electrical energy is applied between the second electrode E2 and the first electrode E1, the light-emitting layer LE formed between the first semiconductor layer S1 and the second semiconductor layer S2 generates photons.

The deposition unit 121 including the first semiconductor layer S1, the first electrode E1, the second semiconductor layer S2, the second electrode E2, and the light-emitting layer LE formed between the first semiconductor layer S1 and the second semiconductor layer S2 is regarded as a light-emitting diode (LED) unit, with a light-emitting principle that a forward voltage is applied to two electrodes and a forward current is applied to a PN junction of a semiconductor. When the forward current passes through the PN junction, carriers (electrons and holes) move. Holes in a P-type region move towards an N-type region, and electrons in the N-type region formed from an N-type semiconductor material move towards the P-type region formed from a P-type semiconductor material. In this process, injected carriers are recombined, and an energy difference before and after recombination will be released in the form of light.

In an embodiment, the first electrode E1 and the second electrode E2 of the deposition unit 121 are disposed on one side away from the substrate 110. Specifically, the first electrode E1 of one deposition unit 121 is connected to the second electrode E2 of another deposition unit 121 by the conductor layer 123 to implement electrical connection. The light-emitting diode of the deposition unit 121 provided in the present application is not provided with a base or a base seat for chip packaging, but is directly formed on the substrate 110 by means of the deposition process, thereby reducing the overall thickness of the light-emitting diode filament 100.

In the present application, the first semiconductor layer S1 and the second semiconductor layer S2 have different conductivity types. For example, in an embodiment, the material of the first semiconductor layer S1 is the N-type semiconductor material, and correspondingly, the material of the second semiconductor layer S2 is the P-type semiconductor material. For example, the first semiconductor layer S1 is N-type doped gallium nitride (N-GaN), correspondingly the second semiconductor layer S2 is P-type doped gallium nitride (P-GaN), and a material of the light-emitting layer LE is indium gallium nitride (InGaN).

As shown in FIG. 7*a*, the deposition unit 121 includes a light-emitting or active region sandwiched between the N-type semiconductor material and the P-type semiconductor material, namely the aforementioned light-emitting layer LE. In the fabrication process for the light-emitting diode filament 100, the N-type semiconductor material may be first grown on the sapphire substrate 110. The N-type semiconductor material may include a plurality of layers with different compositions and dopant concentrations, such as preparation layers such as buffer layers or nucleation layers, and/or layers designed to promote the removal of the growth substrate, which may be N-type or unintentionally doped, and N-type device layers designed to obtain specific optical, material, or electrical properties that are desirable for efficient light emission in a light-emitting region.

The light-emitting or active region is grown on the N-type semiconductor material to form the light-emitting layer LE. Examples of the suitable light-emitting layer LE include a single thick or thin light-emitting layer LE, or a multi-quantum well light-emitting region including a plurality of thin or thick light-emitting layers separated by a barrier layer. Then, the P-type semiconductor material may be grown on the light-emitting layer LE. Similar to the N-type semiconductor material, the P-type semiconductor material may include a plurality of layers with different compositions, thicknesses, and dopant concentrations, including unintentionally doped layers.

After the growth of the first semiconductor layer S1 and the second semiconductor layer S2, part of the second semiconductor layer S2 and the light-emitting layer LE are removed by means of the mask and etching process or the photoetching process to expose a part of the first semiconductor layer S1. Then, the first electrode E1 is formed on the surface of the exposed part of the N-type semiconductor material and the second electrode E2 is formed on the surface of the retained P-type semiconductor material. In an embodiment, the first electrode E1 may be referred to as an N electrode, and the second electrode E2 may be referred to as a P electrode. In this embodiment, the N electrode and the P electrode between the adjacent deposition units 121 are electrically isolated from each other by a gap. The gap may be filled with a dielectric such as silicon oxide or any other suitable material. The N electrode and the P electrode between the adjacent deposition units 121 are electrically connected by the conductor layer 123. The gap may be filled with a dielectric material or different solid materials, or may be unfilled and isolated by air.

In an embodiment, the first electrode E1 as the N electrode or the second electrode E2 as the P electrode may include one or more conducting layers, such as reflective metals and protective metals, which may prevent or reduce the electromigration of the reflective metals. The reflective metal is usually silver, but may include any one or more suitable materials.

In the process of fabricating the N electrode, a plurality of N electrode via holes may also be formed. The N electrode and the P electrode are not limited to the arrangement shown in FIG. 7*a*. The N electrode and the P electrode may be redistributed to form a bonding pad with a dielectric/metal lamination.

In the above embodiment, the first electrode E1 as the N electrode or the second electrode E2 as the P electrode may be made of, for example, gold, copper, alloy, or any other suitable material formed by means of plating or any other suitable technology.

In an embodiment, in the method for fabricating the first electrode E1 as the N electrode or the second electrode E2 as the P electrode, an electron beam vacuum evaporation coating process is performed to form the first electrode E1 on the surface of the exposed part of the N-type semiconductor material and form the second electrode E2 on the surface of the retained P-type semiconductor material separately.

In an embodiment, in the method for fabricating the first electrode E1 as the N electrode or the second electrode E2 as the P electrode, by means of the sputter coating process, the first electrode E1 is formed on the surface of the exposed part of the N-type semiconductor material and the second electrode E2 is formed on the surface of the retained P-type semiconductor material separately. In this embodiment, the sputter coating process is, for example, ion beam sputtering or cathode sputtering.

Figure 7B:
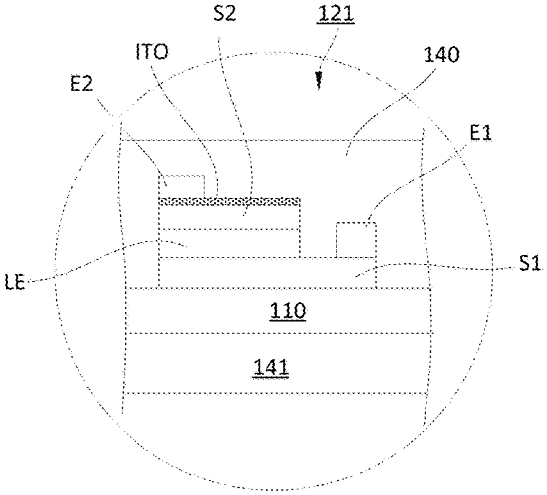
FIG. 7*b* shows a schematic structural diagram of a deposition unit in another embodiment of the present application.

In some embodiments, the N electrode or the P electrode may include a transparent electrode that can conduct electricity and transmit light. Reference is made to FIG. 7*b*, which shows a schematic structural diagram of a deposition unit in another embodiment of the present application. As shown in the figure, in this embodiment, the transparent electrode may be an indium tin oxide (ITO for short) or tin doped indium oxide thin film or layer (i.e., ITO shown in FIG. 7*b*). In an embodiment where the ITO thin film or layer is used as an electrode contact layer, the ITO thin film or layer is most usually deposited on the surface by means of electron beam evaporation, physical vapor deposition, or some sputter deposition technologies.

In some embodiments, since the ITO thin film or the ITO layer cannot be used as the pad, in the specific fabrication process, first, ohmic electrodes (also referred to as electrode contacts or ohmic contacts) need to be fabricated on the surfaces of the first and second semiconductor materials, then the surface of the ohmic electrode is covered by an ITO thin film or layer, and the surface of the ITO thin film or layer is evaporated with a layer of metal pad to form the P electrode or the N electrode. In this way, the current flowing through the deposition unit 121 is uniformly distributed on the ohmic contact electrodes through the ITO thin film or layer. Meanwhile, the refractive index of the ITO thin film or layer is between the refractive index of air and the refractive index of the deposition material, so that the light-emitting angle and the luminous flux can be improved.

In some embodiments, the conductor layer 123 configured to connect two deposition units 121 may be directly deposited on the ITO thin film or layer. In the specific fabrication process, first, ohmic electrodes (also referred to as electrode contacts or ohmic contacts) need to be fabricated on the surfaces of the first and second semiconductor materials, then the surface of the ohmic electrode is covered by an ITO thin film or layer, and the surface of the ITO thin film or layer is evaporated with a conductor layer 123 to connect two adjacent deposition units 121, so that the overall thickness of the filament may be further reduced, and the current of the deposition unit 121 is uniformly distributed on the ohmic contact electrodes through the ITO thin film or layer. Meanwhile, the refractive index of the ITO thin film or layer is between the refractive index of air and the refractive index of the deposition material, so that the refractive indexes of the deposition material, the ITO thin film, and the air change sequentially (e.g., progressively increase or progressively decrease), thereby improving the light-emitting angle and the luminous flux.

Reference is made to FIG. 6 again. In the embodiment of FIG. 6, the connecting layer 122 is formed between the adjacent deposition units 121 on the substrate 110, so that the plurality of deposition units 121 form the continuous strip-shaped structure on the substrate 110. The "continuous strip-shaped structure" refers to the absence of a gap or an obvious step or segment in physical structure between the plurality of deposition units formed on the substrate by means of deposition, so that the fabricated light-emitting diode filament 100 is in a chip strip structure as a whole, thereby strengthening the strength of the overall structure of a chip strip and ensuring that the electrical connection between the deposition units will not be broken due to "disconnection".

Figure 8:
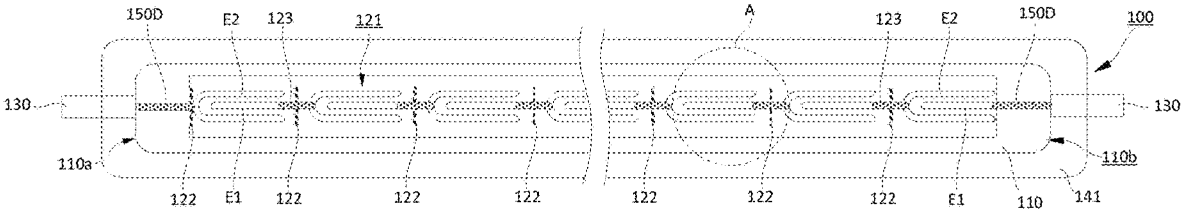
FIG. 8 shows a schematic diagram where a connecting layer is formed between adjacent deposition units on a substrate in an embodiment of the present application.

Reference is made to FIG. 8, which shows a schematic diagram where a connecting layer is formed between adjacent deposition units on a substrate in an embodiment of the present application. In the embodiments of FIG. 6 and FIG. 8, not only is a connecting layer 122 formed between the adjacent deposition units 121 on the substrate 110, but also a connecting layer 122 is disposed on an outer side of the deposition unit 121 adjacent to the first end 110*a* of the substrate 110 to form a protective layer, thereby isolating the contact between the electrode connection layer 150D and the first semiconductor layer S1, the light-emitting layer LE, and the second semiconductor layer S2 of the deposition unit 121.

In an embodiment, the ratio of the height of the connecting layer 122 to the height of the deposition unit 121 is 0.80-1.20. In other words, to enable the fabricated light-emitting diode filament 100 to be in the chip strip structure as a whole, in the process of fabricating the light-emitting diode filament 100, the height of the connecting layer 122 fabricated by means of the deposition process is almost approximate to or the same as the height of the deposition unit 121, so that there is no gap or significant height difference in physical structure between the plurality of deposition units 121. Specifically, the ratio of the height of the connecting layer 122 to the height of the deposition unit 121 is 0.80, 0.90, 1.00, 1.10, or 1.20.

Figure 9:
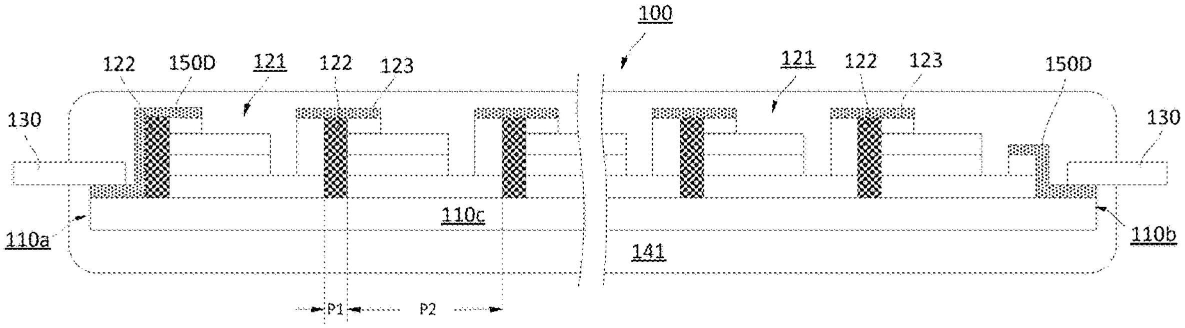
FIG. 9 shows a schematic side view of a structure of a light-emitting diode filament in another embodiment of the present application.

To ensure that the fabricated light-emitting diode filament 100 may provide more lumens or better heat dissipation efficiency in unit length, in an embodiment of the present application, as many deposition units 121 as possible are disposed by controlling the distance between the adjacent deposition units 121. Reference is made to FIG. 9, which shows a schematic side view of a structure of a light-emitting diode filament in another embodiment of the present application. In the embodiment of FIG. 9, the ratio of a first length of the connecting layer 122 along the length direction of the substrate 110 to a second length of each deposition unit 121 along the length direction of the substrate 110 is 0.05-0.30, and may also be represented as 0.05 P2≤P1≤0.3 P2. When the ratio of the first length P1 to the second length P2 is within the above range, the light-emitting diode filament 100 may maintain better heat dissipation efficiency and light-emitting area.

Specifically, in the case where the second length P2 of the deposition unit 121 along the length direction of the substrate 110 is a unit length of 1, the first length P1 of the connecting layer 122 along the length direction of the substrate 110 is a unit length of 0.05-0.30. The unit length of the first length P1 of the connecting layer 122 along the length direction of the substrate 110 may be, for example, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, or 0.30.

For example, in corresponding to the parameters listed in Table 1 above, due to different lengths of fabricated light-emitting diode filaments and different numbers of arranged deposition units (LED chips), the second length P2 of the deposition unit 121 along the length direction of the substrate 110 may be 14 mil, 15 mil, 16 mil, 18 mil, 25 mil, 28 mil, or 30 mil, or may be within a range from 5 mil to 40 mil or a range from 0.1 mm to 1 mm; and the value of the connecting layer 122 may be set with reference to the relationship of 0.05 P2≤P1≤0.3 P2 to achieve the corresponding length.

In an embodiment, the first length P1 of the connecting layer 122 along the length direction of the substrate 110 ranges from 0.03 mm to 0.30 mm, such as 0.03 mm, 0.04 mm, 0.05 mm, 0.06 mm, 0.07 mm, 0.08 mm, 0.09 mm, 0.10 mm, 0.11 mm, 0.12 mm, 0.13 mm, 0.14 mm, 0.15 mm, 0.16 mm, 0.17 mm, 0.18 mm, 0.19 mm, 0.20 mm, 0.21 mm, 0.22 mm, 0.23 mm, 0.24 mm, 0.25 mm, 0.26 mm, 0.27 mm, 0.28 mm, 0.29 mm, or 0.30 mm. When the first length is within the above range, more deposition units 121 may be disposed in unit length of the light-emitting diode filament 100 to improve the lumen that can be provided in unit length of the filament.

Figure 10:
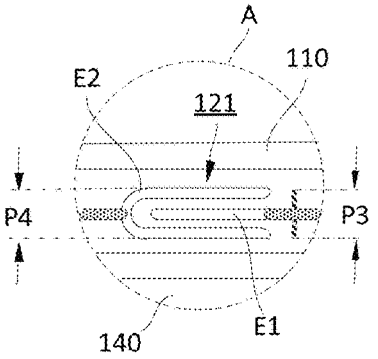
FIG. 10 shows a schematic enlarged view of a part A in FIG. 8.

To enable the fabricated light-emitting diode filament 100 to be in the chip strip structure as a whole, in the process of fabricating the light-emitting diode filament 100, the width of the connecting layer 122 fabricated by means of the deposition process is almost approximate to or the same as the width of the deposition unit 121. In an embodiment, a first width of the connecting layer 122 along the width direction of the substrate 110 is equal to a second width of each deposition unit 121 along the width direction of the substrate 110. Reference is made to FIG. 10, which shows a schematic enlarged view of part A in FIG. 8. As shown in the figure, the first width P3 of the connecting layer 122 along the width direction of the substrate 110 is almost equal to the second width P4 of the deposition unit 121 along the width direction of the substrate 110, so that the fabricated light-emitting diode filament 100 is in the chip strip structure as a whole. For example, in corresponding to the parameters listed in Table 1 above, due to different lengths of fabricated light-emitting diode filaments and different numbers of arranged deposition units (LED chips), the second width P4 of the deposition unit 121 along the width direction of the substrate 110 may be 6 mil, 7 mil, 9 mil, 10 mil, or 12 mil, or may be within a range from 1 mil to 20 mil or a range from 0.05 mm to 1 mm; and the first width P3 of the connecting layer 122 along the width direction of the substrate 110 may be set according to the second width P4 to obtain the connecting layer 122.

In an embodiment, the deposition units 121 on two sides of the connecting layer 122 are electrically connected in a manner that the connecting layer 122 is covered with the formed conductor layer 123. In this embodiment, the conductor layer 123 is located on an upper surface of the connecting layer 122, so that the conductor layer 123 between two adjacent deposition units 121 may be attached to the connecting layer 122.

In another embodiment, the deposition units 121 on two sides of the connecting layer 122 are electrically connected in a manner that the formed conductor layer 123 penetrates through the connecting layer 122. In this embodiment, both the upper and lower surfaces of the conductor layer 123 are in contact with the connecting layer 122. In the fabrication process, it is possible to first form the connecting layer 122 between the adjacent deposition units 121 by means of the deposition process, then form the conductor layer 123 on the connecting layer 122 by means of the deposition process to electrically connect the adjacent deposition units 121 on two sides of the connecting layer, and cover the conductor layer 123 with the connecting layer 122 by means of the deposition process to embed the conductor layer 123 therein, so that the firmness of electrical connection between the adjacent deposition units 121 is strengthened, and the fabricated light-emitting diode filament 100 that is in the chip strip structure as a whole has more stable consistency.

In an embodiment, the conductor layer 123 for electrically connecting two adjacent deposition units 121 has a more stable connecting structure. During fabrication of the connecting layer 122, the fabricated connecting layer 122 may be used to support or bear the conductor layer 123, so that the conductor layer 123 between two adjacent deposition units 121 may be attached to the connecting layer 122. For example, in the embodiment of FIG. 6, the conductor layer 123 may be attached to the connecting layer 122 and electrically connects the deposition units 121 on two sides.

In an embodiment, the connecting layer 122 is made of an electrical isolation material, for example, the material of the connecting layer 122 includes an insulating material or a high-resistance material. In some embodiments, the insulating material includes oxides, nitrides, nitrogen oxides, or carbides, such as silicon oxide, silicon nitride, titanium oxide, or a combination thereof, but is not limited to this.

In some embodiments, the connecting layer 122 may also serve as a protective layer, which is implemented as an electrical protective layer to implement electrical isolation between the adjacent deposition units 121. Certainly, the connecting layer may also be referred to as an electrical isolation layer or a dielectric layer. The protective layer is disposed between the adjacent deposition layers to electrically isolate the adjacent deposition units 121, so as to avoid short circuit caused by contact between the adjacent deposition units 121.

In an embodiment, the connecting layer 122 is made of a thermally conductive material. In this embodiment, the material of the connecting layer 122 includes, for example, a material with better heat dissipation performance than the deposition unit 121, such as glass, which fills the empty region between the adjacent deposition units 121, and provides a fast heat dissipation path for the deposition unit 121 due to the contact between the connecting layer 122 and the conductor layer 123. For example, the heat generated by the deposition unit 121 may be dissipated upwards through the conductor layer 123, or may be dissipated laterally through the connecting layer 122 and the conductor layer 123. In other words, the connecting layer 122 and the conductor layer 123 provide high heat dissipation efficiency, thereby improving the overall heat dissipation performance of the light-emitting diode filament 100.

When the photons generated by the adjacent deposition units 121 enter the region therebetween, a part of the photons will be absorbed, or a part of the photons are not reflected to cause the optical loss. In view of this, in an embodiment, the connecting layer 122 may be made of a light-transmitting or light reflecting material. In this embodiment, the material of the connecting layer 122 includes, for example, a material with the light reflecting or light-transmitting performance such as glass, thereby avoiding unnecessary optical loss, and improving the light-emitting performance of the light-emitting diode filament 100.

The adjacent deposition units 121 on the substrate 110 of the light-emitting diode filament 100 in the present application are electrically connected by the conductor layer 123. In an embodiment, the adjacent deposition units 121 are connected in series in a manner that one end of the conductor layer 123 formed by means of the deposition process is electrically connected to the first electrode E1 of the deposition unit 121 on one side, and the other end of the conductor layer is connected to the second electrode E2 of the deposition unit 121 on the other side, as shown in FIG. 8. In the present application, due to the formation of the conductor layer 123 by means of the deposition process, the thickness of an electrical connection structure between the deposition units 121 in the present application is smaller than the thickness of the lead formed by means of the conventional wire bonding process (the wire in wire bonding needs to maintain an arc-shaped segment, thus leading to large overall thickness), thereby reducing the overall thickness of the light-emitting diode filament 100. In addition, the formation of the conductor layer 123 by means of the deposition process in the present application may avoid wire falling or breakage. Meanwhile, the plurality of deposition units 121 are electrically isolated only by the connecting layer 122, and the connecting layer 122 is also achieved by means of the deposition process. The plurality of deposition units 121 form an integrated structure with the connecting layer 122 for electrical isolation, so that more deposition units 121 may be disposed in unit length of the light-emitting diode filament 100 to improve the lumen in unit length of the light-emitting diode filament 100.

In an embodiment, the length of the light-emitting diode filament 100 (i.e., the length of the substrate) is 83 mm, the deposition units 121 are connected by the conductor layer 123, the thickness of the connecting layer 122 between the deposition units 121 along the length direction of the filament is controlled to 0.02-0.3 mm, and the number of deposition units 121 may be 100. In a comparative example, if the length of the light-emitting diode filament 100 is also 83 mm, the deposition units 121 are connected by means of wire bonding, the distance between the deposition units 121 needs to be set to 0.3-1 mm, and the number of deposition units 121 is 50. From this, it can be seen that the number of deposition units 121 in unit length of the light-emitting diode filament 100 in the above embodiment is twice that in the comparative example, so that nearly twice the lumen may be provided. Similarly, it can be proven that with the same number of deposition units 121, the length of the light-emitting diode filament 100 in the embodiment may be shortened to nearly half that in the comparative example, that is, only 0.5 times the length in the wire bonding process is required.

In an embodiment, the material of the conductor layer 123 includes conductive materials such as copper, gold, silver, and alloy, but is not limited to this.

Figure 11A:
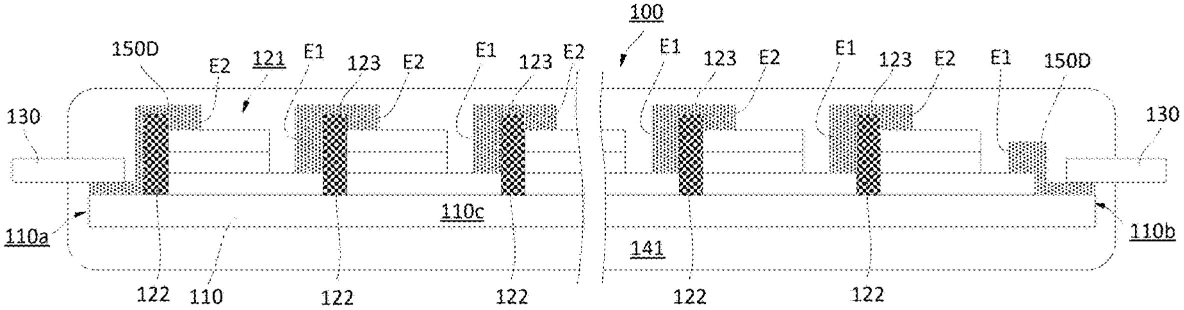
FIG. 11*a* shows a schematic diagram where a conductor layer and an electrode are formed in an embodiment of the present application.

In an embodiment where the conductor layer 123 is fabricated, the conductor layer 123 and the first electrode E1 and the second electrode E2 of each deposition unit 121 are formed by means of a one-time deposition process. In this embodiment, in the method for fabricating the first electrode E1 as the N electrode or the second electrode E2 as the P electrode, the electron beam vacuum evaporation coating process or the sputter coating process is performed to form the first electrode E1 on the surface of the exposed part of the N-type semiconductor material and form the second electrode E2 on the surface of the retained P-type semiconductor material separately, or the electron beam vacuum evaporation coating process or the sputter coating process is performed to fabricate the conductor layer 123, so that each segment of the conductor layer 123 can be directly integrated with the electrodes of the deposition units 121 on two sides, thereby stabilizing the electrical connection between the deposition units 121, and ensuring that the fabricated light-emitting diode filament 100 being in the chip strip structure as a whole has more stable consistency. Reference is made to FIG. 11*a*, which shows a schematic diagram where a conductor layer and an electrode are formed in an embodiment of the present application. As shown in the figure, the conductor layer 123 and the first electrode E1 and the second electrode E2 of each deposition unit 121 are integrally formed by means of the one-time deposition process, so that there is no obvious boundary in structure.

In an embodiment where the conductor layer 123 is fabricated, the conductor layer 123 and the first electrode E1 and the second electrode E2 of each deposition unit 121 are formed from a same material by means of the deposition process. The conductor layer 123, the first electrode E1, and the second electrode E2 may be formed simultaneously by means of the deposition process, for example, as shown in the embodiment of FIG. 11*a*. The deposition process may include, for example, a chemical vapor deposition process, an atomic layer deposition process, and a physical vapor deposition process, but is not limited to this.

For example, in the embodiment of FIG. 11*a*, the conductor layer 123 and the first electrode E1 and the second electrode E2 of each deposition unit 121 are formed from the same material by means of the deposition process. The first electrode E1 and the second electrode E2 of each deposition unit 121 may be fabricated with the ITO thin film or the ITO layer, and the conductor layer 123 may be fabricated together. The conductor layer forms the electrode connection layer 150D. The ITO thin film or layer is most usually deposited on the surface by means of electron beam evaporation, physical vapor deposition, or some sputter deposition technologies.

In another embodiment where the conductor layer 123 is fabricated, the conductor layer 123 and the first electrode E1 and the second electrode E2 of each deposition unit 121 are formed from different materials by means of the deposition process. The conductor layer 123, the first electrode E1, and the second electrode E2 are formed separately by means of different deposition processes. The deposition process may include, for example, a chemical vapor deposition process, an atomic layer deposition process, and a physical vapor deposition process, but is not limited to this.

Figure 11B:
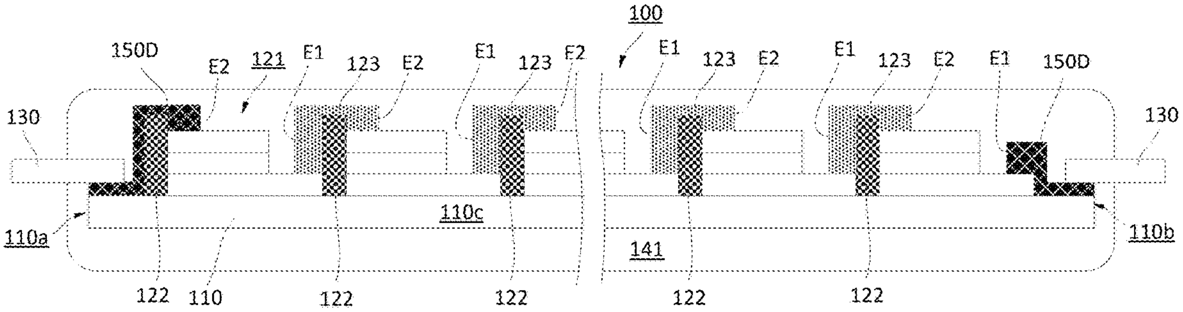
FIG. 11*b* shows a schematic diagram where a conductor layer and an electrode are formed in another embodiment of the present application.

Reference is made to FIG. 11*b*, which shows a schematic diagram where a conductor layer and an electrode are formed in another embodiment of the present application. As shown in the figure, the second electrode E2 of the deposition unit 121 located at the first end 110*a* of the substrate 110, the electrode connection layer 150D electrically connected to the second electrode E2, the first electrode E1 of the deposition unit 121 located at the second end 110*b* of the substrate 110, and the electrode connection layer 150D electrically connected to the first electrode E1 are made of the same material such as copper, gold, silver, or alloy, or are fabricated by means of the same deposition process, so that the electrical connection with the filament electrodes 130 at the first end 110*a* and the second end 110*b* of the substrate 110 is better implemented. The conductor layer 123 between the adjacent deposition units 121 on the substrate 110 is made of another material or is fabricated by means of another same process. In this embodiment, the conductor layer 123 between the adjacent deposition units 121 is fabricated with, for example, the ITO thin film or the ITO layer.

As in the above embodiment, the adjacent deposition units 121 on the substrate 110 are electrically connected by the conductor layer 123, so that the distance between the light-emitting diodes fabricated with the deposition units 121 may be shortened, thereby ensuring that more deposition units 121 may be disposed in unit length of the light-emitting diode filament 100 to improve the lumen of the light-emitting diode filament 100 in unit length. In view of this, in an embodiment, the length of the conductor layer 123, formed between the adjacent deposition units 121 by means of the deposition process, along the length direction of the substrate 110 may be configured to be 0.03 mm to 0.30 mm. In some embodiments, the length may be, for example, 0.03 mm, 0.04 mm, 0.05 mm, 0.06 mm, 0.07 mm, 0.08 mm, 0.09 mm, 0.10 mm, 0.11 mm, 0.12 mm, 0.13 mm, 0.14 mm, 0.15 mm, 0.16 mm, 0.17 mm, 0.18 mm, 0.19 mm, 0.20 mm, 0.21 mm, 0.22 mm, 0.23 mm, 0.24 mm, 0.25 mm, 0.26 mm, 0.27 mm, 0.28 mm, 0.29 mm, or 0.30 mm.

In an embodiment, a third width of the conductor layer 123 along the width direction of the substrate 110 is less than the second width of the deposition unit 121 along the width direction of the substrate 110, thereby reducing the obstruction of light emitted from the deposition unit 121 by the conductor layer 123, as shown in FIG. 8. For example, in some specific examples, the third width of the conductor layer 123 along the width direction of the substrate 110 is 0.5-10.0 mm. The third width may be approximately 1.5 mm, 2.0 mm, 2.5 mm, 3.0 mm, 3.5 mm, 4.0 mm, 4.5 mm, 5.0 mm, 5.5 mm, 6.0 mm, 6.5 mm, 7.0 mm, 7.5 mm, or 8.0 mm.

As shown in the embodiment of FIG. 8, FIG. 9, or FIG. 11*a*, in another embodiment where the conductor layer 123 is fabricated, when the conductor layer 123 formed between the adjacent deposition units 121 is fabricated by means of the deposition process, the conductor layer 123 on the deposition unit 121 adjacent to the first end 110*a* and/or the second end 110*b* of the substrate 110 is formed by means of the deposition process to obtain the electrode connection layer 150D respective, so as to realize electrical connection with the filament electrode at each ends of the substrate 110. That is to say, in this embodiment, the conductor layer 123 formed between the adjacent deposition units 121 and the electrode extension end 150D of the deposition units 121 adjacent to two ends of the substrate 110 are obtained by means of a one-time fabrication process. In some embodiments, the materials of the electrode connection layer 150D and the conductor layer 123 that are obtained by means of the one-time fabrication process are same. The material of the electrode extension end 150D includes conductive materials such as copper, gold, silver, and alloy, but is not limited to this.

In an embodiment, the materials of the conductor layer 123 formed between the deposition units 121, the conductor layer 123 formed on the deposition unit 121 adjacent to the first end 110*a* and/or the second end 110*b* of the substrate 110, the first electrode E1, and the second electrode E2 are same. The conductor layer 123, the first electrode E1, and the second electrode E2 may be formed simultaneously by means of the deposition process. The deposition process includes a chemical vapor deposition process, an atomic layer deposition process, and a physical vapor deposition process, but is not limited to this.

In some embodiments, the conductor layer 123 formed between the adjacent deposition units 121 by means of the deposition process may also be referred to as a first conductor layer, the conductor layer 123 formed closed to the deposition unit 121 adjacent to the first end 110*a* and/or the second end 110*b* of the substrate 110 by means of the deposition process may also be referred to as a second conductor layer, and the second conductor layer is the electrode connection layer 150D.

The filament electrode 130 is disposed at the first end 110*a* and/or the second end 110*b* of the substrate 110 and is electrically connected to the deposition unit 121 adjacent to the first end 110*a* and the second end 110*b* of the substrate 110. For example, in the embodiments of FIG. 1*a*, FIG. 1*b*, FIG. 4, FIG. 5, FIG. 6, FIG. 8, FIG. 9, FIG. 11*a*, and FIG. 11*b*, the filament electrodes 130 are disposed at the first end 110*a* and the second end 110*b* of the substrate 110. In the embodiments of FIG. 2 and FIG. 3, the filament electrodes 130 are disposed at the same end of the substrate 110.

In an embodiment, the filament electrode 130 may be disposed at the first end 110*a* and/or the second end 110*b* of the substrate 110 by a packaging structure of the light-emitting diode filament 100. The packaging structure is, for example, a light conversion layer configured to package the entire filament strip. In this embodiment, the packaging structure is, for example, a first light conversion layer. In some cases, the packaging structure is also referred to as a glue sealing layer.

Figure 12:
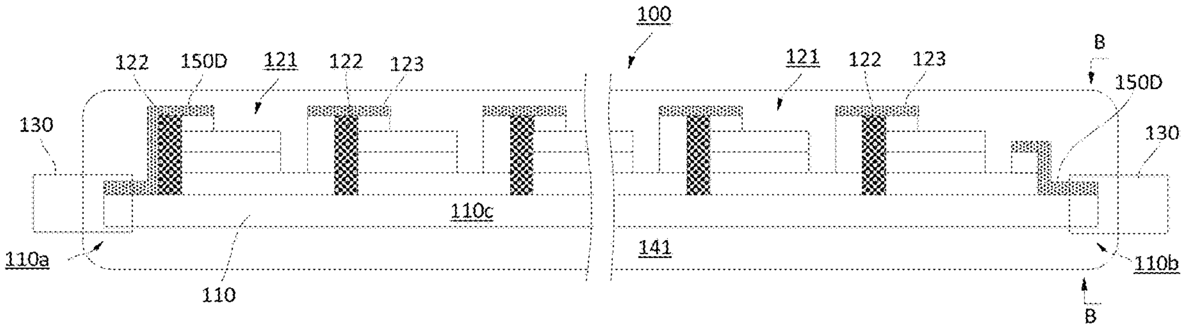
FIG. 12 shows a schematic side view of a structure of a light-emitting diode filament in yet another embodiment of the present application.
Figure 13:
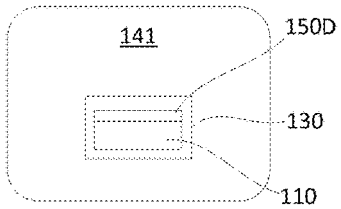
FIG. 13 shows a schematic diagram of a section B-B in FIG. 12.

In yet another embodiment, the filament electrode 130 may be configured as a conductive ring or a conductive sleeve. Reference is made to FIG. 12, which shows a schematic side view of a structure of a light-emitting diode filament in yet another embodiment of the present application. As shown in the figure, conductive rings are disposed on the first end 110*a* and the second end 110*b* of the substrate 110 to serve as filament electrodes 130. Taking the first end 110*a* of the substrate 110 as an example, the conductive ring as the filament electrode 130 is sleeved at the first end 110*a* of the substrate 110, and the first end 110*a* of the substrate 110 and the electrode connection layer 150D formed at the first end 110*a* of the substrate 110 are electrically connected, thereby ensuring that the electrode connection layer 150D and the filament electrode 130 have a larger contact area, as shown in FIG. 13. FIG. 13 shows a schematic diagram of a section B-B in FIG. 12. As shown in the figure, the conductive ring as the filament electrode 130 wraps the first end 110*a* of the substrate 110 and the electrode connection layer 150D thereon, thereby ensuring that the electrode connection layer 150D and the filament electrode 130 have a larger contact area, and facilitating the electrical connection between the filament electrode 130 and a peripheral component such as a conductive bracket or a driving circuit.

For example, the conductive ring or the conductive sleeve is fabricated with a metal sheet, so as to be wound or sleeved at each of two ends of the substrate 110 to serve as the filament electrode 130 when electrically connected to the deposition unit 121 adjacent to the first end 110*a* and/or the second end 110*b* of the substrate 110. In a specific implementation, the metal sheet is, for example, a copper sheet, an aluminum sheet, or another metal sheet with conductivity.

Figure 14:
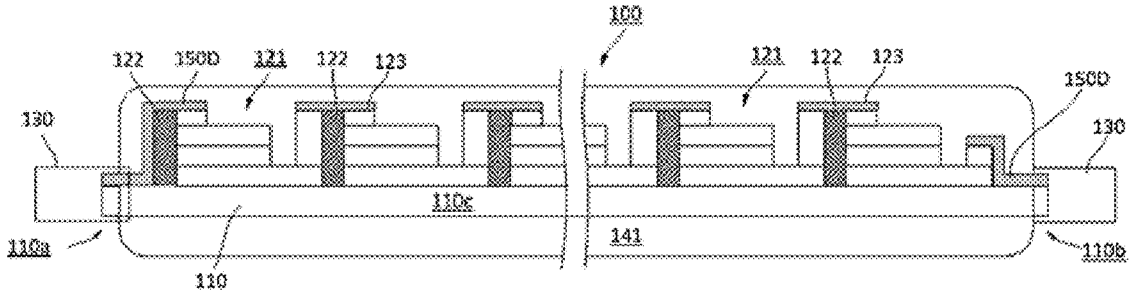
FIG. 14 shows a schematic diagram of a packaging form of a light-emitting diode filament in an embodiment of the present application.

In yet another embodiment where the filament electrode 130 is the conductive ring or the conductive sleeve, the packaging structure configured to package the light-emitting diode 100 may not completely package the substrate 110 therein. Reference is made to FIG. 14, which shows a schematic diagram of a packaging form of a light-emitting diode filament in an embodiment of the present application. As shown in the figure, the packaging structure (i.e., the light conversion unit 140 in the figure or the first light conversion layer 141 described later) completely packages the plurality of deposition units 121 and conductor layers 123 that are formed on the substrate 110 therein. The first end 110*a* and the second end 110*b* of the substrate 110 and a part of the electrode connection layer 150D at the first end 110*a* and the second end 110*b* of the substrate 110 and on the substrate are not wrapped by the packaging structure, and the conductive rings disposed at the first end 110*a* and the second end 110*b* of the substrate 110 to serve as a part of the filament electrodes 130 are also not wrapped by the packaging structure.

In an embodiment, the filament electrode 130 is configured to be electrically connected to the conductive bracket, so as to receive power from the driving circuit. The connection between the filament electrode 130 and the conductive bracket may be a mechanical compression connection or a soldering connection. For the mechanical connection, the conductive bracket may pass through a specific through hole formed in the filament electrode 130 first, and then a free end of the conductive bracket may be folded reversely, so that the conductive bracket clamps the electrode and forms an electrical connection. For the soldering connection, the conductive bracket may be connected to the filament electrode 130 by means of silver based alloy soldering, silver soldering, soldering, tin soldering, or the like.

Figure 15A:
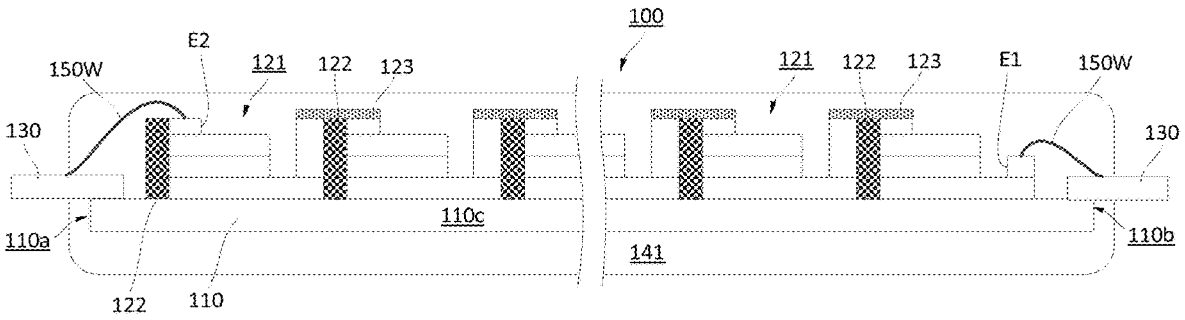
FIG. 15*a* shows a schematic diagram where a deposition unit is electrically connected to a filament electrode by a lead in an embodiment of the present application.

In an embodiment, the deposition unit adjacent to the first end and/or the second end of the substrate is electrically connected to the filament electrode of the substrate by the lead formed by means of the wire bonding process. Reference is made to FIG. 15*a*, which shows a schematic diagram where a deposition unit is electrically connected to a filament electrode by a lead in an embodiment of the present application. As shown in the figure, in this embodiment, the filament electrodes 130 are electrically connected to the electrodes of the deposition units 121 at two ends of the substrate 110 by the leads 150W formed by means of the wire bonding process. At the first end 110*a* of the substrate 110, one end of the lead 150W is electrically connected to the second electrode E2 of the deposition unit 121, and the other end is connected to the filament electrode 130 at the first end 110*a* of the substrate 110. At the second end 110*b* of the substrate 110, one end of the lead 150W is electrically connected to the first electrode E1 of the deposition unit 121, and the other end is connected to the filament electrode 130 at the second end 110*b* of the substrate 110. In some embodiments, the lead 150W may also be referred to as a wire.

Figure 15B:
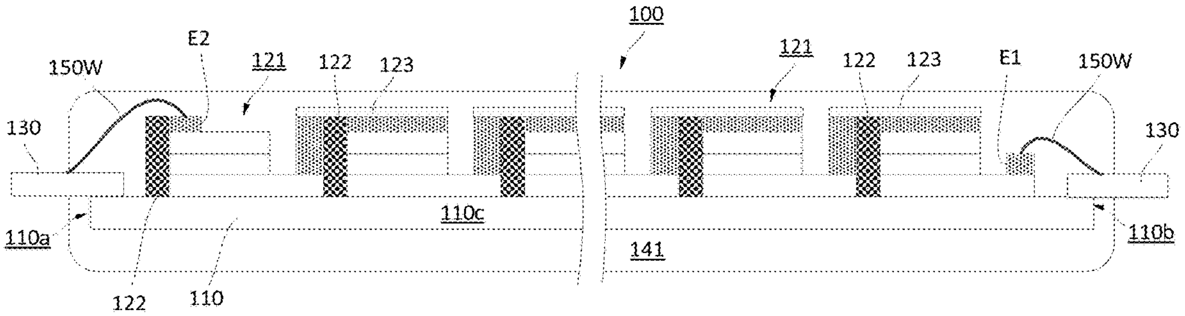
FIG. 15*b* shows a schematic diagram where a deposition unit is electrically connected to a filament electrode by a lead in another embodiment of the present application.

Reference is made to FIG. 15*b*, which shows a schematic diagram where a deposition unit is electrically connected to a filament electrode by a lead in another embodiment of the present application. As shown in the figure, in this embodiment, the second electrode E2 of the deposition unit 121 located at the first end 110*a* of the substrate 110 and the first electrode E1 of the deposition unit 121 located at the second end 110*b* of the substrate 110 are made of the same material such as copper, gold, silver, or alloy, or are fabricated by means of the same deposition process, so that the electrical connection with the filament electrodes 130 at the first end 110*a* and the second end 110*b* of the substrate 110 may be better implemented by the leads 150W. The conductor layer 123 between the adjacent deposition units 121 on the substrate 110 is made of another material or is fabricated by means of another same process. In this embodiment, the conductor layer 123 between the adjacent deposition units 121 is fabricated with, for example, the ITO thin film or the ITO layer.

In another embodiment, the filament electrode 130 may be configured as a metal sheet to be disposed at the first end 110*a* and/or the second end 110*b* of the substrate 110. In a specific implementation, the metal sheet is, for example, a copper sheet, an aluminum sheet, or another metal sheet with conductivity, and has, for example, a structure shown in the embodiments of FIG. 6, FIG. 8, FIG. 9, FIG. 11*a*, and FIG. 11*b*. The deposition unit 121 adjacent to the first end 110*a* and/or the second end 110*b* of the substrate 110 is electrically connected to the filament electrode 130 in a manner that the conductor layer 123 formed by means of the deposition process forms the electrode connection layer 150D separately. In this embodiment, when the conductor layer 123 formed between the adjacent deposition units 121 is fabricated by means of the deposition process, the conductor layer 123 closed to the deposition unit 121 adjacent to the first end 110*a* and/or the second end 110*b* of the substrate 110 is formed by means of the deposition process to obtain the electrode extension end 150D respective, so as to realize electrical connection with the filament electrode 130 at each of two ends of the substrate 110. That is to say, in this embodiment, the conductor layer 123 formed between the adjacent deposition units 121 and the electrode connection layer 150D of the deposition units 121 adjacent to two ends of the substrate 110 are obtained by means of the one-time fabrication process.

To ensure sufficient electrical contact between the filament electrode 130 and the deposition unit 121 adjacent to the first end 110*a* and/or the second end 110*b* of the substrate 110 without open circuit, or to facilitate the configuration of the filament electrodes 130 on two sides of the substrate 110, in the process of fabricating the electrode connection layer 150D, a deposition area of the electrode connection layer 150D may be controlled by means of the deposition process. For example, in some embodiments, the deposition area of the electrode connection layer 150D on the substrate 110 accounts for more than 70% of a deposition area of the deposition unit 121 on the substrate 110 that is adjacent to the first end 110*a* and/or the second end 110*b* of the substrate 110. For example, the deposition area of the electrode connection layer 150D on the substrate 110 accounts for approximately 70%, 75%, 80%, 85%, 90%, 95%, or 100% of the deposition area of the deposition unit 121 adjacent to the end of the substrate 110.

In an embodiment, the electrode connection layer 150D is electrically connected to the filament electrode 130 by means of a soldering or hot melting process.

In another embodiment, the electrode connection layer 150D is formed on an upper surface of the first end 110*a* and/or the second end 110*b* of the substrate 110 to electrically connect the upper surface thereof to the filament electrode 130. For example, after the fabrication of the conductor layer 123 is completed, the fabricated filament electrode 130 is placed on an upper side of the electrode connection layer 150D formed by the conductor layer 123 at each of two ends of the substrate 110, and the filament electrode 130 is fixed on the upper side of the electrode connection layer 150D by means of soldering or hot melting process or directly by means of a glue sealing process to implement electrical connection between the two. The electrode connection layer 150D and the filament electrode 130 at least partially overlap in a thickness direction of the filament, that is, the filament electrode 130 covers at least the electrode connection layer 150D at the tail end of the substrate 110, and the electrode connection layer 150D is located between the substrate 110 and the filament electrode 130, as shown in FIG. 11*b*.

Figure 16:
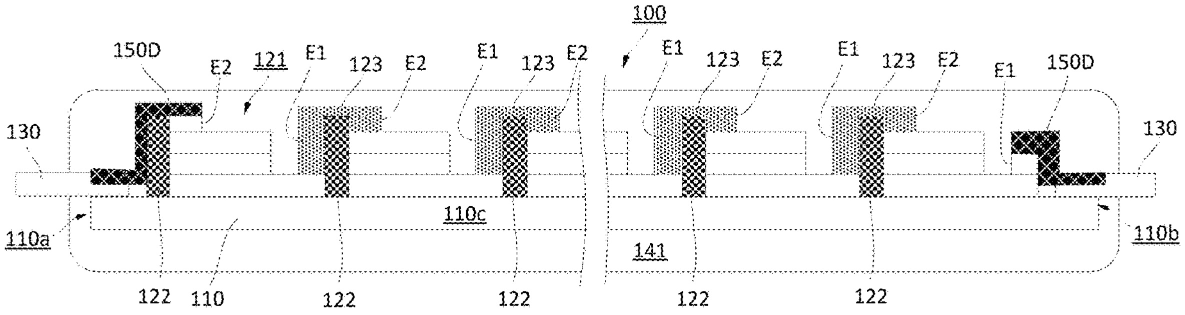
FIG. 16 shows a schematic diagram of connection between a filament electrode and an electrode extension end in an embodiment of the present application.

In some embodiments, the electrode connection layer 150D and the filament electrode 130 at least partially overlap in the thickness direction of the filament, that is, the electrode connection layer 150D covers at least a part of the filament electrode 130, and the filament electrode 130 is located between the electrode connection layer 150D and the substrate 110, as shown in FIG. 16.

The electrode connection layer 150D and the filament electrode 130 do not overlap in the thickness direction of the filament, as shown in a top view of FIG. 1*a*.

In yet another embodiment, all or a part of the electrode extension end is disposed between the substrate and the filament electrode 130 to be electrically connected to the filament electrode. Reference is made to FIG. 16, which shows a schematic diagram of connection between a filament electrode and an electrode extension end in an embodiment of the present application. As shown in the embodiment of FIG. 16, to ensure the stability of connection between the filament electrode 130 and the electrode connection layer 150D, a part of the filament electrode 130 may be disposed between the electrode connection layer 150D and the substrate 110, that is, the configuration of the filament electrode 130 may be implemented by a stacked structure formed by the electrode connection layer 150D, the filament electrode 130, and the substrate 110. For example, in the fabrication process, after the deposition unit 121 is fabricated by means of the deposition process, two filament electrodes 130 are placed at two ends of the substrate 110 and are specifically placed on the upper surface of the substrate 110, and then the conductor layer 123 is fabricated by means of the deposition process, so that the electrode connection layers 150D formed at two ends of the substrate 110 are directly deposited and formed on the upper sides of the filament electrodes 130 to be electrically connected to the filament electrodes 130; and then, the packaging of the entire filament is completed with the assistance of the glue sealing process.

The light-emitting diode filament 100 further includes a first light conversion layer 141. The first light conversion layer 141 wraps the substrate 110, and the plurality of deposition units 121 and conductor layers 123 formed on the substrate 110, and a part of the filament electrode 130. A part of the filament electrode 130 that is not wrapped by the first light conversion layer 141 is exposed to be electrically connected to a conductive bracket, a lamp cap or a lamp holder, or an external power supply device, thereby receiving power from the driving circuit. In the present application, the first light conversion layer 141 may also be referred to as a "light conversion layer" or a "light conversion coating". In a specific embodiment, the light conversion coating may also be referred to as a silica gel layer. The first light conversion layer 141 includes a material capable of absorbing light emitted from the light-emitting layer LE, such as a material that absorbs blue light from the light-emitting layer LE and emits yellow or green light. For example, fluorescent powder configured in the first light conversion layer 141 can absorb certain radiation (such as light), so that the filament electrode 130 can emit required light after being connected to a power supply (a voltage source or a current source).

In an embodiment, the first light conversion layer 141 includes granules/particles/materials distributed therein. In this embodiment, the first light conversion layer 141 includes a plurality of solid granules. The solid granules include fluorescent powder, nanoparticles, namely heat dissipation particles, color rendering particles, or a combination thereof. In a specific embodiment, the granules/particles/materials distributed in the first light conversion layer 141 may be selectively added. The granules/particles/materials are, for example, modifiers (thermocuring agents), light reflecting/diffusing particles, light guide particles, coupling agents (one or more combinations of these may be selected to be added in a top layer and a base layer), defoamers, leveling agents, or adhesives. The heat dissipation particles (also referred to as inorganic oxide nanoparticles) include but are not limited to aluminum oxide, silicon dioxide, magnesium oxide, magnesium carbonate, aluminum nitride, boron nitride, or diamond. The light guide particles are, for example, granules of different sizes made from polymethyl methacrylate (PMMA) or resin, but are not limited to this. In some other embodiments, the particles included in the conductor layer 123, such as particles made of plastic, may further have excellent plastic deformation performance. In this way, the bendability of the conductor layer 123 may be improved. For example, in an embodiment where the substrate 110 is a flexible substrate, the support of the filament during bending may be strengthened.

In some embodiments, the first light conversion layer 141 further includes silica gel, organic silicon modified resin (or organosilicon-modified polyimide), heat dissipation particles, or a combination thereof, but is not limited to this. In some embodiments, the material of the nanoparticles includes aluminum dioxide, silicon dioxide, and titanium dioxide, but is not limited to this. It is worth noting that the nanoparticles may improve the heat dissipation efficiency of the light-emitting diode filament 100, and meanwhile, the nanoparticles have a light scattering effect, thereby reducing the granular sensation of light emitted from the filament. In some embodiments, the solid granules are in contact with each other to form a fast heat dissipation path.

In an embodiment, the fluorescent powder is, for example, a fluorescent glue/fluorescent powder film, including the following components: glue, fluorescent powder, and inorganic oxide nanoparticles. The glue may be, but is not limited to, silica gel. In an embodiment, the glue may contain 10 wt % or less of the above organosilicon-modified polyimide to improve the overall hardness, insulation, thermal stability, and mechanical strength of the filament. The solid content of the organosilicon-modified polyimide may be 5-40 wt %, and the rotational viscosity may be 5-20 Pa·S. The inorganic oxide nanoparticles may be, but are not limited to, aluminum oxide and aluminum nitride particles, may have a particle size of 100-600 nm or 0.1-100 μm, and function to promote heat dissipation of the filament. The inorganic heat dissipation particles added may have various particle sizes.

In an embodiment, the organosilicon-modified polyimide may be replaced with an organosilicon-modified polyimide resin composition. The inorganic oxide nanoparticles may be, but are not limited to, aluminum oxide and aluminum nitride particles, may have a particle size of 100-600 nm or 0.1-100 μm, and function to promote heat dissipation of the filament. The inorganic heat dissipation particles added may have various particle sizes.

In an embodiment, the first light conversion layer 141 may be formed by a composition containing organosilicon-modified polyimide. In addition to meeting the above characteristics, by adjusting the types and content of a main material, a modifier, and an additive in the specific or partial composition to adjust the characteristics of a base material of the filament, or the light conversion layer, the composition may meet special environmental requirements.

In another embodiment, the first light conversion layer 141 may be formed by an organosilicon-modified polyimide resin composition. The organosilicon-modified polyimide resin composition includes the above organosilicon-modified polyimide and thermocuring agent. The thermocuring agent is epoxy resin, isocyanate, or a bisoxazoline compound. In an embodiment, based on the weight of the organosilicon-modified polyimide, the usage amount of the thermocuring agent is 5-12% of the weight of the organosilicon-modified polyimide, such as 5%, 6%, 7%, 8%, 9%, 10%, 11%, or 12%. Furthermore, the organosilicon-modified polyimide resin composite may further include heat dissipation particles and fluorescent powder.

Different heat dissipation particles have different light transmittance. If heat dissipation particles with low light transmittance or low light reflectivity are used, then the light transmittance of the organosilicon-modified polyimide resin composition will decrease. The heat dissipation particles in the above organosilicon-modified polyimide resin composition are preferably transparent powder, particles with high light transmittance, or particles with high light reflectivity. The filament in the present application is mainly configured to emit light, so the base material of the filament needs to have good light transmittance. Additionally, in the case of mixing two or more types of heat dissipation particles, particles with high light transmittance and particles with low light transmittance may be combined for use, and a proportion of the particles with high light transmittance is greater than that of the particles with low light transmittance. For example, in an embodiment, the weight ratio of the particles with high light transmittance to the particles with low light transmittance is (3-5):1.

The factors that affect the thermal conductivity of the organosilicon-modified polyimide resin composition include at least the type and content of the fluorescent powder, the type and content of the heat dissipation particles, and the addition and type of the coupling agent. The particle size and size distribution of the heat dissipation particles also affect the thermal conductivity. In some embodiments, to achieve better mechanical performance, better thermal conductivity, and low warpage of the base material, the fluorescent powder contained in the organosilicon-modified polyimide resin composition is granular. The fluorescent powder may be spherical, plate-shaped, or needle-shaped, preferably spherical. The maximum average length (average particle size when spherical) of the fluorescent powder is 0.1 μm or more, preferably 1 μm or more, more preferably 1-100 μm, and most preferably 1-50 μm. The usage amount of the fluorescent powder is not less than 0.05 times the weight of the organosilicon-modified polyimide, preferably not less than 0.1 times and not greater than 8 times, and more preferably not greater than 7 times. For example, if the weight of the organosilicon-modified polyimide is 100 parts by weight, the content of the fluorescent powder is not less than 5 parts by weight, preferably not less than 10 parts by weight and not greater than 800 parts by weight, and more preferably not greater than 700 parts by weight. When the content of the fluorescent powder in the organosilicon-modified polyimide resin composition exceeds 800 parts by weight, the mechanical performance of the organosilicon-modified polyimide resin composition may not meet the strength required for the base layer of the filament, resulting in an increase in product defect rate.

In an embodiment, when two types of fluorescent powder are added simultaneously, for example, red fluorescent powder and green fluorescent powder are added simultaneously, the addition ratio of the red fluorescent powder to the green fluorescent powder is 1:(5-8), preferably 1:(6-7).

In another embodiment, when two types of fluorescent powder are added simultaneously, for example, red fluorescent powder and yellow fluorescent powder are added simultaneously, the addition ratio of the red fluorescent powder to the yellow fluorescent powder is 1:(5-8), preferably 1:(6-7). In other embodiments, three or more types of fluorescent powder may be added simultaneously.

In an embodiment, heat dissipation particles (such as $SiO_2$ or $Al_2O_3$) with high content and high light transmittance or reflectivity may be added to maintain the light transmittance of the organosilicon-modified polyimide resin composition and improve the heat dissipation performance thereof.

In an embodiment, the particle size of the heat dissipation particles suitably added to the organosilicon-modified polyimide resin composition may be roughly classified into a small particle size (less than 1 μm), a medium particle size (1-30 μm), and a large particle size (greater than 30 μm).

In other specific embodiments of the present application, to further improve the properties of the organosilicon-modified polyimide resin composition in a synthetic process, an additive such as a defoamer, a leveling agent, or an adhesive may be selectively added in the synthetic process of the organosilicon-modified polyimide resin composition, as long as the optical rotation resistance, the mechanical strength, the heat resistance, and the color-change property of the product are not affected. The defoamer is configured to eliminate bubbles generated during printing, coating, and curing. For example, a surfactant such as acrylic acid or organosilicon is used as the defoamer. The leveling agent is configured to eliminate concave-convex parts on the surface of a coating film that are generated during printing and coating. Specifically, 0.01-2 wt % of the surfactant is preferred, which may suppress the bubbles. The coating film may be smoothed with the leveling agent such as acrylic acid or organosilicon. A non-ionic surfactant without ionic impurities is preferred. Examples of the adhesive include an imidazole compound, a thiazole compound, a triazole compound, an organoaluminum compound, an organotitanium compound, and a silane coupling agent. Preferably, the usage amount of these additives is not greater than 10% of the weight of the organosilicon modified polyimide. When the mixing amount of the additives exceeds 10 wt %, the physical properties of the obtained coating film tend to decline, and there is also a problem of deterioration in optical rotation resistance caused by volatile components.

In some embodiments of the present application, the defoamer may not be provided, but the bubbles generated during printing, coating, and curing may be used as optical cavities, as the bubbles are widely distributed in the filament structure during formation. Through the irregular surface shape of the bubbles, the effect of light gathering or light diffusion can be achieved. For example, the bubbles are used as the optical cavities to achieve the directional light-emitting effect; and the bubbles are used as the optical cavities to achieve the light diffusion effect, thereby improving the uniformity of the emitted light, and reducing the granular sensation.

In some embodiments, in corresponding to a region of the deposition unit 121, and the electrode connection layer 150D, or a region of the conductor layer 123 between the deposition units 121, the granules in the conversion layer wrapping the substrate 110 may have different structures, materials, effects, or distribution densities. This is because the deposition unit 121 and the conductor layer 123 have different functions respectively. Accordingly, the first light conversion layers 141 corresponding to the deposition unit 121 and the conductor layer 123 may be provided with different types of granules to achieve different effects. For example, the granules distributed corresponding to the deposition unit 121 of the light-emitting diode filament 100 and the granules distributed corresponding to the conductor layer 123 have different sizes, materials, and/or densities.

For example, in an embodiment, the first light conversion layer 141 corresponding to the deposition unit 121 in the light-emitting diode filament 100 may include fluorescent powder, and the first light conversion layer 141 corresponding to the conductor layer 123 includes light guide particles. The fluorescent powder may absorb light emitted from the deposition unit 121 and convert the wavelength of the light to reduce or increase the color temperature. Meanwhile, the fluorescent powder also has the light diffusion effect, so that the arrangement of the fluorescent powder in the first light conversion layer 141 corresponding to the deposition unit 121 helps to change the color temperature of the light and can enable the light to be dispersed more uniformly. The conductor layer 123 is not provided with the deposition unit 121, and the conductor layer 123 serves as a main bending part of the filament (e.g., when the filament needs to be bent and shaped), so that the light guide particles are disposed in the first light conversion layer 141 corresponding to the conductor layer 123. The light guide particles have the effects of light diffusion and light conduction, which helps to conduct light in the adjacent deposition units 121 to a segment where the conductor layer 123 is located, and further uniformly diffuse the light in a conductor segment of the conductor layer 123.

For example, in another embodiment, the first light conversion layer 141 corresponding to the deposition unit 121 in the light-emitting diode filament 100 may include light diffusion granules, such as fluorescent powder, and the first light conversion layer 141 corresponding to the conductor layer 123 does not includes granules. In this embodiment, the first light conversion layer 141 corresponding to the deposition unit 121 and the conductor layer 123 are made of, for example, silica gel, and no granules exist in the first light conversion layer 141 corresponding to the conductor layer 123. For example, when the filament needs to be bent and shaped, the bendability of the conductor layer 123 may be improved.

In an embodiment, the first light conversion layer 141 includes a first layer and a second layer, where the first layer wraps the substrate 110, and the plurality of deposition units 121 and conductor layers 123 formed on the substrate 110, and a part of the filament electrode 130; and the second layer wraps a lower surface of the substrate 110. In this embodiment, the first layer of the first light conversion layer 141 is a top layer, and the second layer of the first light conversion layer 141 is a base layer. The top layer is, for example, silica gel. The silica gel contains fluorescent powder. The base layer is, for example, a composition with organosilicon-modified polyimide as a main component. The composition includes, for example, fluorescent powder and heat dissipation particles. It should be understood that the materials of the top layer and the base layer are not limited. For example, in some embodiments, the first layer and the second layer of the first light conversion layer 141 are made of a same material or different materials, and may both be the composition with the organosilicon-modified polyimide as the main component.

In the fabrication process, first, the second layer of the first light conversion layer 141 may be fabricated as a base film, then the deposition unit 121 and the conductor layer 123 may be placed or deposited, the filament electrode 130 and the deposition unit 121 may be electrically connected, and then the first layer of the first light conversion layer 141 may be formed on the light-emitting diode filament 100, so as to wrap the substrate 110, and the plurality of deposition units 121 and conductor layers 123 formed on the substrate 110, and a part of the filament electrode 130.

In the embodiment where the first layer and the second layer of the first light conversion layer 141 are made of different materials, the top layer and the base layer may have different granules or granule densities based on different requirements. For example, in the case where the main light-emitting surface of the deposition unit 121 faces the top layer, more light scattering granules may be added to the base layer, so as to improve the light scattering of the base layer. In this way, the brightness that can be generated by the base layer is maximized and even approaches the brightness that can be generated by the top layer. In addition, the base layer may also contain fluorescent powder with higher density to improve the hardness of the base layer.

In an embodiment, the top layer of the first light conversion layer 141 has a large number of light reflecting/diffusing particles (e.g., fluorescent powder) which may reflect or diffuse light towards the base layer, and the light may easily penetrate through the thin base layer, thus making the brightness of the top layer and the base layer uniform. In another embodiment, when the top layer and the base layer have the same thickness, the fluorescent powder concentration of the top layer may be configured to be greater than that of the base layer, making the color temperature of the LED filament more uniform.

In the embodiment where the substrate 110 is a flexible substrate, the first light conversion layer 141 includes a first layer and a second layer. For example, in an embodiment, the first layer is located on one side of the deposition unit 121 away from the substrate 110, and the second layer is located on the other side of the deposition unit 121 close to the substrate 110. In this embodiment, for example, a group of parallel planes intersect with the first light conversion layer 141 in a space between the segments of the adjacent deposition unit 121. The deposition unit 121 is disposed in the segment of the deposition unit 121. One part of the conductor layer 123 configured to electrically connect the segments of the two adjacent deposition unit 121 is disposed in the first layer, and the other part is disposed in the second layer. The conversion wavelengths/particle sizes/thicknesses/light transmittance/hardness/particle ratios of the first layer and the second layer may also be different and can be adjusted as needed.

In an embodiment, the first layer is harder than the second layer, that is, the hardness of the first layer is greater than or equal to that of the second layer, and the first layer is filled with more fluorescent powder than the second layer. Because the first layer is harder, the first layer is configured to better protect a linear array of the deposition units 121 when the filament is bent to maintain a desired attitude in a lamp, thereby ensuring that the lamp does not malfunction. The second layer is made softer, so that the entire filament bended in the lamp can generate omni-directional light, especially one filament generates the omni-directional light.

Certainly, in other embodiments, the hardness of the second layer may also be set to greater than or equal to that of the first layer.

In another embodiment, the first layer has better thermal conductivity than the second layer, for example, more heat dissipation particles are added to the first layer than to the second layer. The first layer with high thermal conductivity can conduct heat from the segments of the deposition units 121 to the outside of the filament, so as to better protect a linear array of the segments of the deposition units 121 from degradation or combustion. Since the conductor layer 123 is spaced apart from the deposition unit 121, the conductor layer 123 plays a smaller role in conducting the heat of the deposition unit 121 than the deposition unit 121. Therefore, when the content of heat dissipation granules doped in the second layer is less than that in the first layer, the cost of fabricating the filament can be saved. The size ratio of the first layer provided with the deposition unit 121 to the light conversion layer as a whole is determined by reference factors (e.g., light conversion capability, bendability, and thermal conductivity). In other same cases, when the proportion of the first layer in the light conversion layer as a whole is larger, the filament has better light conversion capability and thermal conductivity, but is less prone to bending.

Figure 17:
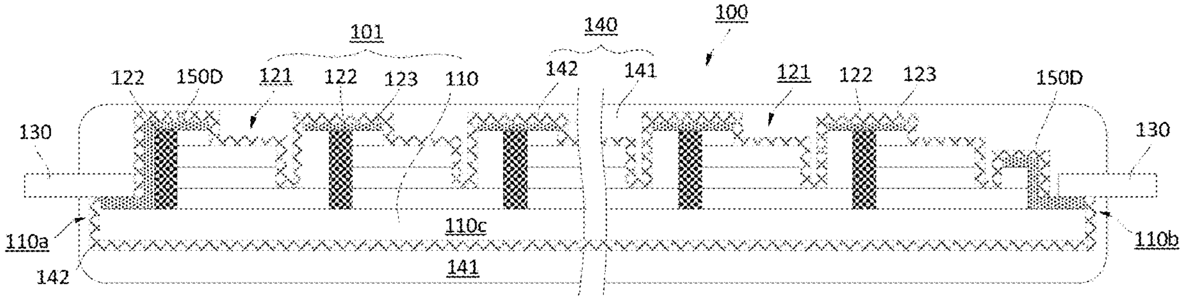
FIG. 17 shows a schematic side view where a second light conversion layer is formed on a chip strip structure in an embodiment of the present application.

In an embodiment, the light-emitting diode filament in the present application further includes a second light conversion layer that covers the chip strip structure, and is located between the chip strip structure and the conductor layer, and is configured to ensure that the light-emitting diode filament has good color reproducibility or high color rendering. Reference is made to FIG. 17, which shows a schematic side view where a second light conversion layer is formed on a chip strip structure in an embodiment of the present application. As shown in the figure, the light-emitting diode filament 100 includes a chip strip structure 101, a light conversion unit 140 wrapping the chip strip structure 101, and electrodes 130 located at two ends of the chip strip structure 101 in a length direction and electrically connected thereto, where at least part of the electrodes 130 are wrapped in the light conversion unit 140. In this embodiment, the light conversion unit 140 includes a first light conversion layer 141 and a second light conversion layer 142.

In this embodiment, the first light conversion layer 141 is a packaging structure configured to package the entire filament strip. In some cases, the packaging structure is also referred to as a glue sealing layer. The relevant description of the first light conversion layer 141 in the embodiments corresponding to FIG. 6 to FIG. 16 above will not be repeated herein.

In the embodiment of FIG. 17, the second light conversion layer 142 covers the chip strip structure 101 and is located between the chip strip structure 101 and the first light conversion layer 141. Certainly, it may also be said that the light conversion layer 142 is located between the conductor layer 123 and the first light conversion layer 141. Specifically, the second light conversion layer 142 completely covers the substrate 110, the deposition unit 121, the connecting layer 122, the conductor layer 123, the electrode connection layer 150D, and at least part of the filament electrode 130, or the second light conversion layer 142 covers (wraps) the substrate 110, the deposition unit 121, the connecting layer 122, the conductor layer 123, the electrode connection layer 150D, and at least a part of the filament electrode 130 (i.e., the electrode connection layer 150D in the aforementioned embodiments), and the first light conversion layer 141 wraps the outer side of the second light conversion layer 142 and covers at least a part of the second light conversion layer 142. In this embodiment, the second light conversion layer includes red fluorescent powder of fluoride system, which can be effectively excited by blue light emitted from an LED chip in the light-emitting diode filament, and has the beneficial effects of narrowband emission of red light, high quantum efficiency, good thermal stability, etc. In some embodiments, the red fluorescent powder of the fluoride system is, for example, red $K_2SiF_6$:$Mn^{4+}$-KSF, $K_2TiF_6$:$Mn^{4+}$, $NaYF_4$:$Mn^{4+}$, $NaGdF_4$:$Mn^{4+}$, $K_3SiF_7$:$Mn^{4+}$, etc.

The composition of the fluorescent powder should basically comply with stoichiometry, and each element may be replaced with another element from its respective family in the periodic table of elements. For example, strontium (Sr) may be replaced with barium (Ba), calcium (Ca), magnesium (Mg), or the like in the alkaline earth family; and yttrium (Y) may be replaced with terbium (Tb), lutetium (Lu), scandium (Sc), gadolinium (Gd), or the like. In addition, based on a required energy level, europium (Eu) as an activator may be replaced with cerium (Ce), terbium (Tb), praseodymium (Pr), erbium (Er), ytterbium (Yb), or the like, and the activator may be used alone, or a coactivator may be additionally used to change properties.

Under the inspiration of the above idea in the present application, to enhance the reliability at high temperature and high humidity, the red fluorescent powder of the fluoride system or the fluoride-based red fluorescent powder may be coated with manganese (Mn)-free fluoride or further includes an organic substance coated on the surface of a manganese (Mn)-free fluoride coating. Unlike other fluorescent powder, the fluoride-based red fluorescent powder may achieve a narrow full width at half maximum (FWHM) equal to or less than 40 nm.

In an embodiment provided in the present application, the second light conversion layer 142 includes red fluorescent powder $K_2SiF_6$:$Mn^{4+}$. The red fluorescent powder $K_2SiF_6$:$Mn^{4+}$ (abbreviated as KSF) serves as a red phosphor with a narrow half width. The KSF phosphor has a very narrow half width of approximately less than 10 nm, and thus is a phosphor that can achieve good color reproducibility.

Especially, based on this, white light generated by combining yellow, green, and KSF phosphors with a blue LED and/or by combining green and red LEDs with the blue LED may have two or more peak wavelengths.

For example, for a lighting device that achieves white light (e.g., an LED lighting device provided in an embodiment of the present application), high color rendering is usually required. Color rendering is the property of a lighting source that represents how similar the color of an object illuminated by the lighting device is to the color of an object illuminated by a reference light source. A color rendering index (CRI) is used to evaluate color rendering. A general CRI (Ra) is mostly used. Ra is an average value of CRIs (special CRIs; R1-R8) quantified using eight test color samples. In the case of using the above red phosphor with the narrow half width such as the KSF phosphor, unnecessary tails can be removed to emit desired light of a red region, so that high R8 can be achieved even with relatively low Ra. That is, the appropriate Ra and R8 can be achieved without excessive or significant reduction in luminosity.

In the embodiment of FIG. 17, which is the embodiment of the fabrication method above, the conductor layer is formed on the plurality of deposition units by means of the deposition process to electrically connect the adjacent deposition units, so that the plurality of deposition units form the continuous strip-shaped structure on the substrate. Specifically, after the deposition unit 121, the connecting layer 122, the conductor layer 123, and the electrode connection layer 150D are formed on the substrate 110, the second light conversion layer 142 completely covers the substrate 110, the deposition unit 121, the connecting layer 122, the conductor layer 123, and the electrode connection layer 150D to form the structure as shown in FIG. 17. In this embodiment, in the step that the second light conversion layer 142 completely covers the substrate 110, the deposition unit 121, the connecting layer 122, the conductor layer 123, and the electrode connection layer 150D, a position for subsequent electrical connection to the filament electrode 130 is reserved on the electrode connection layer 150D without covering the second light conversion layer 142, so that the filament electrodes 130 and the electrode connection layers 150D at two ends are in full electrical contact.

Figure 18:
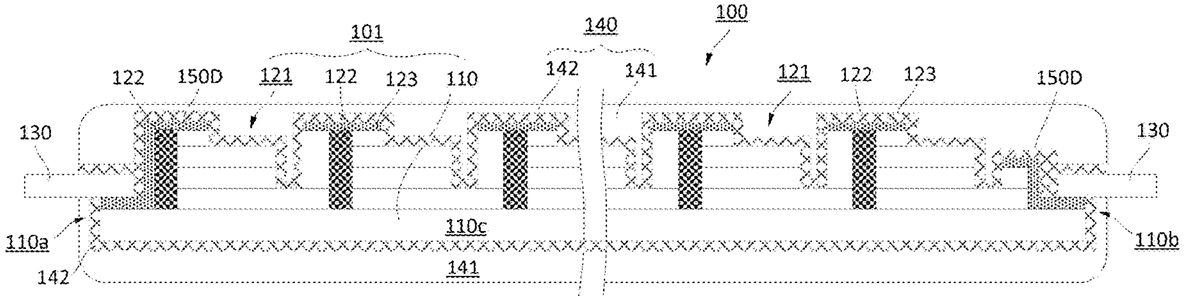
FIG. 18 shows a schematic side view where a second light conversion layer is formed on a chip strip structure in another embodiment of the present application.

In another embodiment, the second light conversion layer may also be formed on the chip strip structure after the filament electrodes are connected to two ends of the substrate. Reference is made to FIG. 18, which shows a schematic side view where a second light conversion layer is formed on a chip strip structure in another embodiment of the present application. As shown in the figure, in the fabrication method provided in this embodiment, after the deposition unit 121, the connecting layer 122, the conductor layer 123, and the electrode connection layer 150D are formed on the substrate 110, the deposition units 121 adjacent to the first end 110*a* and the second end 110*b* of the substrate 110 are electrically connected to the filament electrodes 130. After that, the second light conversion layer 142 completely covers the substrate 110, the deposition unit 121, the connecting layer 122, the conductor layer 123, the electrode connection layer 150D, and a part of the filament electrode 130 to form the structure as shown in FIG. 18. The second light conversion layer 142 also covers the filament electrode 130 packaged in the substrate 110 by the first light conversion layer 141.

Figure 19:
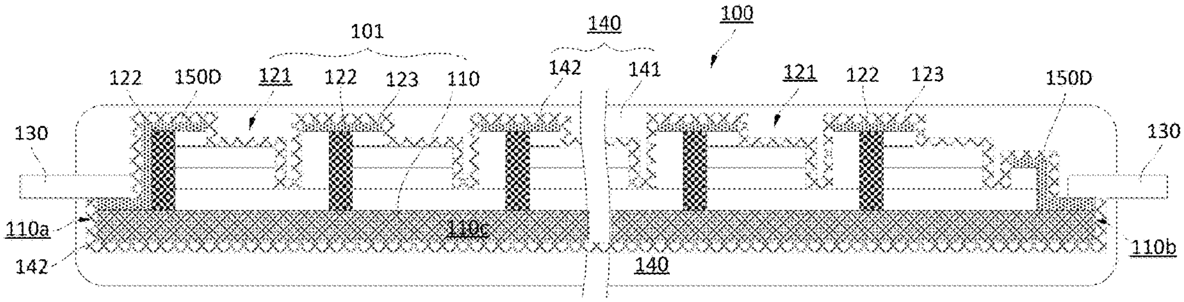
FIG. 19 shows a schematic side view where a second light conversion layer is formed on a chip strip structure in yet another embodiment of the present application.

In another embodiment, the light-emitting diode filament further includes a second light conversion layer configured to ensure that the light-emitting diode filament has good color reproducibility or high color rendering. In this embodiment, the second light conversion layer covers the plurality of deposition units, the connecting layer, and the conductor layer, and is located between the first light conversion layer and the chip strip structure. Reference is made to FIG. 19, which shows a schematic side view where a second light conversion layer is formed on a chip strip structure in yet another embodiment of the present application. As shown in the figure, the second light conversion layer 142 covers the deposition unit 121, the connecting layer 122, the conductor layer 123, and the electrode connection layer 150D (i.e., the electrode connection layer 150D in the aforementioned embodiments). In this embodiment, the second light conversion layer 142 includes red fluorescent powder of fluoride system, which can be effectively excited by blue light emitted from an LED chip in the light-emitting diode filament, and has the beneficial effects of narrowband emission of red light, high quantum efficiency, good thermal stability, etc. In some embodiments, the red fluorescent powder of the fluoride system is, for example, red $K_2SiF_6$:$Mn^{4+}$-KSF, $K_2TiF_6$:$Mn^{4+}$, $NaYF_4$:$Mn^{4+}$, $NaGdF_4$:$Mn^{4+}$, $K_3SiF_7$:$Mn^{4+}$, etc. In the embodiment of FIG. 19, the second light conversion layer 142 includes red fluorescent powder $K_2SiF_6$:$Mn^{4+}$ (KSF).

To further improve the light-emitting diode filament to be with good color reproducibility or high color rendering, the red fluorescent powder may be added to the substrate 110 to form a fluorescent glass ceramic substrate. For example, in the embodiment of FIG. 19, the substrate 110 is a fluorescent glass ceramic substrate inlaid with red fluorescent powder of fluoride system to improve the color rendering index (CRI) of white light, and can enable the LED chip of the lighting device to improve the luminous flux and the color temperature under the excitation of power density of blue light. In some embodiments, the red fluorescent powder of the fluoride system is, for example, red $K_2SiF_6$:$Mn^{4+}$-KSF, $K_2TiF_6$:$Mn^{4+}$, $NaYF_4$:$Mn^{4+}$, $NaGdF_4$:$Mn^{4+}$, $K_3SiF_7$:$Mn^{4+}$, etc. In a specific example, the substrate 110 is, for example, a fluorescent glass ceramic substrate inlaid with red fluorescent powder $K_2SiF_6$:$Mn^{4+}$ (KSF).

In the embodiment of FIG. 19, the deposition unit 121, the connecting layer 122, the conductor layer 123, and the electrode connection layer 150D are covered with the second light conversion layer 142 containing the red fluorescent powder $K_2SiF_6$:$Mn^{4+}$ (KSF), and the red fluorescent powder is added to form the fluorescent glass ceramic substrate 110, so that the light-emitting diode filament can have good color reproducibility or high color rendering.

In another embodiment, the light-emitting diode filament further includes a coating layer. The coating layer completely coats the first light conversion layer, has a different color from the first light conversion layer in a state where the light-emitting diode filament does not work, and is configured to change the surface color of the light-emitting diode filament. For example, different materials are mixed to fabricate the coating layer, so that the light-emitting diode filament presents different colors, or the light-emitting diode filament presents different colors in turn-on and turn-off states, thereby improving the appearance and light-emitting effect of a lamp using the light-emitting diode filament.

Figure 20:
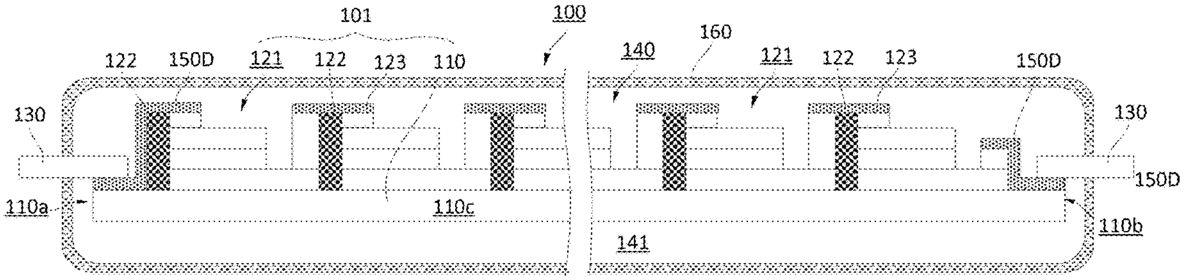
FIG. 20 shows a schematic side view where a light-emitting diode filament is provided with a covering layer in an embodiment of the present application.

Reference is made to FIG. 20, which shows a schematic side view where a light-emitting diode filament is provided with a covering layer in an embodiment of the present application. As shown in the figure, the chip strip structure 101 of the light-emitting diode filament 100 is wrapped with the conversion unit 140, and the electrodes 130 are located at two ends of the chip strip structure 101 in the length direction and electrically connected thereto. At least part of the electrodes 130 are wrapped in the light conversion unit 140. The light conversion unit 140 includes a first light conversion layer 141. In another embodiment, the light conversion layer may also include a second light conversion layer 142. The first light conversion layer 141 is a packaging structure configured to package the entire filament strip. In some cases, the packaging structure is also referred to as a glue sealing layer. The relevant description of the first light conversion layer 141 in the embodiments corresponding to FIG. 6 to FIG. 16 above will not be repeated herein.

In the embodiment of FIG. 20, the coating layer 160 completely coats the first light conversion layer 141, and the color of the coating layer 160 is different from that of the first light conversion layer 141. The coating layer 160 may also be referred to as a layer-shaped body. The coating layer 160 coats the first light conversion layer 141 and covers at least a part of the filament electrode 130. A color rendering material or a photoconversion material is disposed in the coating layer 160.

In some embodiments of the present application, the coating layer 160 may be made of silica gel or a material mainly containing silica gel. When the silica gel is directly used, the coating layer 160 can present a white color by the color of the silica gel itself, so that the light-emitting diode filament 100 is white in appearance. After a colorant is added in the silica gel, the coating layer 160 can present different colors as described above. In addition, a photoreactive substance may also be added in the coating layer 160, so that light emitted from the deposition unit 121 is converted by the first light conversion layer 141 for the first time and then is converted by the photoreactive substance in the coating layer 160 for the second time, thereby ensuring that the light-emitting filament 100 has a first color when not turned on and has a second color different from the first color when turned on, where the first color and the second color have primary color difference.

In some embodiments, the first light conversion layer 141 further includes a first layer and a second layer. The first layer of the first light conversion layer 141 is a top layer, and the second layer of the first light conversion layer 141 is a base layer (or referred to as a bearing layer). The top layer and the base layer may each be of a layer-shaped structure with at least one layer. The color of an upper surface of the top layer is different from that of a lower surface of the base layer. Due to the fact that the light-emitting diode filament 100 presents two different colors when not turned on, the light-emitting diode filament may be applied to a multi-color usage scenario.

In some embodiments, the coating layer 160 may also be made of other materials other than the silica gel or the material mainly containing the silica gel, such as resin, plastic, polyimide (PI), polyvinyl alcohol (PVA), polyester (PET), polyethylene naphthalate (PEN), and polydimethylsiloxane (PDMS).

In some embodiments, the coating layer 160 may mainly contain silica gel and is mixed with other solid powder (granules). The solid powder granules may be non-conductive white powder, such as titanium dioxide powder, but are not limited to this. For example, in a mixture of inorganic oxide nanoparticles, the weight of the solid powder granules accounts for a certain proportion of the total weight of the coating layer 160 to meet the performance requirements of the filament as a whole.

In some embodiments, a certain amount of titanium dioxide powder (granules) is mixed in the coating layer 160. The titanium dioxide powder (granules) is uniformly distributed in the coating layer 160. The coating layer 160 is fabricated from silica gel and titanium dioxide powder (granules). When the silica gel is in a liquid state under a certain condition, a certain amount of titanium dioxide is added into the silica gel. The titanium dioxide powder (granules) is uniformly distributed in the silica gel by common mixture treatment ways such as stirring, high-speed oscillation, and planetary mixer treatment. Under the condition that a mixture of the silica gel and the titanium dioxide is in a liquid state, the coating layer 160 is disposed on the surface of the first light conversion layer 141 by means of spin coating, spray coating, scraper coating, or soaking (soaking the material as a whole in liquid and then taking out the material, so that the surface of the material is coated with the liquid), and then the coating layer 160 is consolidated on the surface of the first light conversion layer 141 by means of exposure, baking, natural curing, or the like. The thickness of the coating layer 160 is less than or equal to the thickness of the first light conversion layer 141, which avoids affecting the light emission and flexibility of the light-emitting diode filament 100 due to excessive thickness of the coating layer 160. The mass of the titanium dioxide accounts for 0.2% to 10%, more preferably 0.7% to 5% of the total mass of the coating layer 160. The color presented by the titanium dioxide powder (granules) is white. In a commonly used white pigment, the relative density of the titanium dioxide powder is minimum. In a white pigment with the same mass, the titanium dioxide has the largest surface area, and the pigment has the maximum volume. Compared with other materials, a stronger capability to make the color of a mixed material approach the color of a titanium dioxide material is achieved. For example, if the mixed material needs to tend to be white, few titanium dioxide materials can meet the requirements compared with other materials. The titanium dioxide has high reflectivity (e.g., 80% or above) and refractive index (e.g., 2.5-2.8), and is uniformly distributed in the coating layer 160. Light excited by the deposition unit 121 is converted by the first light conversion layer 141, then reaches the coating layer 160, and finally is emitted from the coating layer 160 after being refracted and reflected by the titanium dioxide powder (granules) distributed in the coating layer for multiple times. In this way, the specific directionality of the emitted light is greatly reduced, and the emitted light is more uniform and soft.

In some embodiments, a certain amount of titanium dioxide is disposed in the coating layer 160. Light processed by the first light conversion layer 141 is disordered in the coating layer 160, so that the specific directionality of the finally emitted light is greatly reduced, the effect similar to diffuse reflection is formed, and the light finally emitted from the coating layer 160 is uniform and soft. Certainly, the additive amount of the titanium dioxide should not be too large, as the excessive amount will result in high optical loss. For example, when the total mass of the titanium dioxide is greater than 10% of the mass of the coating layer 160, the soft light effect cannot be further improved even if the amount of the titanium dioxide continues to increase, but a higher optical loss will be caused, resulting in that the amount of the emitted light cannot meet the requirement. The additive amount of the titanium dioxide should not be too small, as the function of uniforming light and the ideal color effect cannot be achieved when the additive amount is too small. For example, the total mass of the titanium dioxide is less than 0.2% of the mass of the coating layer 160. A small additive amount of the titanium dioxide can make the light-emitting diode filament 100 (or the coating layer 160) present a white color or a color close to the white color while the light is soft. More precisely, a color value of the light-emitting diode filament 100 (or the coating layer 160) when not turned on is within a range of R value (235-255), G value (235-255), and B value (235-255) under the RGB standard. An absolute value of a difference value between any two of R value, G value, and B value is less than or equal to 10% of the relatively small or large value. Furthermore, the absolute value of the difference value between any two of R value, G value, and B value is less than or equal to 5% of the relatively small or large value.

Certainly, the material added in the coating layer 160 may also be another color rendering material or photoconversion material, such as one or a combination of aluminum oxide, silicon dioxide, magnesium oxide, titanium dioxide, graphene, fluorescent powder, sulfate, silicate, nitride, nitrogen oxide, oxysulfate, or garnet. For example, the material added in the coating layer may be a combination of one of aluminum oxide and silicon dioxide, and titanium dioxide, where the mass of the titanium dioxide is 5% to 15%, preferably 8% of the mass of all solid granules. The material added in the coating layer may also be a combination of one of aluminum oxide and silicon dioxide, and magnesium oxide or sulfate (e.g., barium sulfate), but is not limited to this, and may include one or more material combinations. In some embodiments, color setting of the filament when not turned on may be implemented by various types of different fluorescent powder, for example, different fluorescent powder is mixed to achieve a series of colors such as a white color, a gray color, and a black color of the filament when not turned on.

In some embodiments, light conversion particles, such as fluorescent powder, may also be disposed in the coating layer 160. The mass of the light conversion particles accounts for 2% to 10%, preferably 4% of the total mass of the total solid granules in the coating layer 160, so that the coating layer 160 has a light conversion effect, the light excited by the deposition unit 121 that is not converted by the first light conversion layer 141 continues to be converted by the coating layer 160 and then is emitted, and the light conversion efficiency of the light-emitting diode filament 100 as a whole is improved, that is, a high light conversion effect is achieved by two times of independent light conversion.

In some embodiments, the coating layer 160 has uniform thickness and is disposed on two surfaces of the first light conversion layer 141 that are substantially parallel to the light-emitting surface of the light-emitting diode filament 100.

In some embodiments, the coating layer 160 has uniform thickness and is disposed on two surfaces of the first light conversion layer 141 that are substantially parallel to the light-emitting surface of the light-emitting diode filament 100 and a long side surface thereof perpendicular to the light-emitting surface of the light-emitting diode filament 100 (i.e., a surface through which the filament electrode 130 penetrates).

In some embodiments, the coating layer 160 completely coats the first light conversion layer 141 and covers at least a part of the filament electrode 130, where the coating layer 160 has a certain strength and toughness, so that the overall strength of the light-emitting diode filament 100 may be enhanced.

In some embodiments, the coating layer 160 may coat only one surface of the first light conversion layer 141 and at least a part of the corresponding surface of the filament electrode 130.

In some embodiments, a filling material in the coating layer 160 may be selected from one of aluminum oxide or silicon dioxide and fabricated by combining titanium dioxide and graphene, where the titanium dioxide accounts for 0.5% to 5%, preferably 1.25% of the total solid granules in the coating layer 160. The weight of the titanium dioxide accounts for 0.1% to 3%, more preferably 0.4% to 2.5% of the total weight of the coating layer 160. The weight of the graphene accounts for 0.1% to 1%, preferably 0.5% of the total weight of the coating layer 160. In some embodiments, the graphene may be fluorinated graphene, which has excellent non-conductivity, excellent thermal conductivity and stability, and good dispersion stability, and thus can remain relatively stable in some materials. In terms of particle size selection, the particle size of the aluminum oxide (or the silicon dioxide) is greater than that of the titanium dioxide, the particle size of the titanium dioxide is greater than that of the graphene. That is to say, three types of granules with different particle sizes exist in the coating layer 160. The three types of granules are uniformly distributed in the coating layer 160, making it difficult to form a gap or a thermally conductive disconnection region therebetween, and achieving a better heat dissipation effect.

In an embodiment, the particle sizes of the particles of the filling material in the coating layer may be same. In another embodiment, the particle sizes of the particles of the filling material in the coating layer may also be different. In yet another embodiment, the particle sizes of the particles of the filling material in the coating layer may be same in a segment but different in another segment.

Figure 21A:
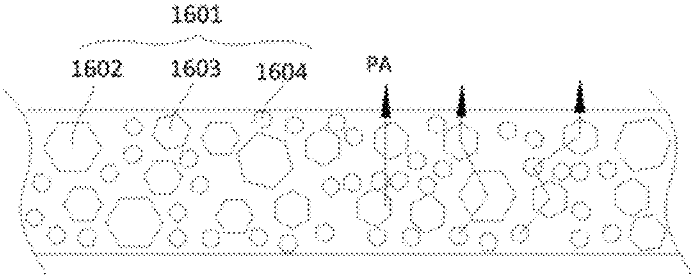
FIG. 21*a* shows a schematic diagram of a heat dissipation path for different particle sizes of particles of a filling material in an embodiment of the present application.
Figure 21B:
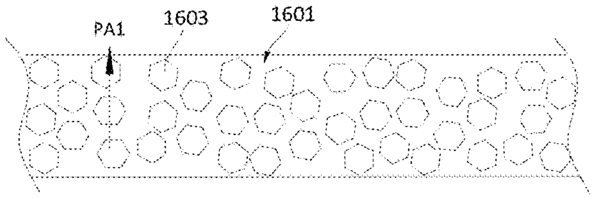
FIG. 21*b* shows a schematic diagram of a heat dissipation path for the same particle size of particles of a filling material in another embodiment of the present application.

Reference is made to FIG. 21*a* and FIG. 21*b*. FIG. 21*a* shows a schematic diagram of a heat dissipation path for different particle sizes of particles of a filling material in an embodiment of the present application. FIG. 21*b* shows a schematic diagram of a heat dissipation path for the same particle size of particles of a filling material in another embodiment of the present application. As shown in FIG. 21*a*, in the filling material 1601, particles 1602 represents particles with the maximum particle size (e.g., aluminum oxide or silicon dioxide), particles 1603 represents particles with the medium particle size (e.g., titanium dioxide), and particles 1604 represents particles with the minimum particle size (e.g., graphene). Under the condition of providing particles with different particle sizes, particles with small particle size will fill a gap between particles with large particle size. The heat dissipation path may be turned and extended among the particles with small particle size (the particles 1604), the particles with medium particle size (the particles 1603), and the particles with large particle size (the particles 1602) to form a complete heat dissipation path. The particles (the particles 1603) have a good heat dissipation effect, and the silica gel has a poor heat dissipation effect. In the heat dissipation path, the length of the path passing through the heat dissipation particles is much greater than the length of the path passing through the silica gel (or another material instead of the silica gel as the base material), that is, the high heat dissipation path accounts for a high proportion of the overall heat dissipation path and has a good heat dissipation effect. In addition, during heat transfer, a region with large temperature difference and good thermal conductivity dissipates heat quickly, so that the heat is preferentially dissipated (lost) from the region. In the filling material 1601 with different particle sizes, the particles have good thermal conductivity, and the heat on the particles can be quickly dissipated, so that the particles with different distances from a heat source will have a certain temperature difference, and the heat is preferentially transferred between the particles with temperature difference. The silica gel has a poor heat dissipation capability and is prone to heat accumulation, so the temperature difference is small. Accordingly, the heat dissipation path is preferably a path formed by the particles, and a path formed by the silica gel is reduced.

The heat dissipation paths in FIG. 21*a* and FIG. 21*b* are compared. The heat dissipation path is preferably a path formed by connecting the particles in series. Under the condition of the same path length, as shown in a path PA, FIG. 21*a* shows a filling material 1601 with particles of different sizes. The length of the particle path in the heat dissipation path accounts for a higher proportion, the heat dissipation effect is goos. For the single particles shown in FIG. 21*b*, there are no smaller particles filling the gap between the particles, and the heat dissipation path can only be formed by through the silica gel. Under the condition of the same path length, the silica gel accounts for a high proportion in the heat dissipation path and has a worse heat dissipation effect than that in FIG. 21*a*. As shown in FIG. 21*a*, different particles (with at least two particle sizes, e.g., aluminum oxide or magnesium oxide with a particle size between 2.5 mm and 25 mm, titanium dioxide with a particle size between 0.3 mm and 1 mm, and graphene with a particle size between 5 nm and 300 nm in some embodiments) are mixed with silica gel, so that the proportion of particles in direct contact on the outermost side of the heat dissipation surface is increased, the gap between particles with large particle size is filled with particles with small particle size, the micro heat dissipation path is optimized, and the overall heat dissipation effect is improved. The graphene (or the fluorinated graphene) is commonly used as one of added materials due to its good thermal conductivity, insulativity, and thermal stability. In some embodiments, the filling material 1601 can present a gray color or a color close to the gray color (i.e., the filament presents a gray color or a color close to the gray color). More precisely, a color value of the light-emitting diode filament 100 (or the filling material 1601) when not turned on is within a range of R value (100-234), G value (100-234), and B value (100-234) under the RGB standard. An absolute value of a difference value between any two of R value, G value, and B value is less than or equal to 10% of the relatively small or large value. Furthermore, the absolute value of the difference value between any two of R value, G value, and B value is less than or equal to 5% of the relatively small or large value.

Figure 21C:
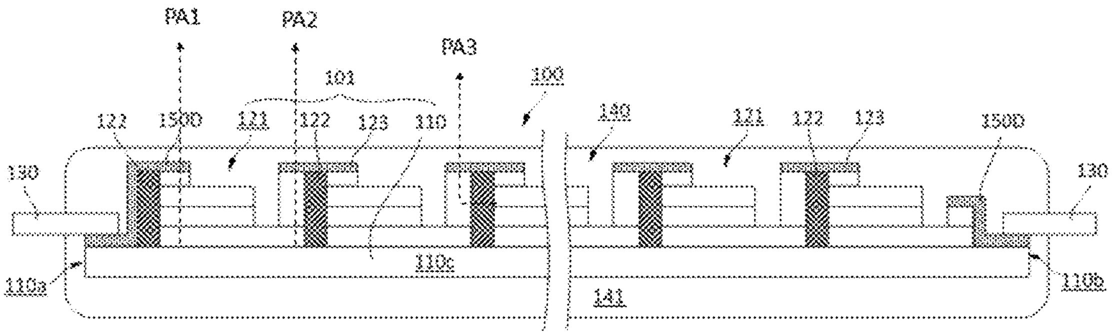
FIG. 21*c* shows a schematic diagram of the heat dissipation path in the chip strip of the present application.

In some embodiments of the present application, for heat dissipation, heat is conducted from the chip strip structure to the light conversion layer and finally is conducted to the outside, that is, the heat dissipation is completed through at least a part of the chip strip structure. As shown in FIG. 21C, different constituent parts of the chip strip structure form new heat dissipation paths PA1, PA2, and PA3 with the heat dissipation path PA, where PA1 is a schematic of heat from the first semiconductor layer S1, the light-emitting layer LE, the second semiconductor layer S2, the conductor layer 123, and the second electrode E2 to the heat dissipation path PA, PA2 is a schematic of heat from the first semiconductor layer S1 and the first electrode E1 to PA, and PA3 is a schematic of heat from the connecting layer 122, the first electrode E1, and the conductor layer 123 to PA. The above PA1, PA2, and PA3 all penetrate through at least a part of the chip strip structure 101 with good thermal conductivity, and are each provided with the conductor layer 123. Compared with a conventional filament structure, most of the heat dissipation path is located in the light conversion layer, while in this design, most of the heat dissipation path is located in the chip strip structure, and most of the path passes through the metal structure with good thermal conductivity, so that the heat dissipation performance is greatly improved, certainly it may also be said that the length of the heat dissipation path in the light conversion layer is greatly shortened, and the ratio of the heat dissipation path in a region with low thermal conductivity to the overall heat dissipation path is reduced.

Figure 22:
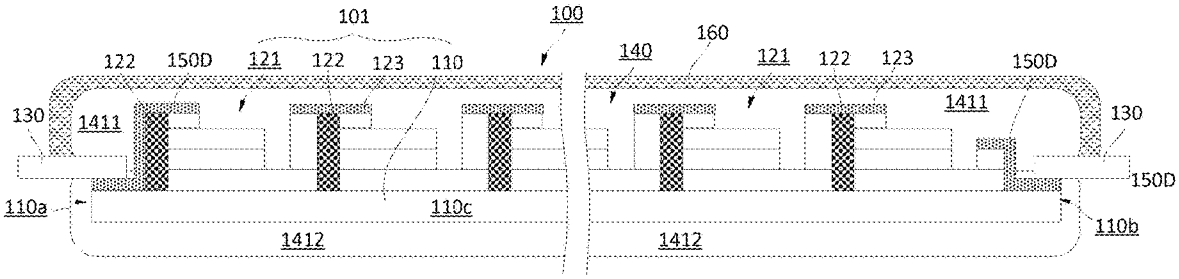
FIG. 22 shows a schematic structural diagram of a coating layer of a light-emitting diode filament in some embodiments of the present application.

In an embodiment, the first light conversion layer 141 has a top layer 1411 and a base layer 1412, and the coating layer 160 may be disposed on the top layer 1411. In some embodiments, reference is made to FIG. 22, which shows a schematic structural diagram of a coating layer of a light-emitting diode filament in some embodiments of the present application. As shown in FIG. 22, the coating layer 160 may completely coat the top layer 1411 and cover at least a part of the surfaces of the filament electrodes 130 at two ends that face the top layer 1411.

In some embodiments, the coating layer 160 may cover only the top layer 1411 without contacting at least a part of the surface of the filament electrode 130 facing the top layer 120.

Referring to FIG. 22 again, the first light conversion layer 141 has a top layer 1411 and a base layer 1412, where the coating layer 160 may completely coat the top layer 1411 and cover at least a part of the surfaces of the filament electrodes 130 at two ends that face the top layer 1411, and the base layer 1412 is uncovered. The thickness of the coating layer 160 along the radial direction of the LED filament 100 is less than or equal to the thickness of the top layer 1411 along the radial direction of the LED filament 100. Further, the thickness of the coating layer 160 along the radial direction of the LED filament 100 is less than or equal to half of the thickness of the top layer 1411 along the radial direction of the filament. Furthermore, the thickness of the coating layer along the radial direction of the LED filament is less than or equal to one-third of the thickness of the top layer along the radial direction of the filament.

In some embodiments, the thickness of the top layer 1411 of the first light conversion layer 141 may be set to 0.2 mm to 0.7 mm, more preferably 0.35 mm to 0.5 mm. The thickness of the base layer 1412 of the first light conversion layer 141 may be set to 0.05 mm to 0.15 mm, more preferably 0.08 mm to 0.15 mm, so as to ensure that the LED filament 100 has sufficient flexibility.

In some embodiments, due to the difference in the added materials between the base layer 1412 and the top layer 1411 of the first light conversion layer 141, there are differences in deflection and strength per unit volume between the base layer 1412 and the top layer 1411. When the thicknesses of the base layer 1412 and the top layer 1411 are close, the accumulation of differences will result in a significant difference in overall deflection or strength between the base layer 1412 and the top layer 1411, making it prone to layering or breakage during bending. For example, when the ratio of the thickness of the base layer 1412 to the thickness of the top layer 1411 is greater than one half, the flexibility and reliability of the LED filament 100 as a whole are insufficient, so that the LED filament 100 may have the aforementioned flexibility and is prone to layering or breakage during bending. Therefore, in this embodiment, the ratio of the thickness of the base layer 1412 to the thickness of the top layer 1411 is less than or equal to one half, more preferably less than or equal to three-eighths. Accordingly, in this embodiment, when the ratio of the thickness of the base layer 1412 to the thickness of the top layer 1411 is controlled within the aforementioned ratio range, the better flexibility may be achieved. That is, the thickness is controlled to adjust the physical performance such as the deflection or strength of the base layer 1412 and the top layer 1411 due to the difference between the added materials, so that the base layer 1412 and the top layer 1411 have approximate physical performance, thereby preventing layering or breakage of the LED filament 100 during bending.

In some embodiments, the ratio of the thickness of the coating layer 160 to the thickness of the base layer 1412 is less than or equal to one half, more preferably less than or equal to three-quarters. For example, when the thickness ratio is greater than one half, the coating layer 160 (solid granules are added in the coating layer 160) may affect light emission of the filament as a whole.

In some embodiments, the thickness of the coating layer 160 may be set to 0.05 mm to 0.4 mm, more preferably 0.1 mm to 0.2 mm. In some embodiments, when the thickness of the base layer 1412 is too large, for example, when the thickness of the base layer 1412 is greater than one-quarter of a sum of the thicknesses of the coating layer 160, the top layer 1411, and the base layer 1412, heat dissipation of the base layer 1412 will be affected, that is, the LED filament 100 is prone to heat accumulation due to long heat dissipation path. Therefore, in this embodiment, the thickness of the base layer 1412 is less than or equal to one-quarter of the thickness of the LED filament 100. Specifically, the thickness of the base layer 1412 is less than or equal to one-quarter of the sum of the thicknesses of the coating layer 160, the top layer 1411, and the base layer 1412. This can maintain the heat dissipation performance of the base layer 1412, shorten the heat dissipation path of the LED filament 100, and avoid the heat accumulation.

In some embodiments, as shown in FIG. 22 again, the first light conversion layer 141 includes a top layer 1411 and a base layer 1412. The coating layer 160 may completely coat the top layer 1411 and cover at least a part of the surface of the filament electrode 130 facing the top layer 1411. The base layer 1412 is uncovered. The same or similar added material as or to that in the coating layer 160 is added in the base layer 1412, so that color values of the base layer 1412 and the coating layer 160 are finally displayed within the same RGB value range. For example, an original material is added with titanium dioxide, so that both the coating layer 160 and the base layer 1412 present a white color or a color close to the white color, and the color values thereof are within a range of R value (235-255), G value (235-255), and B value (235-255); or graphene continues to be added, so that both the coating layer 160 and the base layer 1412 present a gray color or a color close to the gray color, and the color values thereof are within a range of R value (100-234), G value (100-254), and B value (235-254). For example, white powder granules are added in both the coating layer 160 and the base layer 1412, that is, when titanium dioxide is added in the coating layer 160, the titanium dioxide is also added in the base layer 1412. Meanwhile, the additive amount of the titanium dioxide is 1% to 20%, more preferably 3% to 15% of the total weight of solid granules (powder) in the base layer 1412.

In some embodiments, the first light conversion layer 141 has a top layer 1411 and a base layer 1412. The coating layer 160 may completely coat the top layer 1411 and cover at least a part of the surface of the filament electrode 130 facing the top layer 1411. The base layer 1412 is uncovered. The base layer 1412 contains a different additive material than that in the coating layer 160, so that the values of the colors finally presented by the base layer 1412 and the coating layer 160 are displayed within different RGB value ranges. In some embodiments, the RGB color standard may be interconverted with other color standards.

In some embodiments, the added materials in the base layer 1412 and the coating layer 160 are same, so that the base layer 1412 and the coating layer 160 present the same color, for example, the base layer 1412 presents a white color. The coating layer 160 is disposed on the top layer 1411. The coating layer 160 completely covers part of the first light conversion layer 141, or completely covers the top layer 1411, so that the filament presents a white color without being turned on. Certainly, the coating layer 160 may also cover at least part of the first light conversion layer 141.

In some embodiments, the added materials in the base layer 1412 and the coating layer 160 are same, so that the base layer 1412 and the coating layer 160 present the same color, for example, the base layer 1412 presents a white color. The coating layer 160 continues to be disposed on the base layer 1412. The coating layer 160 completely covers part of the first light conversion layer 141, or completely covers the base layer 1412, so that the filament presents a white color without being turned on. Certainly, the coating layer 160 may also cover at least part of the first light conversion layer 141.

In some other embodiments of the present application, silver-gray or silver-white thermally conductive particles are added in the base layer 1412. The thermally conductive particles include but not limited to aluminum powder or aluminum powder oxides, silver powder, or aluminum and silver mixed powder. The silver-gray or silver-white thermally conductive particles may be disposed on the base layer 1412 or the coating layer 160, so that at least one surface of the flexible filament is silver-gray or silver-white.

When the silver-gray or silver-white thermally conductive particles are disposed in the base layer 1412, the thermally conductive particles account for 0.15% to 10%, preferably 0.3% to 5% of the total solid granules in the base layer 1412. The total weight of the thermally conductive particles (including but not limited to aluminum oxide or silicon dioxide) and the fluorescent powder granules in the base layer 1412 is 95% to 99% of the total weight of the solid granules in the base layer 1412. The proportion of the solid granules in the base layer 1412 is controlled to increase the thermal conductivity coefficient of the substrate 110 and improve the conduction of heat generated when the deposition unit 121 emits light.

The silver-gray or silver-white thermally conductive particles are distinguished from the thermally conductive particles, that is, the silver-gray or silver-white thermally conductive particles may be referred to as color rendering particles. The color rendering particles account for 0.15% to 10%, preferably 0.3% to 5% of the total solid particles in the base layer 1412. Certainly, the silver or silver-gray thermally conductive particles, the thermally conductive granules, and the fluorescent powder granules may also be added in the base layer 1412 based on different proportions.

In an embodiment of the present application, the silver or silver-gray thermally conductive particles are disposed in the coating layer 160, and the weight of the silver or silver-gray thermally conductive particles accounts for 0.05% to 10%, preferably 0.15% to 5% of the total weight of the coating layer 160. The thickness of the top layer 1411 disposed on the surface of the base layer 1412 facing the deposition unit 121 is 0.2 mm to 0.6 mm, more preferably 0.35 mm to 0.5 mm; the thickness of the base layer 1412 is 0.05 mm to 0.3 mm, more preferably 0.1 mm to 0.2 mm; the thickness of the base layer 1412 is 0.04 mm to 0.3 mm, more preferably 0.08 mm to 0.15 mm; and the thickness of the base layer 1412 is less than or equal to one-third, preferably one-quarter of a sum of the thicknesses of the base layer 1412, the top layer 1411, and the coating layer 160. Thus, both the appearance requirement and the light-emitting and heat dissipation requirements can be met.

In some other embodiments, golden thermally conductive particles are added in the base layer 1412. The thermally conductive particles include but not limited to bronze powder, brass powder, gold powder, or a combination thereof. The golden thermally conductive particles may be disposed on the base layer 1412 or the coating layer 160, so that at least one surface of the flexible filament is golden.

When the golden thermally conductive particles are disposed in the base layer 1412, the thermally conductive particles account for 0.5% to 15%, preferably 1% to 10% of the total solid particles in the base layer 1412. The total weight of the thermally conductive granules (including but not limited to aluminum oxide or silicon dioxide) and the fluorescent powder granules in the base layer 1412 is 90% to 99% of the total weight of the solid particles. The silver-gray or silver-white thermally conductive particles are distinguished from the thermally conductive granules, that is, the golden thermally conductive particles may be referred to as color rendering particles. The color rendering particles account for 0.5% to 15%, preferably 1% to 10% of the total solid particles in the base layer 1412. Certainly, the golden thermally conductive particles, the thermally conductive granules, and the fluorescent powder granules may also be added in the base layer 1412 based on different proportions.

In an embodiment, the golden thermally conductive particles are disposed in the coating layer 160, and the weight of the golden thermally conductive particles accounts for 0.05% to 10%, preferably 0.1% to 5% of the total weight of the coating layer 160. The thickness of the top layer 1411 disposed on the surface of the base layer 1412 facing the deposition unit 121 is 0.1 mm to 1 mm, more preferably 0.35 mm to 0.5 mm; the thickness of the base layer 1412 is 0.05 mm to 0.3 mm, more preferably 0.1 mm to 0.2 mm; the thickness of the base layer 1412 is 0.04 mm to 0.3 mm, more preferably 0.08 mm to 0.15 mm; and the thickness of the base layer 1412 is less than or equal to one-third, preferably one-quarter of a sum of the thicknesses of the base layer 1412, the top layer 1411, and the coating layer 160, so that both the appearance requirement and the light-emitting and heat dissipation requirements can be met.

As described above, the light conversion unit includes a first light conversion layer and a second light conversion layer. In an embodiment, the second light conversion layer covers the chip strip structure and is located between the chip strip structure and the first light conversion layer, so that the light-emitting diode filament has good color reproducibility or high color rendering. On this basis, the light-emitting diode filament further includes a coating layer. The coating layer completely coats the first light conversion layer, has a different color from the first light conversion layer in a state where the light-emitting diode filament does not work, and is configured to change the surface color of the light-emitting diode filament. For example, different materials are mixed to fabricate the coating layer, so that the light-emitting diode filament presents different colors, or the light-emitting diode filament presents different colors in turn-on and turn-off states, thereby improving the appearance and light-emitting effect of a lamp using the light-emitting diode filament.

Figure 23:
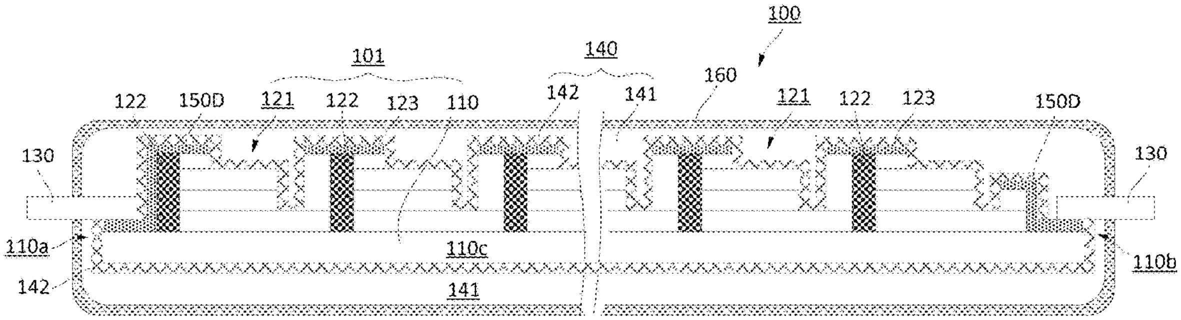
FIG. 23 shows a schematic side view where a second light conversion layer and a coating layer are formed on a chip strip structure in an embodiment.

Reference is made to FIG. 23, which shows a schematic side view where a second light conversion layer and a coating layer are formed on a chip strip structure in an embodiment of the present application. As shown in the figure, the light-emitting diode filament 100 includes: a chip strip structure 101, a light conversion unit 140 wrapping the chip strip structure 101, and electrodes 130 located at two ends of the chip strip structure 101 in a length direction and electrically connected thereto, where at least part of the electrodes 130 are wrapped in the light conversion unit 140; and a coating layer 160. The coating layer 160 completely coats the first light conversion layer 141 of the light conversion unit 140, has a different color from the first light conversion layer 141 in a state where the light-emitting diode filament 100 does not work, and is configured to change the surface color of the light-emitting diode filament 100. For example, different materials are mixed to fabricate the coating layer, so that the light-emitting diode filament 100 presents different colors, or the light-emitting diode filament 100 presents different colors in turn-on and turn-off states, thereby improving the appearance and light-emitting effect of a lamp using the light-emitting diode filament 100.

In this embodiment, the first light conversion layer 141 is a packaging structure configured to package the entire filament strip. In some cases, the packaging structure is also referred to as a glue sealing layer. The relevant description of the first light conversion layer 141 in the embodiments corresponding to FIG. 6 to FIG. 16 above will not be repeated herein.

In this embodiment, the second light conversion layer 142 covers the chip strip structure 101 and is located between the chip strip structure 101 and the first light conversion layer 141. Specifically, the second light conversion layer 142 completely covers the substrate 110, the deposition unit 121, the connecting layer 122, the conductor layer 123, and the electrode connection layer 150D. In this embodiment, the second light conversion layer includes red fluorescent powder of fluoride system, which can be effectively excited by blue light emitted from an LED chip in the light-emitting diode filament, and has the beneficial effects of narrowband emission of red light, high quantum efficiency, good thermal stability, etc. In some embodiments, the red fluorescent powder of the fluoride system is, for example, red $K_2SiF_6$:$Mn^{4+}$-KSF, $K_2TiF_6$:$Mn^{4+}$, $NaYF_4$:$Mn^{4+}$, $NaGdF_4$:$Mn^{4+}$, $K_3SiF_7$:$Mn^{4+}$, etc.

In the embodiment of FIG. 23, the coating layer 160 completely coats the first light conversion layer 141, and the color of the coating layer 160 is different from that of the first light conversion layer 141. The coating layer 160 may also be referred to as a layer-shaped body. The coating layer 160 coats the first light conversion layer 141 and covers at least a part of the filament electrode 130. A color rendering material or a photoconversion material is disposed in the coating layer 160.

In some embodiments of the present application, the coating layer 160 may be made of silica gel or a material mainly containing silica gel. When the silica gel is directly used, the coating layer 160 can present a white color by the color of the silica gel itself, so that the light-emitting diode filament 100 is white in appearance. After a colorant is added in the silica gel, the coating layer 160 can present different colors as described above. In addition, a photoreactive substance may also be added in the coating layer 160, so that light emitted from the deposition unit 121 is converted by the first light conversion layer 141 for the first time and then is converted by the photoreactive substance in the coating layer 160 for the second time, thereby ensuring that the light-emitting filament 100 has a first color when not turned on and has a second color different from the first color when turned on, where the first color and the second color have primary color difference. The relevant description of the coating layer 160 in the embodiments corresponding to FIG. 20 to FIG. 22 above will not be repeated herein.

Figure 24:
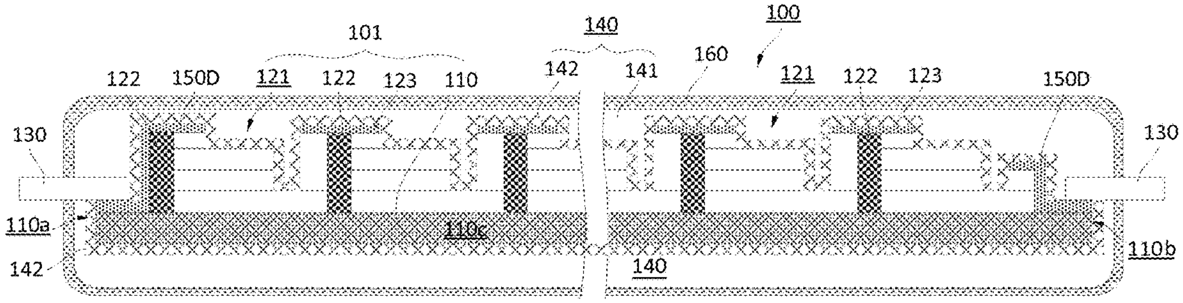
FIG. 24 shows a schematic side view where a second light conversion layer and a coating layer are formed on a chip strip structure in another embodiment.

To further improve the light-emitting diode filament to be with good color reproducibility or high color rendering, the red fluorescent powder may be added to the substrate 110 to form a fluorescent glass ceramic substrate. Reference is made to FIG. 24, which shows a schematic side view where a second light conversion layer and a coating layer are formed on a chip strip structure in another embodiment of the present application. In the embodiment of FIG. 24, the substrate 110 is a fluorescent glass ceramic substrate inlaid with red fluorescent powder of fluoride system to improve the color rendering index (CRI) of white light, and can enable the LED chip of the lighting device to improve the luminous flux and the color temperature under the excitation of power density of blue light. In some embodiments, the red fluorescent powder of the fluoride system is, for example, red $K_2SiF_6$:$Mn^{4+}$-KSF, $K_2TiF_6$:$Mn^{4+}$, $NaYF_4$:$Mn^{4+}$, $NaGdF_4$:$Mn^{4+}$, $K_3SiF_7$:$Mn^{4+}$, etc. In a specific example, the substrate 110 is, for example, a fluorescent glass ceramic substrate inlaid with red fluorescent powder $K_2SiF_6$:$Mn^{4+}$ (KSF). In this embodiment, the deposition unit 121, the connecting layer 122, the conductor layer 123, and the electrode connection layer 150D are covered with the second light conversion layer 142 containing the red fluorescent powder $K_2SiF_6$:$Mn^{4+}$ (KSF), and the red fluorescent powder is added to form the fluorescent glass ceramic substrate 110, so that the light-emitting diode filament can have good color reproducibility or high color rendering.

In the embodiment of FIG. 24, the second light conversion layer 142 also covers the deposition unit 121, the connecting layer 122, the conductor layer 123, and the electrode connection layer 150D. In this embodiment, the second light conversion layer 142 includes red fluorescent powder of fluoride system, which can be effectively excited by blue light emitted from an LED chip in the light-emitting diode filament, and has the beneficial effects of narrowband emission of red light, high quantum efficiency, good thermal stability, etc. In some embodiments, the red fluorescent powder of the fluoride system is, for example, red $K_2SiF_6$:$Mn^{4+}$-KSF, $K_2TiF_6$:$Mn^{4+}$, $NaYF_4$:$Mn^{4+}$, $NaGdF_4$:$Mn^{4+}$, $K_3SiF_7$:$Mn^{4+}$, etc. In the embodiment of FIG. 24, the second light conversion layer 142 includes red fluorescent powder $K_2SiF_6$:$Mn^{4+}$ (KSF).

On the basis that the above light-emitting diode filament is provided with the fluorescent glass ceramic substrate inlaid with the red fluorescent powder of the fluoride system and the second light conversion layer with the red fluorescent powder of the fluoride system, the first light conversion layer of the light conversion unit is further provided with a coating layer. As shown in FIG. 24, the coating layer 160 completely coats the first light conversion layer 141 of the light conversion unit 140, has a different color from the first light conversion layer 141 in a state where the light-emitting diode filament 100 does not work, and is configured to change the surface color of the light-emitting diode filament 100. For example, different materials are mixed to fabricate the coating layer 160, so that the light-emitting diode filament 100 presents different colors, or the light-emitting diode filament 100 presents different colors in turn-on and turn-off states, thereby improving the appearance and light-emitting effect of a lamp using the light-emitting diode filament 100.

In the embodiment of FIG. 24, the coating layer 160 completely coats the first light conversion layer 141, and the color of the coating layer 160 is different from that of the first light conversion layer 141. The coating layer 160 may also be referred to as a layer-shaped body. The coating layer 160 coats the first light conversion layer 141 and covers at least a part of the filament electrode 130. A color rendering material or a photoconversion material is disposed in the coating layer 160.

In some embodiments of the present application, the coating layer 160 may be made of silica gel or a material mainly containing silica gel. When the silica gel is directly used, the coating layer 160 can present a white color by the color of the silica gel itself, so that the light-emitting diode filament 100 is white in appearance. After a colorant is added in the silica gel, the coating layer 160 can present different colors as described above. In addition, a photoreactive substance may also be added in the coating layer 160, so that light emitted from the deposition unit 121 is converted by the first light conversion layer 141 for the first time and then is converted by the photoreactive substance in the coating layer 160 for the second time, thereby ensuring that the light-emitting filament 100 has a first color when not turned on and has a second color different from the first color when turned on, where the first color and the second color have primary color difference. The relevant description of the coating layer 160 in the embodiments corresponding to FIG. 20 to FIG. 22 above will not be repeated herein.

Figure 25:
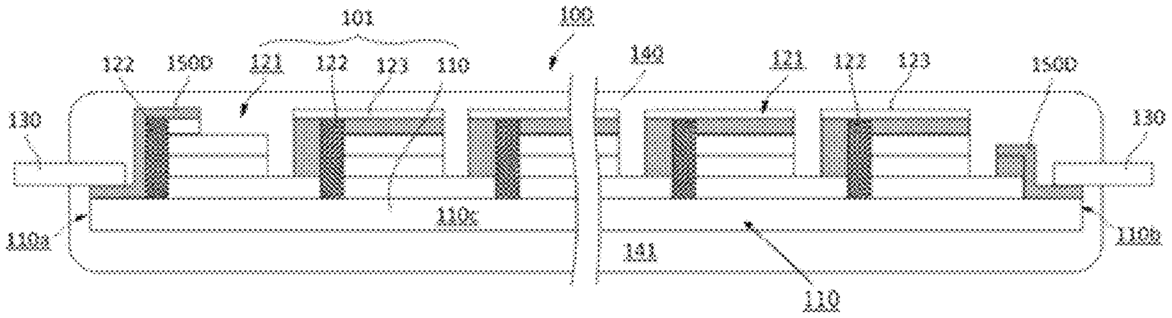
FIG. 25 shows a side view of a filament with an ITO thin film or layer as a conductive layer in an embodiment of the present application.

To further improve the luminous flux of the light-emitting diode filament, in an embodiment, the conductor layer configured to connect the adjacent deposition units in series may be realized by a transparent conductive thin film or a transparent conductive layer. Reference is made to FIG. 25, which shows a side view of a filament with an ITO thin film or layer as a conductive layer in an embodiment of the present application. As shown in the figure, the light-emitting diode filament 100 includes a chip strip structure 101, a light conversion unit 140 wrapping the chip strip structure 101, and electrodes 130 located at two ends of the chip strip structure 101 in a length direction and electrically connected thereto, where at least part of the electrodes 130 are wrapped in the light conversion unit 140. The chip strip structure 101 includes a substrate 110, a plurality of deposition units 121 formed on the substrate 110, a connecting layer 122 located on the substrate 110 and disposed between the plurality of deposition units 121, and a conductor layer 123 configured to electrically connect the deposition units 121. In the embodiment of FIG. 25, an indium tin oxide (ITO) or tin doped indium oxide thin film or layer is used as a transparent conductive layer or a transparent conductive thin film, namely the conductor layer 123 in FIG. 25. In the implemented embodiment, for example, the transparent conductive layer or the transparent conductive thin film as the ITO thin film or layer is deposited on the surface of the electrodes (the N electrode and the P electrode) of the semiconductor layer by means of electron beam evaporation, physical vapor deposition, or some sputter deposition technologies.

In this embodiment, to ensure sufficient electrical connection between the transparent conductive layer or the transparent conductive thin film as the ITO thin film or layer and the electrodes of the deposition unit, light-transmitting ohmic contact layers may be fabricated as the N electrode and the P electrode of the deposition unit. The light-transmitting ohmic contact layer is, for example, a metal layer with the thickness of 10-30 nm.

In an embodiment, the first electrode E1 as the N electrode or the second electrode E2 as the P electrode may be made of, for example, gold, copper, alloy, or any other suitable material formed by means of plating or any other suitable technology.

In an embodiment, in the method for fabricating the first electrode E1 as the N electrode or the second electrode E2 as the P electrode, an electron beam vacuum evaporation coating process is performed to form the first electrode E1 on the surface of the exposed part of the N-type semiconductor material and form the second electrode E2 on the surface of the retained P-type semiconductor material separately.

In an embodiment, in the method for fabricating the first electrode E1 as the N electrode or the second electrode E2 as the P electrode, by means of the sputter coating process, the first electrode E1 is formed on the surface of the exposed part of the N-type semiconductor material and the second electrode E2 is formed on the surface of the retained P-type semiconductor material separately. In this embodiment, the sputter coating process is, for example, ion beam sputtering or cathode sputtering.

Figure 26:
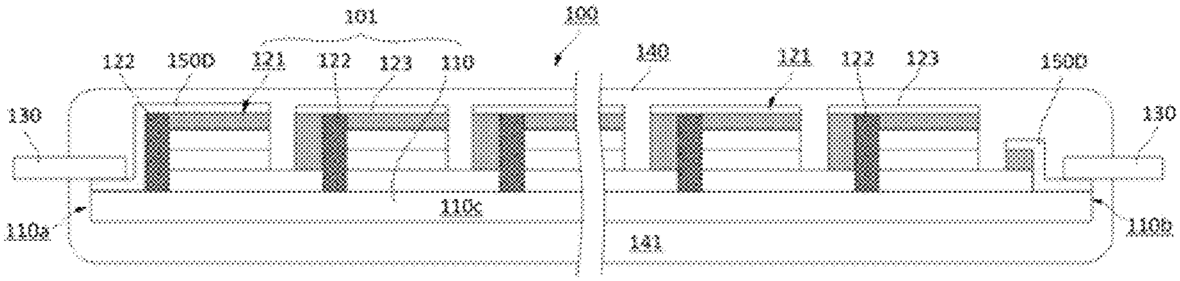
FIG. 26 shows a side view of a filament with an ITO thin film or layer as a conductive layer in another embodiment of the present application.

In another embodiment, the electrode extension end formed by the conductor layer may also be realized by the transparent conductive thin film or the transparent conductive layer. Reference is made to FIG. 26, which shows a side view of a filament with an ITO thin film or layer as a conductive layer in another embodiment of the present application. As shown in the figure, the electrode connection lavers 150D formed by the conductor layers are located at two ends (i.e., the end 110*a* and the end 110*b*) of the substrate 110 respectively and are configured to be electrically connected to the filament electrodes 130. In this embodiment, the electrode connection layer 150D may be fabricated together with the conductor layer 123 that is also the ITO thin film or layer. For example, an indium tin oxide or tin doped indium oxide thin film or layer is used as a transparent conductive layer or a transparent conductive thin film. For example, the transparent conductive layer or the transparent conductive thin film as the ITO thin film or layer is deposited on the surface of the electrodes (the N electrode and the P electrode) of the semiconductor layer by means of electron beam evaporation, physical vapor deposition, or some sputter deposition technologies.

In an embodiment, for the electrical connection between the electrode connection layers 150D of ITO thin films or layers that are formed at two ends (110*a* and 110*b*) of the substrate 110 in the length direction and the filament electrodes 130 can refer to the implementation methods provided in above-mentioned FIGS. 12 and 13. That is, the conductive rings as the filament electrodes 130 on two sides wrap the first end 110*a* or the second end 110*b* of the substrate 110 and the electrode connection layer 150D thereon, thus ensuring that electrode connection layer 150D and the filament electrode 130 have a larger contact area, and facilitating the electrical connection between the filament electrode 130 and the peripheral component such as a conductive bracket or a driving circuit.

In another embodiment, for the electrical connection between the electrode connection lavers 150D 150D of ITO thin films or layers that are formed at two ends (110*a* and 110*b*) of the substrate 110 in the length direction and the filament electrodes 130 can refer to the implementation method provided in FIG. 14 above. That is, the first light conversion layer 141 completely packages the plurality of deposition units 121 and conductor layers 123 that are formed on the substrate 110 therein. The first end 110*a* and the second end 110*b* of the substrate 110 and a part of the electrode connection lavers 150D 150D of ITO thin films or layers formed on the first end 110*a* and the second end 110*b* of the substrate 110 are not wrapped by the packaging structure. Conductive rings disposed at the first end 110*a* and the second end 110*b* of the substrate 110 to serve as a part of the filament electrodes 130 are also not wrapped by the packaging structure.

In yet another embodiment, the conductor layer configured to connect the adjacent deposition units in series may be realized by a transparent conductive thin film or a transparent conductive layer, but the deposition unit adjacent to the first end and/or the second end of the substrate is electrically connected to the filament electrode of the substrate by the lead formed by means of the wire bonding process, as shown in FIG. 15*b* above.

In yet another embodiment where the electrode extension end formed by the conductor layer may also be realized by the transparent conductive thin film or the transparent conductive layer, to ensure the stability of connection between the filament electrode 130 and the electrode connection layer 150D of ITO thin film or layer, a part of the filament electrode 130 may be disposed between the electrode connection layer 150D and the substrate 110, that is, the configuration of the filament electrode 130 may be implemented by a stacked structure formed by the electrode connection layer 150D, the filament electrode 130, and the substrate 110, for which, reference can be made to the embodiments provided in FIGS. 16 and 13 above.

In some embodiments, provided in FIG. 25 and FIG. 26, the electrode extension end formed by the conductor layer may also be realized by the transparent conductive thin film or the transparent conductive layer, the above coating layer still may be used to coat the first conversion layer, has a different color from the first light conversion layer in a state where the light-emitting diode filament does not work, and is configured to change the surface color of the light-emitting diode filament. For example, different materials are mixed to fabricate the coating layer, so that the light-emitting diode filament presents different colors, or the light-emitting diode filament presents different colors in turn-on and turn-off states, thereby improving the appearance and light-emitting effect of a lamp using the light-emitting diode filament.

A second aspect of the present application provides a lighting device. The lighting device includes a lamp housing and a light-emitting diode filament disposed in the lamp housing. In the present application, adjacent deposition units on a substrate of the light-emitting diode filament are electrically connected by a conductor layer, so that the distance between light-emitting diodes is shortened, and more deposition units may be disposed in unit length of the light-emitting diode filament to increase the lumen of the light-emitting diode filament in unit length. In some embodiments, the light-emitting diode filament may be configured in LED lighting devices with different shapes, specifications, or power, such as bulb lamps, straight tube lamps, panel lamps, flat panel lamps, hanging lamps, recessed lamps, concave lamps, embedded lamps, and ceiling lamps. In embodiments described below, the application of the light-emitting diode filament to the straight tube lamp is used as an example for description, and it should be understood that the application is not limited to this. In some embodiments, for the implementation of the light-emitting diode filament, reference can be made to the embodiments described in FIG. 1*a* to FIG. 26 above, and it will not be repeated herein.

Figure 27:
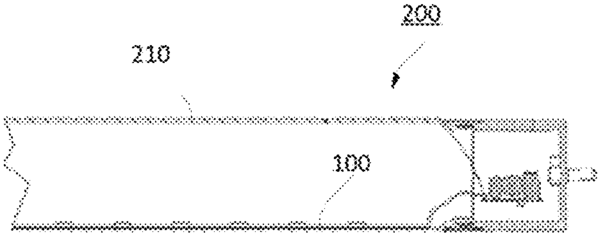
FIG. 27 shows a schematic structural diagram of a lighting device in an embodiment of the present application.

In some embodiments, the substrate of the light-emitting diode filament includes a sapphire ($Al_2O_3$) substrate, a silicon (Si) substrate, a silicon carbide (SiC) substrate, a gallium nitride (GaN) or composite substrate, a glass substrate, a metal substrate, or a hard substrate such as a fiberglass substrate. Reference is made to FIG. 27, which shows a schematic structural diagram of a lighting device in an embodiment of the present application. As shown in the figure, the lighting device 200 includes a lamp housing 210 and a light-emitting diode filament 100 disposed in the lamp housing 210.

Figure 28A:
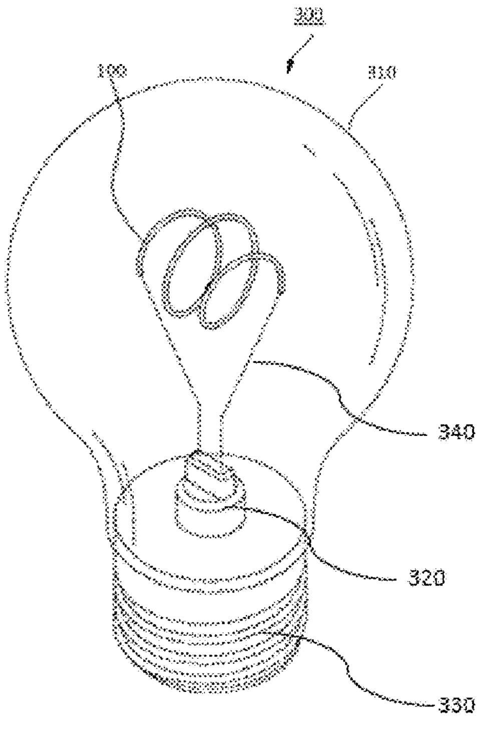
FIG. 28*a* shows a schematic structural diagram of a lighting device in another embodiment of the present application.
Figure 28B:
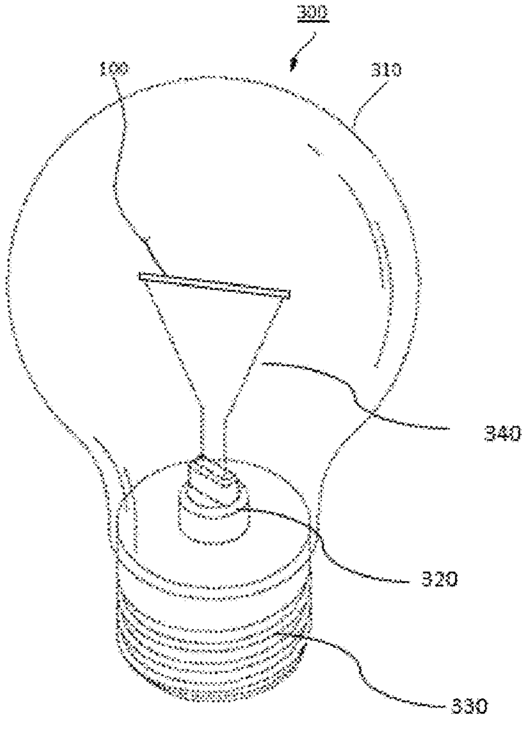
FIG. 28*b* shows a schematic structural diagram of a lighting device in another embodiment of the present application.

In another embodiment, the substrate of the light-emitting diode filament may also be a soft substrate. The soft substrate is also referred to as a flexible substrate. In an embodiment, the flexible substrate is an FPC substrate, so that the filament may have a certain degree of bending. The soft filament with the FPC substrate may be bent to achieve more filament curves or shapes. In another embodiment, the flexible substrate is, for example, a flexible PCB. The flexible PCB may be made of a transparent or semi-transparent material. The flexible PCB is fabricated by printing a polyimide or polyester film substrate with a circuit. The light-emitting diode filament may be used as a bulb lamp. Reference is made to FIG. 28*a* and FIG. 28*b*, which show schematic structural diagrams of a lighting device in another embodiment of the present application. As shown in the figures, the lighting device 300 includes a bulb-shaped lamp housing 310 and at least one light-emitting diode filament 100 disposed in the lamp housing 310, and further includes a lamp cap 330 and a stem 320. In some embodiments, at least one conductive bracket 340 is further disposed. The light-emitting diode filament 100 is connected to the stem 320, or the light-emitting diode filament 100 is connected to and in conduction with the conductive bracket 340. The conductive bracket 340 is connected to and in conduction with the stem 320 (where the filament electrode is a conduction connection portion between the light-emitting diode filament and the stem or the conductive bracket), that is, the light-emitting diode filament 100 is connected to the stem 320 to implement electrical conduction, and the stem 320 is connected to and in conduction with the lamp cap 330. The stem 320 is located in the lamp housing 310. The lamp housing 310 and the lamp cap 330 are connected and fixed to each other and form a closed space for accommodating the light-emitting diode filament 100, the stem 320, the conductive bracket 340, etc.

A third aspect of the present application further provides a fabrication method for a light-emitting diode filament. The adjacent deposition units on the substrate of the light-emitting diode filament are electrically connected by the conductor layer, so that the distance between light-emitting diodes is shortened, and more deposition units may be disposed in unit length of the light-emitting diode filament to increase the lumen of the light-emitting diode filament in unit length.

In some embodiments, the light-emitting diode filament may be configured in LED lighting devices with different shapes, specifications, or power, such as bulb lamps, straight tube lamps, panel lamps, flat panel lamps, hanging lamps, recessed lamps, concave lamps, embedded lamps, and ceiling lamps. In embodiments described below, the application of the light-emitting diode filament to the straight tube lamp is used as an example for description, and it should be understood that the application is not limited to this.

Figure 29:
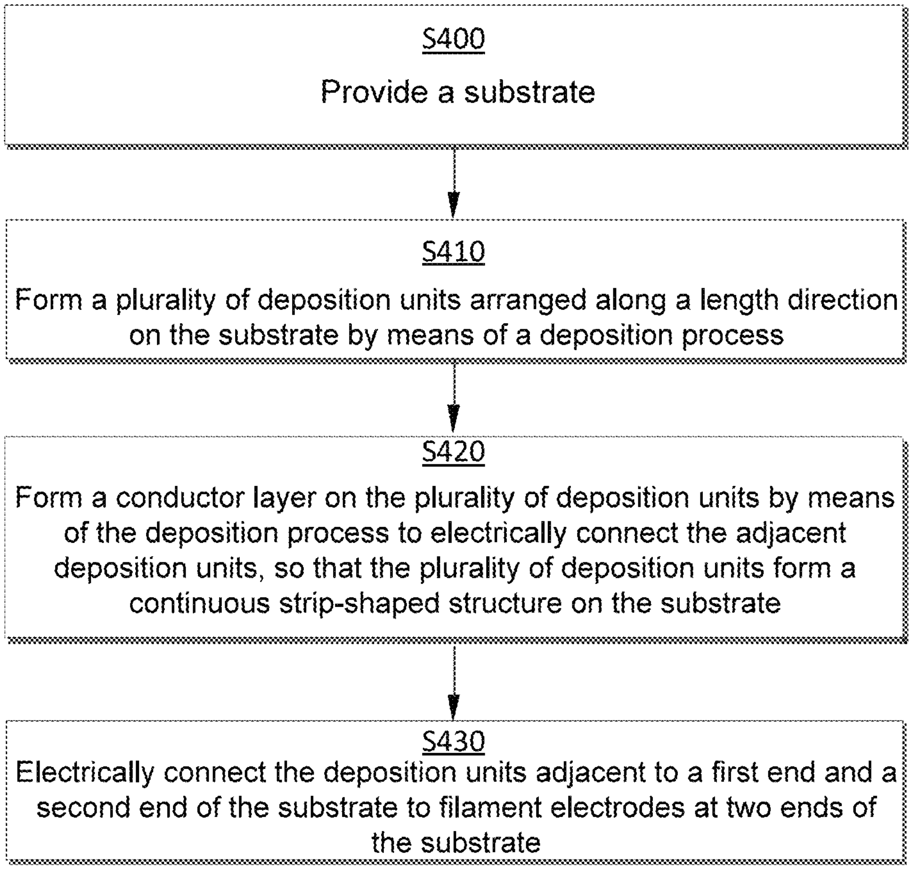
FIG. 29 shows a flowchart of a fabrication method in an embodiment of the present application.

Reference is made to FIG. 29, which shows a flowchart of a fabrication method in an embodiment of the present application. As shown in the figure, the fabrication method for the light-emitting diode filament includes the following steps.

First, a step S400 is performed, where a substrate is provided. The substrate has a first end, a second end away from the first end, and a deposition segment located between the first end and the second end. In an embodiment, the substrate includes a sapphire ($Al_2O_3$) substrate, a silicon (Si) substrate, a silicon carbide (SiC) substrate, a gallium nitride (GaN) or composite substrate, a glass substrate, a metal substrate, a fiberglass substrate, or a PCB, but is not limited to this. In this embodiment, the substrate being the sapphire substrate is used as an example for description. The sapphire substrate is transparent or almost transparent, and allows photons generated from a light-emitting layer to penetrate through.

In some embodiments, the thickness of the substrate is controlled to be 0.25-0.45 mm, more preferably 0.07-0.7 mm. For example, the thickness of the sapphire substrate is controlled to be 0.07-0.7 mm, namely 70-700 μm.

In some embodiments, the length of the substrate 110 is 80-200 mm, such as approximately 80 mm, 90 mm, 100 mm, 110 mm, 120 mm, 130 mm, 140 mm, 150 mm, 160 mm, 170 mm, 180 mm, 190 mm, or 200 mm.

In the embodiment where the substrate is a sapphire substrate, the sapphire substrate configured to deposit the plurality of deposition units may be processed by means of thinning and/or texturing, roughening, or patterning.

In another embodiment, the substrate may also be a soft substrate. The soft substrate is also referred to as a flexible substrate. In an embodiment, the flexible substrate is an FPC substrate, so that the filament may have a certain degree of bending. The soft filament with the FPC substrate may be bent to achieve more filament curves or shapes. In another example, the flexible substrate is a flexible PCB. The flexible PCB may be made of a transparent or semi-transparent material. The flexible PCB is formed by printing a circuit on a polyimide or polyester film substrate.

In an embodiment, the first end and/or the second end of the substrate provided in the step S400 may be pre-provided with a filament electrode separately, so that a conductive layer (an electrode extension end formed by the conductive layer) deposited in the subsequent step can be directly electrically connected to the filament electrode.

In another embodiment, the first end and/or the second end of the substrate provided in the step S400 is not pre-provided with a filament electrode in advance, so that the filament electrode may be provided separately in the subsequent step S430 to complete the electrical connection between the filament electrode and the deposition unit.

In yet another embodiment, the substrate provided in the step S400 is a fluorescent glass ceramic substrate inlaid with red fluorescent powder of fluoride system to improve the color rendering index (CRI) of white light, and can enable the LED chip of the lighting device to improve the luminous flux and the color temperature under the excitation of power density of blue light. In some embodiments, the red fluorescent powder of the fluoride system is, for example, red $K_2SiF_6:Mn^{4+}$-KSF, $K_2TiF_6:Mn^{4+}$, $NaYF_4:Mn^{4+}$, $NaGdF_4:Mn^{4+}$, $K_3SiF_7:Mn^{4+}$, etc. In a specific example, the substrate is, for example, a fluorescent glass ceramic substrate inlaid with red fluorescent powder $K_2SiF_6:Mn^{4+}$ (KSF). For example, in the embodiment of FIG. 19, the deposition unit 121, the connecting layer 122, the conductor layer 123, and the electrode connection layer 150D are covered by the second light conversion layer 142 containing the red fluorescent powder $K_2SiF_6:Mn^{4+}$ (KSF), and the red fluorescent powder is added to form the fluorescent glass ceramic substrate 110, so that the light-emitting diode filament can have good color reproducibility or high color rendering.

A step S410 is performed, where a plurality of deposition units arranged along the length direction of the substrate are formed on the upper surface of the deposition segment of the substrate by means of the deposition process, so that the plurality of deposition units are arranged along the length direction of the substrate to form a continuous strip-shaped structure. In the present application, each deposition unit has a photoelectric conversion capability, that is, the deposition unit can be implemented as having a light-emitting function. In an embodiment, the deposition unit is fabricated as a relatively independent LED light-emitting body or light-emitting unit.

In an embodiment, the plurality of deposition units are directly deposited on, for example, a sapphire substrate. When the sapphire substrate is used as a main substrate, a main substrate made of, for example, silicon, ceramic, metal, or any other suitable material does not need to be additionally provided.

In some embodiments, the number of the plurality of deposition units formed on the deposition segment of the substrate is 50, and a voltage at two ends is 130-135 V.

In some other embodiments, the number of the plurality of deposition units formed on the deposition segment of the substrate is 100, and a voltage at two ends is 260-265 V.

In some embodiments, the specification of the deposition units formed on the deposition segment of the substrate includes 9 mil×18 mil, 11 mil×30 mil, 13 mil×30 mil, or a combination thereof.

The deposition unit that forms the light-emitting diode continuously extends from one end to the other end of the substrate, that is, light emission of the entire filament is implemented by a complete light-emitting diode array. A majority of regions on the surface of the substrate are covered by the deposition unit, so the deposition unit may have a large light-emitting area.

In some embodiments, the light-emitting area of the deposition unit may be understood as a top area of the deposition unit minus a part of the deposition unit covered by the conductor layer, the first electrode, and the second electrode, and the lengths and widths of the conductor layer, the first electrode, and the second electrode may be adjusted as needed. For example, a proportion of the light-emitting area of the deposition unit in the top area of the deposition unit is greater than 94% and less than 100%, such as approximately 95%, 96%, 97%, 98%, or 99%. The deposition units are connected by the conductor layer instead of the lead formed by means of the wire bonding process, so there is no need to provide a pad structure for wire bonding on the deposition unit, and the deposition unit may have a large light-emitting area.

In some embodiments, the ratio of a total area occupied by the plurality of deposition units formed on the deposition segment of the substrate to an upper surface area of the deposition segment of the substrate is 0.94-0.99, such as 94%, 95%, 96%, 97%, 98%, or 99%.

In some embodiments, deposition units may be disposed on the light-emitting diode filament by parameter relationships shown in Table 1 above.

By performing the step S410, each deposition unit in the plurality of deposition units includes a first semiconductor layer, a first electrode, a second semiconductor layer, a second electrode, and a light-emitting layer formed between the first semiconductor layer and the second semiconductor layer, as shown in the structure of FIG. 7*a* or FIG. 7*b* above.

In the present application, the first semiconductor layer and the second semiconductor layer have different conductivity types. For example, in an embodiment, the material of the first semiconductor layer is the N-type semiconductor material, and correspondingly, the material of the second semiconductor layer is the P-type semiconductor material. For example, the first semiconductor layer is N-type doped gallium nitride (n-GaN), correspondingly the second semiconductor layer is P-type doped gallium nitride (p-GaN), and a material of the light-emitting layer is indium gallium nitride (InGaN).

The deposition unit includes a light-emitting or active region sandwiched between the N-type semiconductor material and the P-type semiconductor material, namely the above light-emitting layer. In the step S410, the N-type semiconductor material may be first grown on the sapphire substrate. The N-type semiconductor material may include a plurality of layers with different compositions and dopant concentrations, such as preparation layers such as buffer layers or nucleation layers, and/or layers designed to promote the removal of the growth substrate, which may be N-type or unintentionally doped, and N-type device layers designed to obtain specific optical, material, or electrical properties for efficient light emission in a light-emitting region.

In the step S410, the light-emitting or active region is grown on the N-type semiconductor material to form the light-emitting layer. Examples of the suitable light-emitting layer include a single thick or thin light-emitting layer, or a multi-quantum well light-emitting region including a plurality of thin or thick light-emitting layers separated by a barrier layer. Then, the P-type semiconductor material may be grown on the light-emitting layer. Similar to the N-type semiconductor material, the P-type semiconductor material may include a plurality of layers with different compositions, thicknesses, and dopant concentrations, including unintentionally doped layers.

In the step S410, after the growth of the first semiconductor layer and the second semiconductor layer, part of the second semiconductor layer and the light-emitting layer are removed by means of the mask and etching process or the photoetching process to expose a part of the first semiconductor layer. Then, the first electrode is formed on the surface of the exposed part of the N-type semiconductor material and the second electrode is formed on the retained surface of the P-type semiconductor material. In an embodiment, the first electrode may be referred to as an N electrode, and the second electrode may be referred to as a P electrode. In this embodiment, the N electrode and the P electrode are electrically isolated from each other by a gap. The gap may be filled with a dielectric such as silicon oxide or any other suitable material. The gap may be filled with a dielectric material or different solid materials, or may be unfilled and isolated by air.

In an embodiment of the step S410, the first electrode as the N electrode or the second electrode as the P electrode may include one or more conducting layers, such as reflective metals and protective metals, which may prevent or reduce the electromigration of the reflective metals. The reflective metal is usually silver, but may include any one or more suitable materials.

In an embodiment of the step S410, in the process of fabricating the N electrode, a plurality of N electrode via holes may also be formed. The N electrode and the P electrode are not limited to the arrangement shown in FIG. 7*a*. The N electrode and the P electrode may be redistributed to form a bonding pad with a dielectric/metal lamination.

In an embodiment of the step S410, the first electrode as the N electrode or the second electrode as the P electrode may be made of, for example, gold, copper, alloy, or any other suitable material formed by means of plating or any other suitable technology.

In an embodiment of the step S410, in the method for fabricating the first electrode as the N electrode or the second electrode as the P electrode, an electron beam vacuum evaporation coating process is performed to form the first electrode on the surface of the exposed part of the N-type semiconductor material and form the second electrode on the surface of the retained P-type semiconductor material separately.

In an embodiment of the step S410, in the method for fabricating the first electrode as the N electrode or the second electrode as the P electrode, by means of the sputter coating process, the first electrode is formed on the surface of the exposed part of the N-type semiconductor material and the second electrode is formed on the surface of the retained P-type semiconductor material separately. In this embodiment, the sputter coating process is, for example, ion beam sputtering or cathode sputtering.

In an embodiment of the step S410, the N electrode or the P electrode may include a transparent electrode that can conduct electricity and transmit light. In the embodiment of FIG. 7*b*, the transparent electrode may be an indium tin oxide (ITO for short) or tin doped indium oxide thin film or layer (i.e., ITO shown in FIG. 7*b*). In an embodiment where the ITO thin film or layer is used as an electrode contact layer, the ITO thin film or layer is most usually deposited on the surface by means of electron beam evaporation, physical vapor deposition, or some sputter deposition technologies.

In some embodiments, since the ITO thin film or the ITO layer cannot be used as the pad, in the specific fabrication process, first, ohmic electrodes (also referred to as electrode contacts or ohmic contacts) need to be fabricated on the surfaces of the first and second semiconductor materials, then the surface of the ohmic electrode is covered by an ITO thin film or layer, and the surface of the ITO thin film or layer is evaporated with a layer of metal pad to form the P electrode or the N electrode. In this way, the current flowing through the deposition unit is uniformly distributed on the ohmic contact electrodes through the ITO thin film or layer. Meanwhile, the refractive index of the ITO thin film or layer is between the refractive index of air and the refractive index of the deposition material, so that the light-emitting angle and the luminous flux can be improved.

In some embodiments, the conductor layer configured to connect two deposition units may be directly deposited on the ITO thin film or layer. In the specific fabrication process, first, ohmic electrodes (also referred to as electrode contacts or ohmic contacts) need to be fabricated on the surfaces of the first and second semiconductor materials, then the surface of the ohmic electrode is covered by an ITO thin film or layer, and the surface of the ITO thin film or layer is evaporated with a conductor layer to connect two adjacent deposition units, so that the overall thickness of the filament may be further reduced, and the current of the deposition unit is uniformly distributed on the ohmic contact electrodes through the ITO thin film or layer. Meanwhile, the refractive index of the ITO thin film or layer is between the refractive index of air and the refractive index of the deposition material, so that the light-emitting angle and the luminous flux may be improved.

Figure 31:
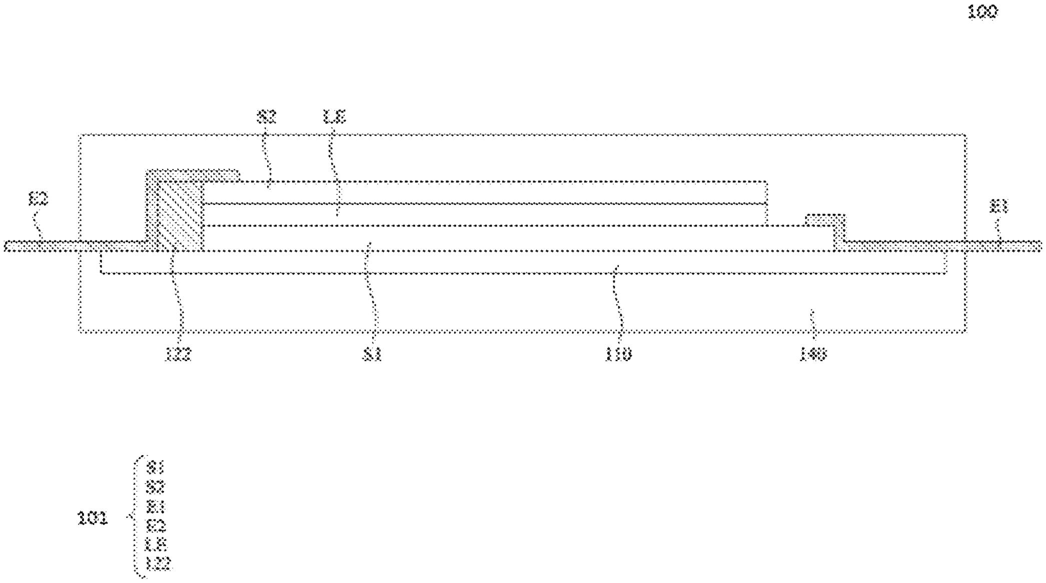
FIG. 31 shows a side view of a light-emitting diode filament in yet another embodiment of the present application.

In an embodiment of the step S410, a step of forming a connecting layer between the adjacent deposition units on the substrate by means of the deposition process is further included, so that the plurality of deposition units form the continuous strip-shaped structure on the substrate. In this way, the fabricated light-emitting diode filament is in a chip strip structure as a whole, thereby strengthening the strength of the overall structure of a chip strip and ensuring that the electrical connection between the deposition units will not be broken due to "disconnection". FIG. 31 shows a side view of a light-emitting diode filament in yet another embodiment of the present application. As shown in the figure, the chip strip structure 101 continuously extends from one end to the other end of the substrate 110, that is, light emission of the entire filament is implemented by one complete chip strip structure 101. A majority of regions on the surface of the substrate 110 are covered by the chip strip structure 101, so the light-emitting diode 100 may have a large light-emitting area. A proportion of the top area of the chip strip structure 101 in the top area of the substrate 110 is greater than 94% and less than 100%, such as 95%, 96%, 97%, 98%, or 99%.

In some embodiments, the length of the substrate 110 ranges from 80 mm to 200 mm, such as 80 mm, 100 mm, 120 mm, 140 mm, 160 mm, 180 mm, or 200 mm.

In an embodiment of the step S410, a connecting layer is formed between the adjacent deposition units on the substrate, and a connecting layer is disposed on an outer side of the deposition unit adjacent to the first end of the substrate to form a protective layer, thereby isolating the contact between the conductor layer and the first semiconductor layer, the light-emitting layer, and the second semiconductor layer of the deposition unit.

In an embodiment of the step S410, the ratio of the height of the fabricated connecting layer to the height of the deposition unit is 0.80-1.20. In other words, to enable the fabricated light-emitting diode filament to be in the chip strip structure as a whole, in the process of fabricating the light-emitting diode filament, the height of the connecting layer fabricated by means of the deposition process is almost approximate to or the same as the height of the deposition unit, so that there is no gap or significant height difference in physical structure between the plurality of deposition units. Specifically, the ratio of the height of the connecting layer to the height of the deposition unit is 0.80, 0.90, 1.00, 1.10, or 1.20.

In an embodiment of the step S410, to ensure that the fabricated light-emitting diode filament may provide more lumens or better heat dissipation efficiency in unit length, in this embodiment, as many deposition units as possible are disposed by controlling the distance between the adjacent deposition units. The ratio of a first length of the connecting layer along the length direction of the substrate to a second length of each deposition unit along the length direction of the substrate is 0.05-0.30. When the ratio of the first length to the second length is within the above range, the light-emitting diode filament may maintain high heat dissipation efficiency and large light-emitting area.

In an embodiment of the step S410, to enable the fabricated light-emitting diode filament to be in the chip strip structure as a whole, in the process of fabricating the light-emitting diode filament, the width of the connecting layer fabricated by means of the deposition process is almost approximate to or the same as the width of the deposition unit. In an embodiment, a first width of the connecting layer along the width direction of the substrate is equal to a second width of each deposition unit along the width direction of the substrate. In this embodiment, the first width of the connecting layer along the width direction of the substrate is almost equal to the second width of the deposition unit along the width direction of the substrate, so that the fabricated light-emitting diode filament is in the chip strip structure as a whole. For example, the corresponding parameters listed in Table 1 above will not be repeated herein.

In an embodiment of the step S410, the adjacent deposition units are electrically connected to each other in a manner that the connecting layer is covered with a conductor layer. In this embodiment, the conductor layer is located on an upper surface of the connecting layer, so that the conductor layer between two adjacent deposition units may be attached to the connecting layer.

In another embodiment of the step S410, the adjacent deposition units are electrically connected to each other in a manner that the formed conductor layer penetrates through the connecting layer. In this embodiment, both the upper and lower surfaces of the conductor layer are in contact with the connecting layer. In the fabrication process, it is possible to first form the connecting layer between the adjacent deposition units by means of the deposition process, then form the conductor layer on the connecting layer by means of the deposition process to electrically connect the adjacent deposition units on two sides of the connecting layer, and cover the conductor layer with the connecting layer by means of the deposition process to embed the conductor layer therein, so that the firmness of electrical connection between the adjacent deposition units is strengthened, and the fabricated light-emitting diode filament that is in the chip strip structure as a whole has more stable consistency.

A step S420 is performed, where a conductor layer is formed on the plurality of deposition units by means of the deposition process to electrically connect the adjacent deposition units, so that the plurality of deposition units form a continuous strip-shaped structure on the substrate.

In an embodiment of the step S420, a step of forming conductor layers between the adjacent deposition units and on the deposition units adjacent to the first end and the second end of the substrate by means of an evaporation or sputtering process is further included. In the present application, the conductor layer is formed by means of the deposition process, so that the thickness of an electrical connection structure between the deposition units in the present application is smaller than the thickness of the lead formed by means of the conventional wire bonding process (the wire in wire bonding needs to maintain an arc-shaped segment, thus leading to large overall thickness), thereby reducing the overall thickness of the light-emitting diode filament. In addition, the formation of the conductor layer by means of the deposition process in the present application may avoid wire falling or breakage.

For example, the length of the light-emitting diode filament (mainly the length of the substrate) is 83 mm, the deposition units fabricated in the step S420 are connected by the conductor layer, the thickness of the connecting layer between the deposition units along the length direction of the filament is controlled to 0.02-0.3 mm, and the number of deposition units may be 100. In a comparative example, if the length of the light-emitting diode filament 100 is also 83 mm, the deposition units are connected by means of wire bonding, the distance between the deposition units needs to be set to 0.3-1 mm, and the number of deposition units is 50. From this, it can be seen that the number of deposition units in unit length of the light-emitting diode filament in the above embodiment is twice that in the comparative example, so that nearly twice the lumen may be provided. Similarly, it can be proven that with the same number of deposition units, the length of the light-emitting diode filament in the embodiment may be shortened to nearly half that in the comparative example, that is, only 0.5 times the length in the wire bonding process is required.

In an embodiment of the step S420, the material of the conductor layer includes conductive materials such as copper, gold, silver, and alloy, but is not limited to this.

In the step S420, when the conductor layer is fabricated, the conductor layer and the first electrode and the second electrode of each deposition unit are formed by means of a one-time deposition process. In this embodiment, in the method for fabricating the first electrode as the N electrode or the second electrode as the P electrode, the electron beam vacuum evaporation coating process or the sputter coating process is performed to form the first electrode on the surface of the exposed part of the N-type semiconductor material and form the second electrode on the surface of the retained P-type semiconductor material separately, or the electron beam vacuum evaporation coating process or the sputter coating process is performed to fabricate the conductor layer, so that each segment of the conductor layer can be directly integrated with the electrodes of the deposition units on two sides, thereby stabilizing the electrical connection between the deposition units, and ensuring that the fabricated light-emitting diode filament being in the chip strip structure as a whole has more stable consistency. For example, the conductor layer and the first electrode and the second electrode of each deposition unit are integrally formed by means of the one-time deposition process, so that there is no obvious boundary in structure.

In an embodiment where the conductor layer is fabricated, the conductor layer and the first electrode and the second electrode of each deposition unit are formed from a same material by means of the deposition process. The conductor layer, the first electrode, and the second electrode may be formed simultaneously by means of the deposition process, for example, as shown in the embodiment of FIG. 11*a* above. The deposition process may include, for example, a chemical vapor deposition process, an atomic layer deposition process, and a physical vapor deposition process, but is not limited to this.

In the step S420, when the conductor layer is fabricated, a step of enabling the conductor layer formed on the deposition unit adjacent to the first end and/or the second end of the substrate by means of the deposition process to form the electrode extension end separately is further included, so that the deposition unit is electrically connected to the filament electrode.

In an embodiment where the conductor layer is fabricated, the conductor layer and the first electrode and the second electrode of each deposition unit are formed from the same material by means of the deposition process. The first electrode and the second electrode of each deposition unit may be fabricated with the ITO thin film or the ITO layer, and the conductor layer may be fabricated together. The conductor layer forms the electrode extension end. The ITO thin film or layer is most usually deposited on the surface by means of electron beam evaporation, physical vapor deposition, or some sputter deposition technologies.

In another embodiment where the conductor layer is fabricated, the conductor layer and the first electrode and the second electrode of each deposition unit are formed from different materials by means of the deposition process. The conductor layer, the first electrode, and the second electrode are formed separately by means of different deposition processes. The deposition process may include, for example, a chemical vapor deposition process, an atomic layer deposition process, and a physical vapor deposition process, but is not limited to this.

In yet another embodiment where the conductor layer is fabricated, the second electrode of the deposition unit located at the first end of the substrate, the electrode extension end electrically connected to the second electrode, the first electrode of the deposition unit located at the second end of the substrate, and the electrode extension end electrically connected to the first electrode are made of the same material such as copper, gold, silver, or alloy, or are fabricated by means of the same deposition process, so that the electrical connection with the filament electrodes at the first end and the second end of the substrate is better implemented. The conductor layer between the adjacent deposition units on the substrate is made of another material or is fabricated by means of another same process. In this embodiment, the conductor layer between the adjacent deposition units is fabricated with, for example, the ITO thin film or the ITO layer, as shown in the embodiment of FIG. 25 or FIG. 26 above. That is, to further improve the luminous flux of the light-emitting diode filament, the conductor layer configured to connect the adjacent deposition units in series may be realized by a transparent conductive thin film or a transparent conductive layer.

As in the above embodiment, the adjacent deposition units on the substrate are electrically connected by the conductor layer, so that the distance between the light-emitting diodes can be shortened, thereby ensuring that more deposition units may be disposed in unit length of the light-emitting diode filament to improve the lumen of the light-emitting diode filament in unit length. In view of this, in an embodiment, the length of the conductor layer, formed between the adjacent deposition units by means of the deposition process, along the length direction of the substrate may be configured to be 0.03 mm to 0.30 mm. In some embodiments, the length may be, for example, 0.03 mm, 0.04 mm, 0.05 mm, 0.06 mm, 0.07 mm, 0.08 mm, 0.09 mm, 0.10 mm, 0.11 mm, 0.12 mm, 0.13 mm, 0.14 mm, 0.15 mm, 0.16 mm, 0.17 mm, 0.18 mm, 0.19 mm, 0.20 mm, 0.21 mm, 0.22 mm, 0.23 mm, 0.24 mm, 0.25 mm, 0.26 mm, 0.27 mm, 0.28 mm, 0.29 mm, or 0.30 mm.

In an embodiment, a third width of the conductor layer along the width direction of the substrate is less than the second width of the deposition unit along the width direction of the substrate, thereby reducing the obstruction of light emitted from the deposition unit by the conductor layer, as shown in FIG. 8 above. For example, in some specific examples, the third width of the conductor layer along the width direction of the substrate is 1.5-8.0 mm. The third width may be approximately 1.5 mm, 2.0 mm, 2.5 mm, 3.0 mm, 3.5 mm, 4.0 mm, 4.5 mm, 5.0 mm, 5.5 mm, 6.0 mm, 6.5 mm, 7.0 mm, 7.5 mm, or 8.0 mm.

In another embodiment where the conductor layer is fabricated, when the conductor layer formed between adjacent deposition units is prepared by a deposition process, a conductor layer is formed on the deposition unit adjacent to the first end or/and the second end of the substrate by the deposition process to obtain electrode extension ends respectively, so as to realize electrical connection with the filament electrodes at both ends of the substrate. That is to say, in this embodiment, the conductor layer formed between the adjacent deposition units and the electrode extension ends of the deposition units adjacent to two ends of the substrate are obtained by means of a one-time fabrication process. In some embodiments, the materials of the electrode extension end and the conductor layer that are obtained by means of the one-time fabrication process are same. The material of the electrode extension end includes conductive materials such as copper, gold, silver, and alloy, but is not limited to this.

In an embodiment where the conductor layer is fabricated, the materials of the conductor layer formed between the deposition units, the conductor layer formed on the deposition unit adjacent to the first end and/or the second end of the substrate, the first electrode, and the second electrode are same. The conductor layer, the first electrode, and the second electrode may be formed simultaneously by means of the deposition process. The deposition process includes a chemical vapor deposition process, an atomic layer deposition process, and a physical vapor deposition process, but is not limited to this.

In some embodiments where the conductor layer is fabricated, the conductor layer formed between the adjacent deposition units by means of the deposition process may also be referred to as a first conductor layer, the conductor layer formed on the deposition unit adjacent to the first end and/or the second end of the substrate by means of the deposition process may also be referred to as a second conductor layer, and the second conductor layer is the electrode extension end.

A step S430 is performed, where the deposition units adjacent to the first end and the second end of the substrate are electrically connected to the filament electrodes disposed at two ends of the substrate. In an embodiment, the filament electrode is configured to be electrically connected to the conductive bracket, so as to receive power from the driving circuit. The connection between the filament electrode and the conductive bracket may be a mechanical compression connection or a soldering connection. For the mechanical connection, the conductive bracket may pass through a specific through hole formed in the filament electrode first, and then a free end of the conductive bracket may be folded reversely, so that the conductive bracket clamps the electrode and forms an electrical connection. For the soldering connection, the conductive bracket may be connected to the filament electrode by means of silver based alloy soldering, silver soldering, soldering, or the like.

In an embodiment, the first end and/or the second end of the substrate provided in the step S400 may be pre-provided with a filament electrode separately, so that the conductive layer (the electrode extension end formed by the conductive layer) deposited in the step S430 can be directly electrically connected to the filament electrode; or the filament electrodes are electrically connected to the electrodes of the deposition units at two ends of the substrate by the leads formed by means of the wire bonding process.

In another embodiment, the first end and/or the second end of the substrate provided in the step S400 is not pre-provided with a filament electrode in advance, so that the filament electrode may be provided separately in the step S430 to complete the electrical connection between the filament electrode and the deposition unit.

In an embodiment, the filament electrode may be disposed at the first end and/or the second end of the substrate by a packaging structure of the light-emitting diode filament. The packaging structure is, for example, a light conversion layer configured to package the entire filament strip. In this embodiment, the packaging structure is, for example, a light conversion layer. In some cases, the packaging structure is also referred to as a glue sealing layer.

In an embodiment, the filament electrode may be configured as a conductive ring or a conductive sleeve, and has, for example, a structure shown in FIG. 12 and FIG. 13. In another embodiment, the filament electrode may be configured as a metal sheet to be disposed at the first end and/or the second end of the substrate. In a specific implementation, the metal sheet is, for example, a copper sheet, an aluminum sheet, or another metal sheet with conductivity, and has, for example, a structure shown in the embodiments of FIG. 6, FIG. 8, FIG. 9, FIG. 11*a*, and FIG. 11*b*.

In an embodiment where the step S430 is performed, the deposition unit adjacent to the first end and/or the second end of the substrate is electrically connected to the filament electrode of the substrate by the lead formed by means of the wire bonding process, for example, as shown in the embodiment of FIG. 15*a* above, which will not be repeated herein.

In another embodiment where the step S430 is performed, the second electrode of the deposition unit located at the first end of the substrate and the first electrode of the deposition unit located at the second end of the substrate are made of the same material such as copper, gold, silver, or alloy, or are fabricated by means of the same deposition process, so that the electrical connection with the filament electrodes at the first end and the second end of the substrate may be better implemented by the leads. The conductor layer between the adjacent deposition units on the substrate is made of another material or is fabricated by means of another same process. In this embodiment, the conductor layer between the adjacent deposition units is fabricated with, for example, the ITO thin film or the ITO layer, for example, as shown in the embodiment of FIG. 15*b* above.

In yet another embodiment where the step S430 is performed, the deposition units adjacent to the first end and the second end of the substrate are electrically connected to the filament electrodes disposed at two ends of the substrate respectively in a manner that the conductor layers formed by means of the deposition process form the electrode extension ends. In this embodiment, in the above step S420, when the conductor layer formed between the adjacent deposition units is fabricated by means of the deposition process, the conductor layer formed by the deposition unit adjacent to the first end and/or the second end of the substrate by means of the deposition process is electrically connected to the filament electrode at each of two ends of the substrate in a manner that the electrode extension end is obtained separately. That is to say, in this embodiment, the conductor layer formed between the adjacent deposition units and the electrode extension ends of the deposition units adjacent to two ends of the substrate are obtained by means of a one-time fabrication process.

To ensure sufficient electrical contact between the filament electrode and the deposition unit adjacent to the first end and/or the second end of the substrate without open circuit, or to facilitate the configuration of the filament electrodes on two sides of the substrate, in the process of fabricating the electrode extension end, a deposition area of the electrode extension end may be controlled by means of the deposition process. For example, in some embodiments, the deposition area of the electrode extension end on the substrate accounts for more than 70% of a deposition area of the deposition unit on the substrate that is adjacent to the first end and/or the second end of the substrate. For example, the deposition area of the electrode extension end on the substrate accounts for approximately 70%, 75%, 80%, 85%, 90%, 95%, or 100% of the deposition area of the deposition unit adjacent to the end of the substrate.

In an embodiment, the electrode extension end is electrically connected to the filament electrode by means of a soldering or hot melting process.

In another embodiment, the electrode extension end is formed on an upper surface of the first end and/or the second end of the substrate to electrically connect the upper surface thereof to the filament electrode. For example, after the fabrication of the conductor layer is completed, the fabricated filament electrode is placed on an upper side of the electrode extension end formed by the conductor layer at each of two ends of the substrate, and the filament electrode is fixed on the upper side of the electrode extension end by means of a soldering or hot melting process or directly by means of a glue sealing process to implement electrical connection between the two, for example, as shown in FIG. 11*b*.

In yet another embodiment, all or a part of the electrode extension end is disposed between the substrate and the filament electrode 130 to be electrically connected to the filament electrode. To ensure the stability of connection between the filament electrode and the electrode extension end, a part of the filament electrode may be disposed between the electrode extension end and the substrate, that is, the configuration of the filament electrode may be implemented by a stacked structure formed by the electrode extension end, the filament electrode, and the substrate. For example, in the fabrication process, after the deposition unit is fabricated by means of the deposition process, two filament electrodes are placed at two ends of the substrate and are specifically placed on the upper surface of the substrate, and then the conductor layer is fabricated by means of the deposition process, so that the electrode extension ends formed at two ends of the substrate are directly deposited and formed on the upper sides of the filament electrodes to be electrically connected to the filament electrodes; and then, the packaging of the entire filament is completed with the assistance of the glue sealing process, for example, as shown in any embodiment of FIGS. 16-26.

Figure 30:
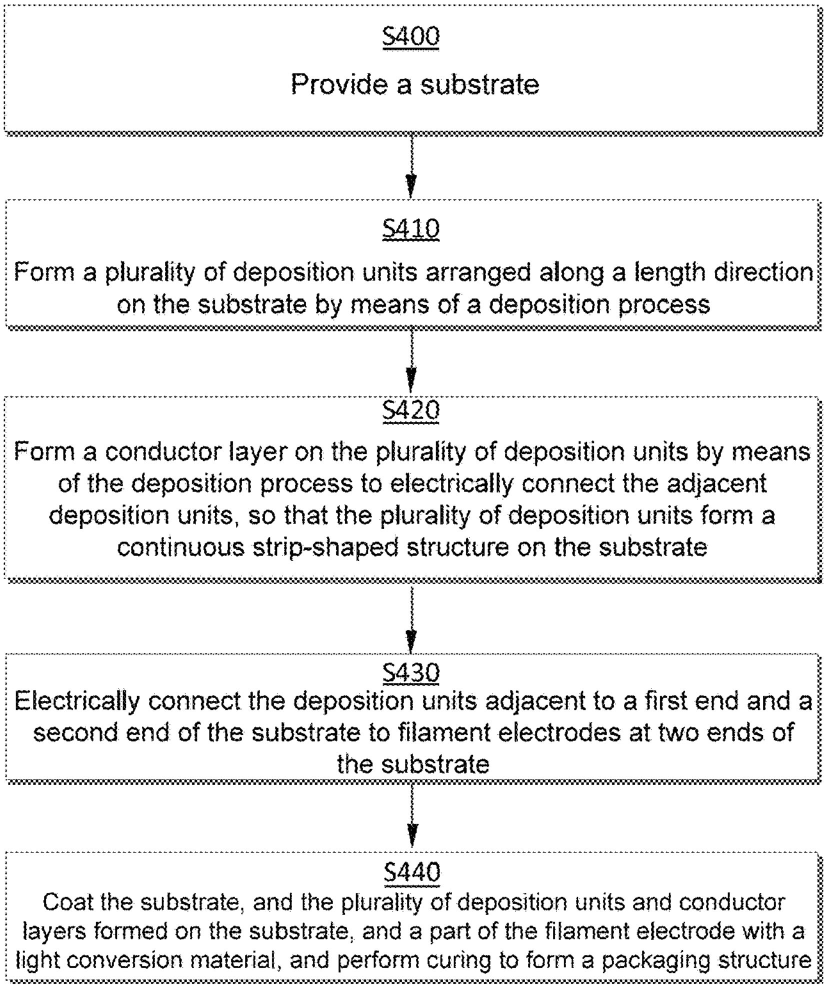
FIG. 30 shows a flowchart of a fabrication method in another embodiment of the present application.

In an embodiment, the fabrication method in the present application further includes a step of coating the substrate, and the plurality of deposition units and conductor layers formed on the substrate, and a part of the filament electrode with a light conversion material to form a packaging structure. This step may also be referred to as a step S440. Reference is to FIG. 30, which shows a flowchart of a fabrication method in another embodiment of the present application. As shown in the figure, in the step S440, the light conversion material coats the substrate, and the plurality of deposition units and conductor layers formed on the substrate, and a part of the filament electrode, and is cured to form the packaging structure.

The packaging structure is, for example, a light conversion layer. The first light conversion layer coats the substrate, and the plurality of deposition units and conductor layers formed on the substrate, and a part of the filament electrode. A part of the filament electrode that is not wrapped by the first light conversion layer is exposed to be electrically connected to a conductive bracket, a lamp cap or a lamp holder, or an external power supply device, thereby receiving power from the driving circuit.

In an embodiment, the step of forming the packaging structure further includes: forming a first layer and a second layer separately by the light conversion material, where the first layer coats the substrate, and the plurality of deposition units and conductor layers formed on the substrate, and a part of the filament electrode; and the second layer coats a lower surface of the substrate. In this embodiment, the first layer of the first light conversion layer is a top layer, and the second layer of the light conversion layer is a base layer.

The light conversion layer includes granules/particles/materials distributed therein. The granules/particles/materials are as described above for the light conversion layer in FIG. 1*a* to FIG. 26. For example, by performing the step S440, a second light conversion layer is fabricated to cover the chip strip structure and is located between the chip strip structure and the first light conversion layer, so that the light-emitting diode filament has good color reproducibility or high color rendering. For another example, by performing the step S440, a coating layer is fabricated to completely coat the first light conversion layer, has a different color from the first light conversion layer in a state where the light-emitting diode filament does not work, and is configured to change the surface color of the light-emitting diode filament. For example, different materials are mixed to fabricate the coating layer, so that the light-emitting diode filament presents different colors, or the light-emitting diode filament presents different colors in turn-on and turn-off states, thereby improving the appearance and light-emitting effect of the lamp using the light-emitting diode filament, as described in any embodiment of FIG. 17 to FIG. 26 above, which will not be repeated herein.

In some embodiments, in corresponding to a region of the deposition unit, and the electrode extension end, or a region of the conductor layer between the deposition units, the granules in the conversion layer wrapping the substrate may have different structures, materials, effects, or distribution densities. This is because the deposition unit and the conductor layer have different functions respectively. Accordingly, the first light conversion layers of the deposition unit and the conductor layer may be provided with different types of granules to achieve different effects. For example, the granules distributed in the deposition unit of the light-emitting diode filament and the granules distributed in the conductor layer have different sizes, materials, and/or densities. The relevant description of the light conversion layer in FIG. 1*a* to FIG. 26 will not be repeated herein.

In some embodiments, the light conversion layer includes a first light conversion layer and a second light conversion layer. The relevant description of the first and second light conversion layers in FIG. 1*a* to FIG. 26 will not be repeated herein.

In general, the formation method for the light-emitting diode filament 100 may be described by the following steps. In one step, a plurality of deposition units 121 are disposed on the substrate 110 along the length direction of the substrate 110. In next step, a connecting layer 122 is formed between the adjacent deposition units 121 to electrically isolate the adjacent deposition units 121. In next step, a conductor layer 123 is formed between the adjacent deposition units 121 to electrically connect the adjacent deposition units 121. In detail, the first electrode E1 of one deposition unit 121 is connected to the second electrode E2 of another deposition unit 121 by the conductor layer 123 to implement electrical conduction.

According to the lighting device, and the light-emitting diode filament and the fabrication method thereof provided in the present application, the conductor layer that electrically connects the plurality of deposition units is formed by means of the deposition process during fabrication of the deposition units, so that the plurality of deposition units form the continuous strip-shaped structure on the substrate. Compared with a situation where a lead formed by means of a conventional wire bonding process is thicker and is prone to metal wire falling or breakage, the light-emitting diode filament in the present application is more stable in electrical connection. In addition, in the present application, the connecting layer is formed between the adjacent deposition units on the substrate by means of the deposition process, so that the plurality of deposition units form the continuous strip-shaped structure on the substrate. In this way, the fabricated light-emitting diode filament is in a chip strip structure as a whole, thereby strengthening the strength of the overall structure of a chip strip and ensuring that the electrical connection between the deposition units will not be broken due to "disconnection". Furthermore, compared with a conventional filament, the light-emitting diode filament in the present application has the advantage that the conductor layer formed by means of the deposition process may shorten the distance between the deposition units, so that compared with the conventional filament, more deposition units may be disposed in the same unit length to increase the lumen of the filament in the unit length.

The above embodiments are only illustrative of the principles and effects of the present application, and are not intended to limit the present application. Any of those skilled in the art can modify or change the above embodiments without departing from the spirit and scope of the present application. Therefore, all equivalent modifications or changes made by those of ordinary skill in the art without departing from the spirit and technical ideas of the present application should still be encompassed by the claims of the present application.

What is claimed is:

1. An LED light bulb comprising:
a lamp housing;
a lamp cap connected to the lamp housing;
a driving circuit disposed in the lamp cap;
a stem disposed in the lamp housing and connected to the lamp cap;
two conductive brackets disposed in the lamp housing, the two conductive brackets having opposite polarities and electrically connected the driving circuit; and
an LED filament disposed in the lamp housing and electrically connected to the two conductive brackets, the LED filament comprising:
a chip strip structure comprising a substrate, a plurality of deposition units disposed on the substrate and arranged along a longitudinal direction of the substrate, a connecting layer disposed between the two adjacent deposition units and a conductor layer disposed on the connecting layer and electrically connected to the two adjacent deposition units;
a light conversion unit wrapping the chip strip structure; and
two electrodes disposed at two opposite ends of the substrate and electrically connected to the plurality of deposition units, the two electrodes further electrically connected to the two conductive brackets respectively,
wherein the connecting layer is disposed on the substrate and between every two adjacent deposition units, so that the plurality of deposition units form a continuous strip-shaped structure on the substrate;
wherein the deposition unit comprises:
a first semiconductor layer disposed on the substrate;
a light-emitting layer disposed on the first semiconductor layer;
a second semiconductor layer disposed on the light-emitting layer;
a first electrode disposed on the first semiconductor layer and spaced apart from the light-emitting layer; and
a second electrode disposed on the second semiconductor layer.

2. The LED light bulb according to claim 1, wherein a width of the connecting layer along a width direction of the substrate is equal to a width of the deposition unit along the width direction of the substrate.

3. The LED light bulb according to claim 2, wherein the substrate is made of light transparent material.

4. The LED light bulb according to claim 3, wherein a thickness of the substrate is 70-700 μm.

5. The LED light bulb according to claim 3, wherein the conductor layer is further disposed between the electrode and a deposition unit at an end of the substrate, the two electrodes electrically connected to the two deposition units at two end of the substrate through the conductor layer respective.

6. The LED light bulb according to claim 5, wherein the conductor layer is disposed on the substrate and the electrode is disposed on the conductor layer, such that the conductor layer is sandwiched between the substrate and the electrode.

7. The LED light bulb according to claim 6, wherein the light conversion unit wraps the chip strip structure, the conductor layer and a portion of each of the two electrodes.

8. The LED light bulb according to claim 7, wherein the light conversion unit comprises a first light conversion layer and the second light conversion layer, the second light conversion layer wraps the substrate, the plurality of deposition units and the conductor layer, and the first light conversion layer wraps the second light conversion layer and the portion of each of the two electrodes.

9. The LED light bulb according to claim 8, wherein the second light conversion layer further wraps the portion of each of the two electrodes.

10. The LED light bulb according to claim 9, wherein the light conversion unit further comprises a coating layer coating on an outside surface of the first light conversion layer, a color of the coating layer is different from a color of the first light conversion layer.

11. The LED light bulb according to claim 10, wherein the coating layer comprises a silica gel and titanium dioxide powder and further coats on a surface of each of the two electrodes.

12. The LED light bulb according to claim 11, wherein the conductor layer is a transparent conductive layer.

13. The LED light bulb according to claim 3, wherein the two electrodes electrically connected to the two deposition units at two end of the substrate through a lead wire respectively.

14. The LED light bulb according to claim 13, wherein the light conversion unit wraps the chip strip structure, the lead wire and a portion of each of the two electrodes.

15. The LED light bulb according to claim 14, wherein the light conversion unit comprises a first light conversion layer and a second light conversion layer, the second light conversion layer wraps the substrate, the plurality of deposition units and the conductor layer, and the first light conversion layer wraps the second light conversion layer the portion of each of the two electrodes.

16. The LED light bulb according to claim 15, wherein the second light conversion layer further wraps the portion of each of the two electrodes.

17. The LED light bulb according to claim 16, wherein the light conversion unit further comprises a coating layer coating on an outside surface of the first light conversion layer, a color of the coating layer is different from a color of the first light conversion layer.

18. The LED light bulb according to claim 17, wherein the coating layer comprises a silica gel and titanium dioxide powder and further coats on a surface of each of the two electrodes.

19. The LED light bulb according to claim 18, wherein the conductor layer is a transparent conductive layer.

* * * * *